(12) United States Patent
Wu et al.

(10) Patent No.: US 11,780,961 B2
(45) Date of Patent: Oct. 10, 2023

(54) ORGANIC METAL-FREE CATALYSTS WITH ELECTROPHILIC AND NUCLEOPHILIC DUAL-FUNCTIONS, PREPARATION METHODS OF MAKING THE SAME, AND USES THEREOF

(71) Applicant: ZHEJIANG UNIVERSITY, Hangzhou (CN)

(72) Inventors: Guangpeng Wu, Hangzhou (CN); Guanwen Yang, Hangzhou (CN); Yaoyao Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 376 days.

(21) Appl. No.: 17/278,327

(22) PCT Filed: Sep. 2, 2019

(86) PCT No.: PCT/CN2019/103919
§ 371 (c)(1),
(2) Date: Mar. 21, 2021

(87) PCT Pub. No.: WO2020/057356
PCT Pub. Date: Mar. 26, 2020

(65) Prior Publication Data
US 2021/0363297 A1    Nov. 25, 2021

(30) Foreign Application Priority Data
Sep. 21, 2018  (CN) .......................... 201811107527.9

(51) Int. Cl.
C08G 64/34 (2006.01)
C07F 5/02 (2006.01)
C07F 7/10 (2006.01)
C07F 9/54 (2006.01)
C08G 63/42 (2006.01)
C08G 63/58 (2006.01)
C08G 63/82 (2006.01)
C08G 64/02 (2006.01)
C08G 64/18 (2006.01)
C08G 65/10 (2006.01)
C08G 75/28 (2006.01)
C08G 79/04 (2006.01)

(52) U.S. Cl.
CPC .............. C08G 64/34 (2013.01); C07F 5/027 (2013.01); C07F 7/10 (2013.01); C07F 9/5442 (2013.01); C08G 63/42 (2013.01); C08G 63/58 (2013.01); C08G 63/823 (2013.01); C08G 64/0208 (2013.01); C08G 64/183 (2013.01); C08G 65/105 (2013.01); C08G 75/28 (2013.01); C08G 79/04 (2013.01); C08G 2650/58 (2013.01)

(58) Field of Classification Search
USPC ......................................................... 528/355
See application file for complete search history.

(56) References Cited

FOREIGN PATENT DOCUMENTS

| CN | 101506308 | 8/2009 |
| CN | 104083576 | 10/2014 |

OTHER PUBLICATIONS

Naruse,M. et al., The Reaction of Lithium Trialkylalkynylborate with Methanesulphinyl Chloride A Novel Route to Internal Acetylenes, Tetrahedron Letters, vol. 21, Dec. 31, 1973, p. 1848.
Yanagi, T et al., Asymmetric Borane Reduction of Prochiral Ketone Using Chiral Bis (a,a-diphenyl-2-pyrrolidinemethano) Carbonate, Chem.Pharm.Bull., vol. 51, No. (2). Feb. 28, 2003, p. 221.
Colberg, J.C. et al. Trans-Vinylboranes from 9-Borabicyclo[3.3.1] Nonane through Dehydroborylation, J.Am.Chem.Soc., vol. 115, Dec. 31, 1993, pp. 6065-6069.
Palani, N. et al. Alkylation of Nitroaromatics with Trialkylborane, Journal of Organic Chemistry., vol. 68, No. (11), Dec. 31, 2003, Table 2.

*Primary Examiner* — Terressa Boykin
(74) *Attorney, Agent, or Firm* — Jiwen Chen; Joywin IP Law PLLC

(57) ABSTRACT

The present invention relates to a kind of organic metal-free catalysts containing both electrophilic and nucleophilic dual-functions, preparation methods of making the same, and uses thereof. The organic metal-free catalysts in the present invention have the chemical structure shown in formula (I):

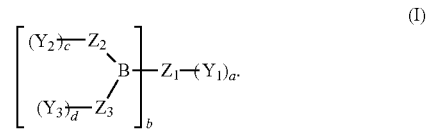

Compared with the metal-free organic polymerization catalytic systems that have been reported before, the organic metal-free catalysts in this invention have the combined advantages of simple preparation, high reactivity, easy operation, low cost, wide applicability, easy for industrial production.

20 Claims, 6 Drawing Sheets

ORGANIC METAL-FREE CATALYSTS WITH ELECTROPHILIC AND NUCLEOPHILIC DUAL-FUNCTIONS, PREPARATION METHODS OF MAKING THE SAME, AND USES THEREOF

This is a U.S. national stage application of PCT Application No. PCT/CN2019/103919 under 35 U.S.C. 371, filed Sep. 2, 2019 in Chinese, claiming priority of Chinese Application No. 201811107527.9, filed Sep. 21, 2018, all of which is hereby incorporated by reference.

FIELD OF THE INVENTION

The present invention relates to certain new catalysts, including the design and synthesis of these catalysts, as well as their application in polymer preparation.

BACKGROUND OF THE INVENTION

Polymeric materials with different properties can be prepared by different polymerization reaction methods and reaction monomers. Using different polymerization methods and reactive monomers can prepare polymer materials with different properties. Polymeric materials are widely used in people's clothing, food, housing, transportation and various sectors of the national economy.

During polymerization method of the polymeric materials, one should take into account not only the rate, conversion and yield of polymers, but also the factors of simplicity, safety, environmental protection and so on. In order to meet the ideal requirements of polymerization, the utilization of catalysts is usually necessary during the polymerization. For example, transition metal organic catalysts are used for olefin polymerization in the presence of titanium catalysts for the preparation of polyester materials. Although these organometallic catalysts can efficiently prepare polymer materials, the residual metal catalysts in the materials often lead to problems such as toxicity, discoloration and degradation, which limit applications of the products, especially in packaging, biomedicine and microelectronics. Therefore, more and more attentions have been paid to the use of metal-free organic catalysts in the research field of organic chemistry, polymer chemistry and polymeric materials, especially in preparation of polyester, polycarbonate, polyether, polyamide, polyurethane and other polymeric materials.

At present, metal-free organocatalysts for polymerization mainly include carboxylic acid-based catalyst systems, pyridine base catalyst systems, nitrogen heterocyclic carbine-based catalysts, nitrogen-containing and base-containing catalysts (guanidine and amine-based catalysts), thiourea/amine-based catalysts, thiourea/nitrogen base catalysts, phosphonitrile base catalysts, and so on. These catalysts can be used in the copolymerization of epoxides with carbon dioxide to prepare polycarbonates, ring-opening polymerization of epoxides to prepare polyether materials, ring-opening polymerization of lactone monomers to prepare polyester materials, ring-opening polymerization of cyclic phosphate monomers to prepare polyphosphate materials, ring-opening polymerization of substituted cyclopropane to prepare functional polypropylene materials, ring-opening polymerization of cyclic carbonates to prepare polycarbonate materials, ring-opening polymerization of lactam to prepare polyamide materials, ring-opening polymerization of cyclosiloxane to prepare polysiloxane materials, polymerization of methyl methacrylate monomer into poly(methyl methacrylate) materials, polymerization vinyl ether monomers to functional polyethylene materials, and other reactions.

According to the polymerization mechanism of organic catalysis, the polymerization mechanisms of the above catalysts mainly include electrophilic activation of monomer, nucleophilic activation of monomer, nucleophilic activation of initiator, and synergistic activations of monomer and initiator.

Specific examples are listed as follows:

Protonic acid is a kind of catalyst, which involves the classical monomer electrophilic activation mechanism. In 2005, Didier Bourissou et al. reported that trifluoromethane sulfonic acid was used as catalyst for ring-opening polymerization of lactide in the presence of alcohol compounds as initiators [Macromolecules 2005, 38, 9993-9998]. During the polymerization, protonic acid worked as an electrophilic reagent to activate the carbonyl group of lactide firstly, and then ring-opening polymerization occur via nucleophilic attack on carbonyl group by alcohol compounds as initiators. In this way, poly(lactide) materials were produced.

Pyridine, tertiary phosphine [J. Polym. Sci. Part A: Polym. Chem. 2002, 40, 844-851], and nitrogen heterocyclic carbene [J. Am. Chem. Soc. 2002 124, 914-915] catalytic systems could polymerize monomer into the polymers. In the reaction, the catalyst activates the cyclic monomer to form an amphoteric reaction intermediate, which initiate the polymerization by the reaction with the alcohol compounds initiators. For example, the ring-opening polymerization of lactone monomers [Angew. Chem. Int. Ed. 2001, 40, 2712-2715] was catalyzed by 4-methyl N-dimethylaminopyridine (DMAP) in the presence of ethanol, which works as initiator reported as Hedrick et al.

Guanidine compounds, such as n-methyl-1Bicyclo [4.4.0] decane-5-Ene (MTBD) [Macromolecules 2006, 39, 8574-8583], guanidine compounds (1-diazabicyclo [5.4.0] undecane-7-Ene), and phosphonitrile bases [Macromol. Chem. Phys. 2003, 204, 1056-1071; J. Am. Chem. Soc. 129, 42, 12610-12611; and Macrom. Rapid Comm. 1995, 16, 449-453] are mainly involved the polymerization mechanism of activated initiators. In the polymerization, the above catalysts activate alcohols by deprotonating the initiator to form alkoxides, which then attack monomers to initiate polymerization. This kind of catalysts can be used to catalyze the ring-opening polymerization of lactone, epoxides, and cyclosiloxanes.

The above organic catalytic polymerization involves the electrophilic or nucleophilic activation of monomers, and the nucleophilic activation of the initiator requires the addition of different catalysts, co-catalysts and initiators to jointly promote the polymerization reaction. Therefore, the development of synergistic catalysts that can simultaneously activate monomers and initiators have become a consensus. Typical representatives of these catalysts are thiourea-amine-alcohol catalytic system [J. Am. Chem. Soc. 2005, 127, 13798-13799; Macromolecules, 2006, 39, 7863-7871], [Macromolecules 2014, 47, 1277-1284] and 1,5,7-triazabicyclo [4.4.0] decane-5-ene (TBD)-alcohol catalytic systems [J. Am. Chem. Soc. 128, 14, 4556-4557; U.S. Pat. No. 8,367,796 B2], etc. For example, in the thiourea-amine-alcohol catalytic system, thiourea, as a weak electrophilic agent, can activate monomers; meanwhile the amine can be used as nucleophiles to activate alcohol compounds. Similarly, trialkylboron can be used as an electrophilic reagent to form a multi-component catalytic system with quaternary ammonium salts, quaternary phosphonium salts or phosphonitriles/alcohols for polymerization. In these polymerization systems, triethyl boron is used as electrophilic reagents to activate cyclic monomers, and quaternary ammonium salts, quaternary phosphonium salts, oxy metal salts and phosphonitriles/alcohols are used as initiators to prepare polycarbonate by copolymerization of carbon dioxide and epoxides to prepare polycarbonate [J. Am. Chem. Soc. 2016, 138, 11117-11120; CN 107849233 A; US 2018/0118884 A1], copolymerization of epoxides and carbon sulfide to prepare thiocarbonate [CN106866952A; Macromolecules, 2018, 51, 3126-3134], copolymerization of epoxides and anhydride to prepare polyester [Green Chem. 2018, 20, 3963-3973], and other reactions.

In summary, organic catalysts have become an ideal substitute of traditional metal-organic catalysts for the synthesis of a variety of polymer materials. However, organic catalytic systems often need to add a variety of electrophilic reagents, nucleophiles or cocatalysts to activate monomers and initiators, so as to realize the smooth implementation of polymerization. However, the involved multi-components in the catalytic system often lead to poor experimental maneuverability; in addition, the catalytic system also involves complex synthesis steps, which inevitably increase the cost of polymerization.

SUMMARY OF INVENTION

The object of the present invention is to provide a kind of metal-free organic catalyst with electrophilic and nucleophilic dual functions in view of the deficiency of the existing technology.

The technical proposals provided by the present invention are as follows:

A metal-free organocatalyst with electrophilic and nucleophilic dual functions has the chemical structure shown by formula (I):

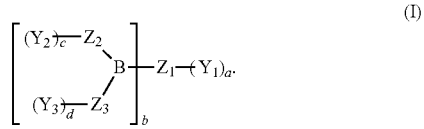
(I)

In the formula (I), each set of the substituents of $Y_1 \sim Y_3$ are independently selected from one or more of the following structural formulas 1~5:

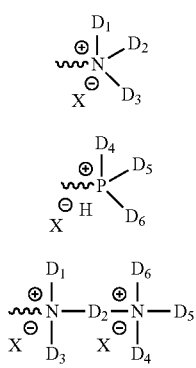

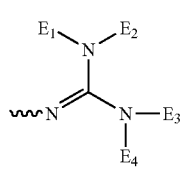

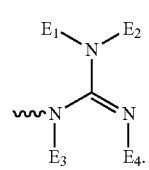

In structural formulas 1~3, each set of the substituents of $D_1 \sim D_6$ are represented independently as

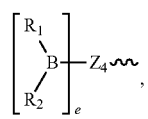

wherein B represents boron atom, N represents nitrogen atom, P represents phosphorus atom, and  represents as a connecting point.

In (I), each a and b is independently selected from the integers of 0~20, but cannot be equal to 0 at the same time; each c, d, and e is independently selected from the integers of 0~20; b cannot be equal to 0, when a=0; e cannot be equal to 0, when b=0.

Each set of the substituents of $Z_1 \sim Z_4$, $R_1 \sim R_2$, $E_1 \sim E_4$ are independently selected the group containing substituted and unsubstituted: $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chains hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms; wherein any two or more of the substituents of $Z_1 \sim Z_4$, $R_1 \sim R_2$, $E_1 \sim E_4$ may be bonded or cyclized;

However, the proviso is that $Z_1$ cannot be the aromatic group of $C_6$ when a=1; $Z_2$ cannot be the aromatic group of $C_6$ when c=1; $Z_3$ cannot be the aromatic group of $C_6$ when d=1; $Z_1$, $Z_2$, $Z_3$, $Z_4$, $R_1$, and $R_2$ cannot be the substituted or non-substituted aromatic groups at the same time; each set of $D_1 \sim D_3$ and $D_4 \sim D_6$ cannot be substituted or non-substituted aromatic groups of $C_6$-$C_{10}$ at the same time;

In (I), each $X^\ominus$ represents a negative ion, which exists independently in the form of a separate negative ion, or the $X^\ominus$ is connected to one or more of the $D_1 \sim D_6$ (as shown above) in the form of a covalent bond.

The present invention also provides a kind of metal-free organocatalyst with electrophilic and nucleophilic dual functions. The provided technical proposals are that the metal-free organocatalyst prefers one of the following structures:

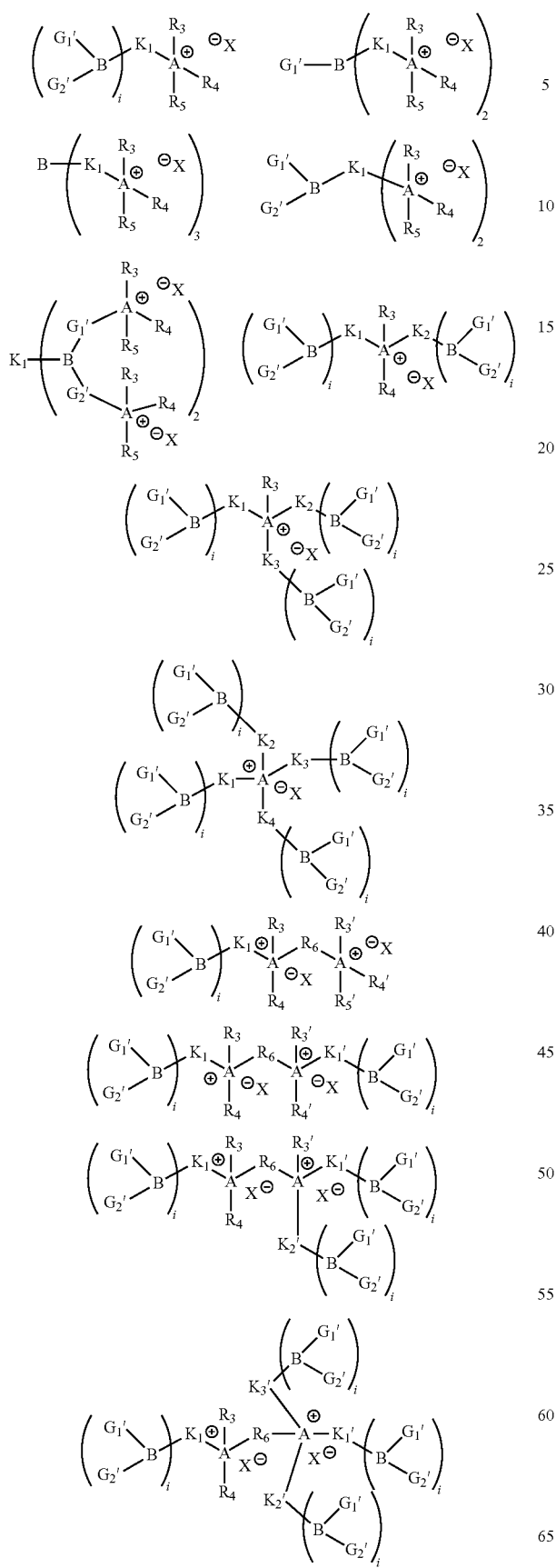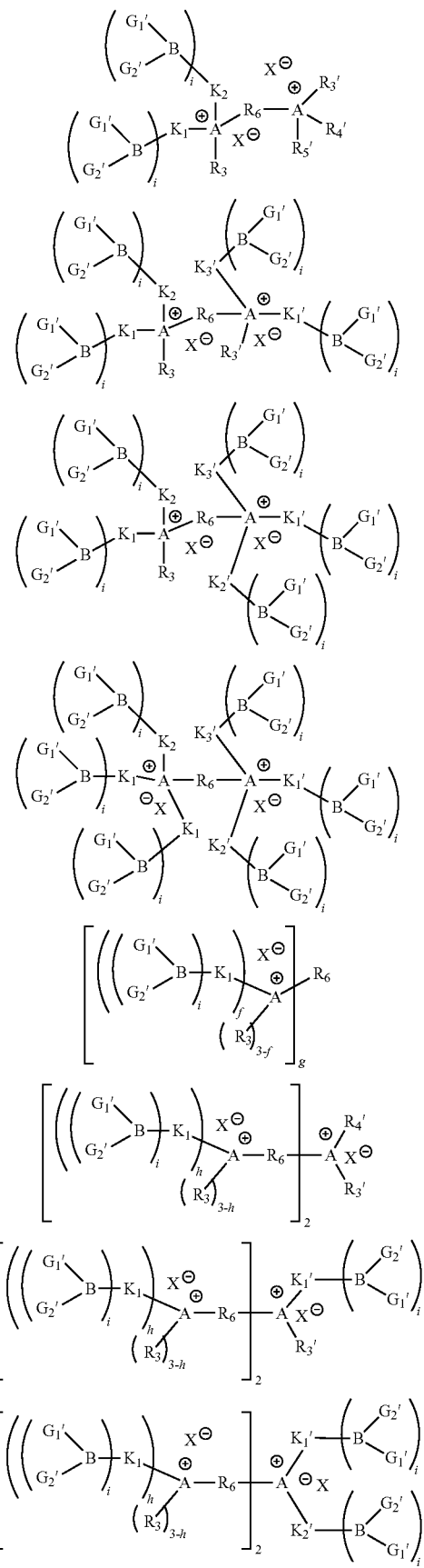

-continued

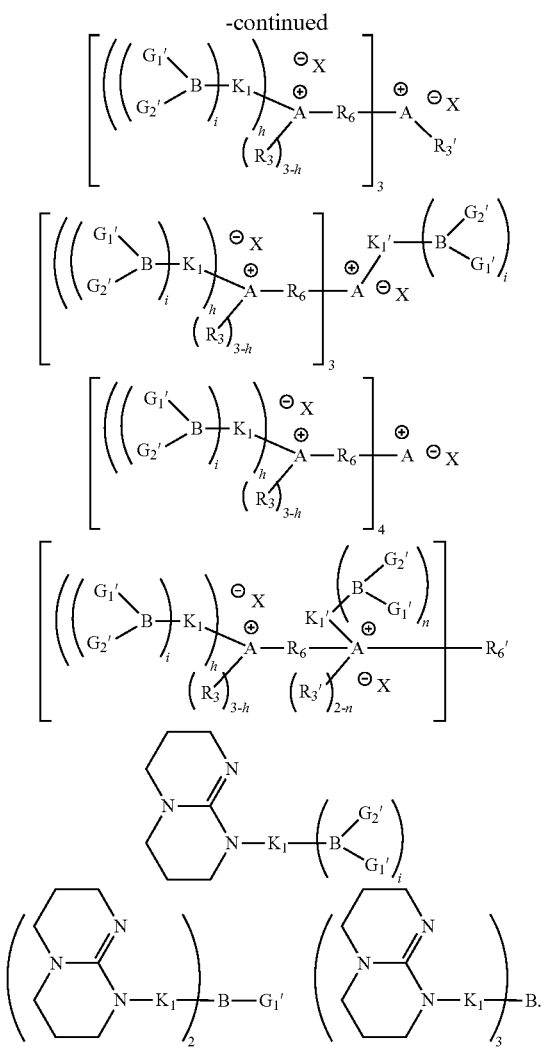

Wherein,
i is independently selected from 1 or 2;
each f ranges from 0 to 3, but in any structure f cannot be 0 at the same time;
g ranges from 3 to 20;
h ranges from 0 to 3, but in any structure h cannot be 0 at the same time;
n ranges from 0 to 2;
Each $K_1$ is independently selected the group containing H and substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

Each set of the substituents of $R_3$~$R_6$, $R_3'$~$R_6'$, $K_2$~$K_4$, and $K_1'$~$K_3'$ are independently selected the group containing substituted and unsubstituted: $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;
wherein any two or more of the substituents of $K_1$~$K_4$, $K_1'$~$K_3'$ $R_3$~$R_6$, and $R_3'$~$R_6'$ may be bonded or cyclized;
The proviso is that $R_3$, $R_4$ and $R_5$ cannot be equal to aromatic group in a structure at the same time, and $R_3$, $R_4$ and $R_5'$ cannot be equal to aromatic group or heteroaromatic group in a structure;
A is selected from N or P atom;
Each set of the substituents of $G_1'$ and $G_2'$ are independently selected the group containing H and substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 20 carbon atoms, one or more of the heteroaromatic groups of 5 to 20 carbon atoms; any two or more of the substituents of $G_1'$ and $G_2'$ may be bonded or cyclized; but the proviso is that $G_1'$, $G_2'$ and $K_1$ (or $G_1'$, $G_2'$ and $K_2$) cannot at the same time be substituted or non-substituted aromatic groups or heteroaromatic groups in a structure;
Each $X^\ominus$ represents a negative ion, which exists independently in the form of a single negative ion, or each $X^\ominus$ is connected with one or more of $R_3$~~$R_6$ and $R_3'$~~$R_6'$ (as shown above) in the form of covalent bond.

The present invention provides a kind of metal-free organocatalyst with electrophilic and nucleophilic dual functions. The technical solution provided is that, the metal-free organocatalyst is obtained by hydroboration of W1 and W2, wherein the W1 contains at least one unsaturated bond, and W2 contains at least one boron-hydrogen bond.

The structural formula of the raw material W1 has the structure showed below

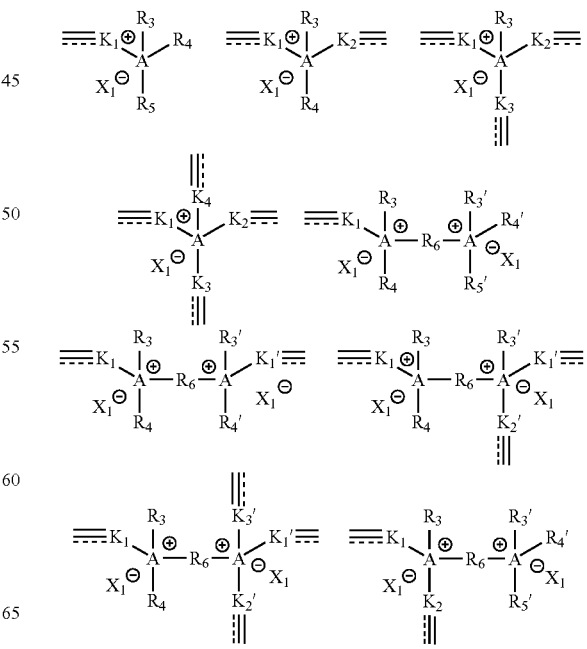

-continued

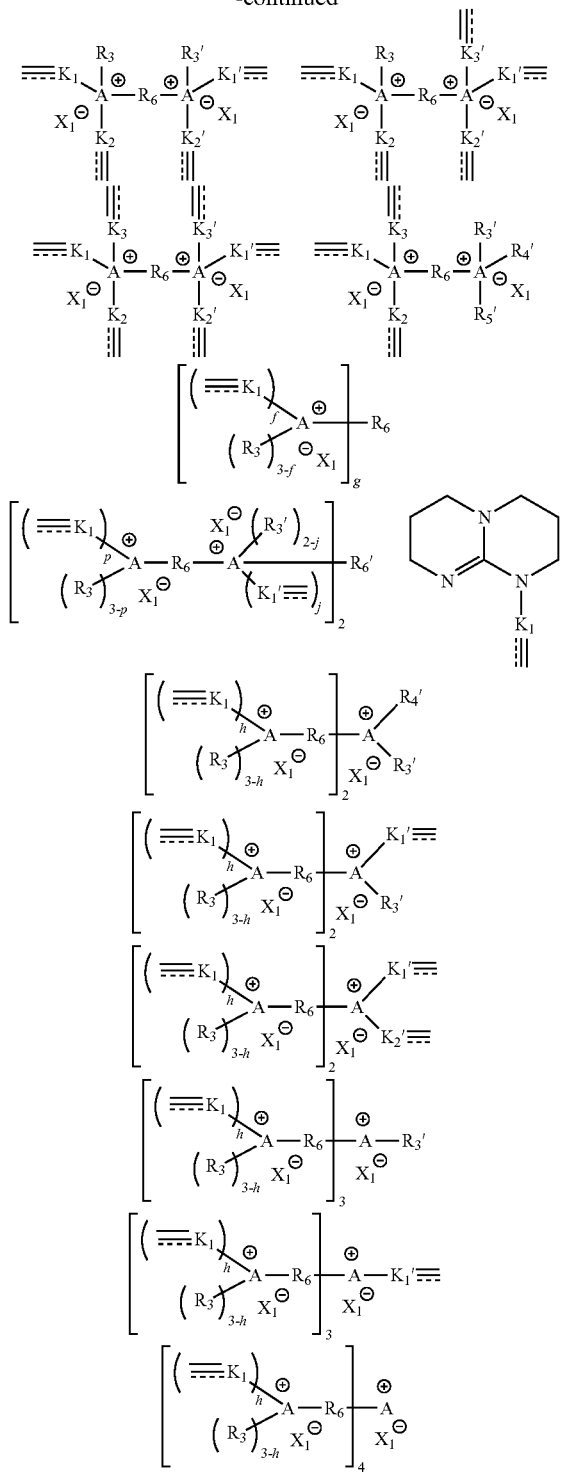

wherein each f is an independently selected integer from 0 to 3, but cannot be equal to 0 at the same time in a structure;

each set of g is an integer selected from 3 to 20;

each p is an independently selected integer from 0 to 3, each j is an independently selected integer from 0 to 2, however the p and j cannot be equal to 0 in a structure at the same time;

each h is an independently selected integer from 0 to 3, but cannot equal to be 0 in a structure at the same time;

each set of $K_1$ is independently selected from the group containing substituted and unsubstituted: $C_1$-$C_{30}$ alkyl, $C_3$-$C_{30}$ cycloalkyl, $C_3$-$C_{30}$ alkenyl, $C_3$-$C_{30}$ alkynyl, $C_7$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

Each set of the substituents of $R_3$~$R_6$, $R_3'$~$R_6'$, $K_2$~$K_4$, and $K_1'$~$K_3'$ are independently selected from the group containing substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

wherein any two or more of the substituents of $K_1$~$K_4$, $K_1$~$K_3'$, $R_3$~$R_6$, and $R_3'$~$R_6'$ may be bonded or cyclized (form bonds and rings);

the proviso is that $R_3$~~$R_5$ cannot be equal to an aryl group or a heteroaryl group at the same time in a structure;

A is selected from N or P atom;

Each ≡≡≡ independently expressed as carbon-carbon double bond or carbon-carbon triple bond.

Each $X_1^\ominus$ represents a negative ion, which exists independently in the form of a single negative ion, or each $X_1^\ominus$ is connected with one or more of $R_3$~~$R_6$ or $R_3'$~~$R_6'$ (shown above) in the form of covalent bond.

The structural formula of the reaction raw material W2 is represented by one or more of the following:

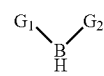

wherein $G_1$ and $G_2$ are independently selected from the group containing H, halogen, and substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms; wherein any $G_1$ and $G_2$ may be bonded or cyclized (form bonds or circles).

The object of the present invention is to address the shortcomings of the prior art and also provides a method for preparing a kind of metal-free organocatalyst with electrophilic and nucleophilic dual functions.

The technical proposals provided by the present invention are as follows:

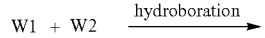

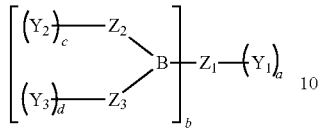

wherein, the catalyst is obtained by hydroboration of W1 with W2; W1 contains at least one unsaturated bond, and W2 contains at least one boron-hydrogen bond.

The structural formula of the raw material W1 has the structure showed below

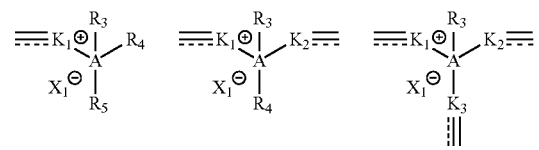

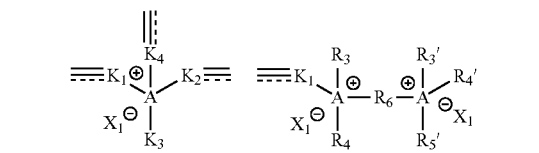

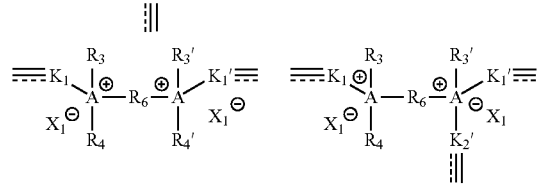

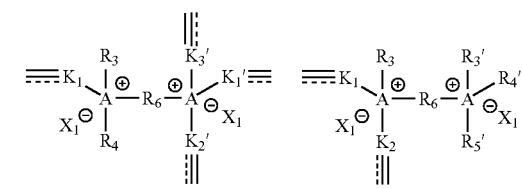

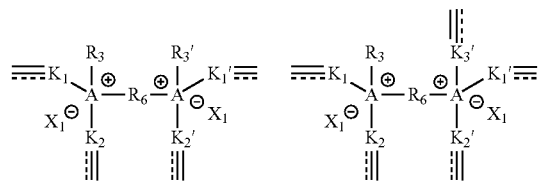

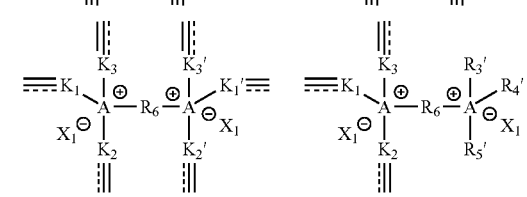

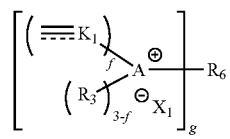

-continued

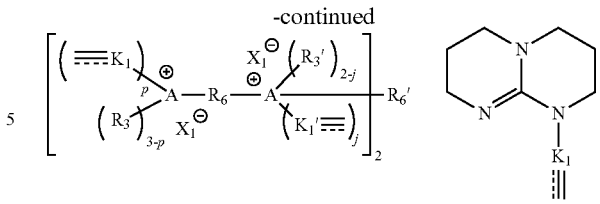

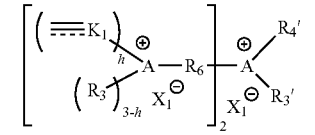

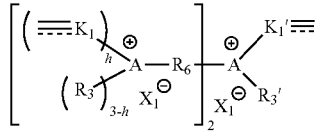

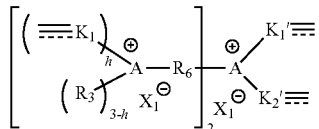

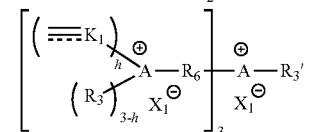

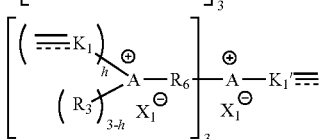

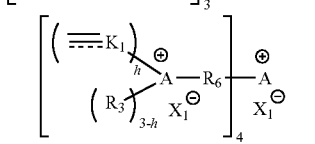

wherein each f is an independently selected integer from 0 to 3, but cannot be equal to 0 at the same time in a structure;

each set of g is an integer selected from 3 to 20;

each p is an independently selected integer from 0 to 3, each j is an independently selected integer from 0 to 2, however the p and j cannot be equal to 0 in a structure at the same time;

each h is an independently selected integer from 0 to 3, but cannot equal to be 0 in a structure at the same time;

each set of $K_1$ is independently selected from the group containing substituted and unsubstituted: $C_1$-$C_{30}$ alkyl, $C_3$-$C_{30}$ cycloalkyl, $C_3$-$C_{30}$ alkenyl, $C_3$-$C_{30}$ alkynyl, $C_7$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

Each set of the substituents of $R_3$~$R_6$, $R_3'$~$R_6'$, $K_2$~$K_4$, and $K_1'$~$K_3'$ are independently selected from the group containing substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

wherein any two or more of the substituents of $K_1$~$K_4$, $K_1$~$K_3'$, $R_3$~$R_6$, and $R_3'$~$R_6'$ may be bonded or cyclized (form bonds and rings);

the proviso is that $R_3$~$R_5$ cannot be equal to an aryl group or a heteroaryl group at the same time in a structure;

A is selected from N or P atom;

Each ═══ independently expressed as carbon-carbon double bond or carbon-carbon triple bond.

Each $X_1^\ominus$ represents a negative ion, which exists independently in the form of a single negative ion, or each $X_1^\ominus$ is connected with one or more of $R_3$~~$R_6$ or $R_3'$~~$R_6'$ (shown above) in the form of covalent bond.

The structural formula of the reaction raw material W2 is represented by one or more of the following:

wherein $G_1$ and $G_2$ are independently selected from the group containing H, halogen, and substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms; wherein any $G_1$ and $G_2$ may be bonded or cyclized (form bonds or circles).

The object of the present invention is to address the shortcomings of the prior art and also provides a method for using a metal-free organocatalyst in the preparation of polymer materials.

The technical solution provided by the present invention is:

one or more cyclic monomers undergo homopolymerization or copolymerization under the contact of an organic non-metallic catalyst with electrophilic nucleophilic dual functions to obtain a polymer material.

Alternatively, one or more cyclic monomers and one or more of carbon dioxide, carbon disulfide, and carbon oxysulfide are in contact with an organic metal-free catalyst with electrophilic, nucleophilic and dual functions to obtain a polymer material by copolymerization.

The object of the present invention is to address the shortcomings of the prior art, and also provides the application of the catalysts in the preparation of polymer materials, including the copolymerization of carbon dioxide and epoxides to prepare aliphatic polycarbonates, the ring-opening polymerization of epoxides to prepare polyether, the copolymerization of epoxides and cyclic anhydride to form polyesters, and the copolymerization of carbon sulfide and epoxides to prepare polythiocarbonates.

Compared with the prior art, the beneficial effects of the present invention are reflected in that: compared with the existing metal-free organic polymerization catalyst system, the present invention has the combined advantages of simple preparation, high activity, convenient use, low cost and wide applicability, making this technology is very suitable for industrial production.

DETAILED DESCRIPTION OF THE EMBODIMENTS

Figure 1:
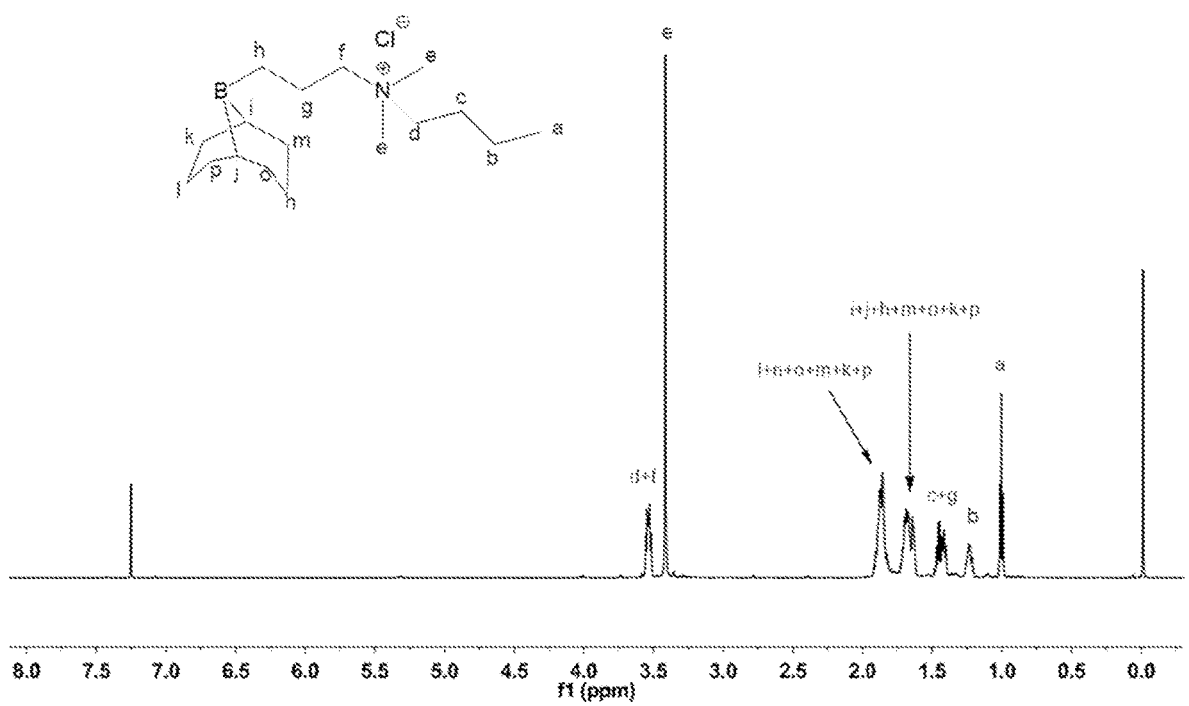
FIG. 1 is the $^1$H NMR spectrum of catalyst B1 prepared in example 1.
Figure 2:
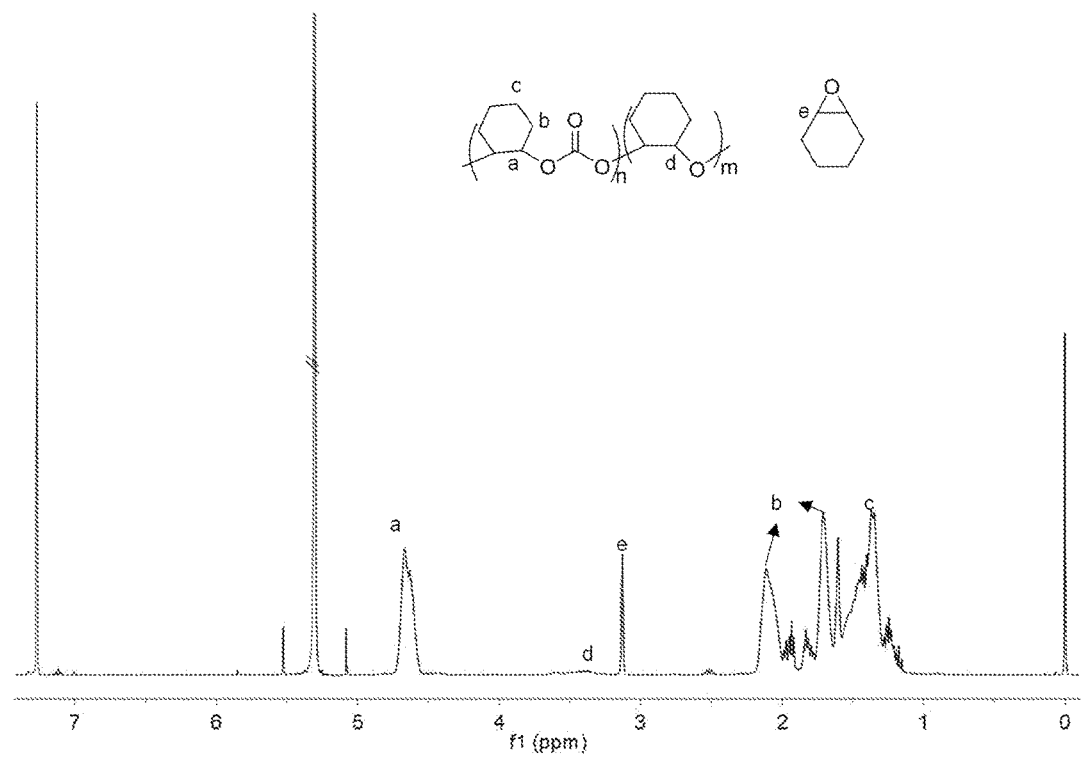
FIG. 2 is the $^1$H NMR spectrum of polycyclohexene carbonate prepared in application example 2.

The following examples illustrate the present invention in detail, but it should be emphasized that the present invention is not limited to the contents expressed by these examples. Also, the improvements and modifications to the present invention, without departing from the principle of the present invention, should fall within the scope of protection claimed by the present invention.

Unless otherwise stated, the following terms used in specifications and claims have the following meanings:

The term "alkyl group" refers to a saturated hydrocarbon group including linear and branched groups containing 1 to about 30 carbon atoms. Preferably, the group includes 1 to 15 carbon atoms, more preferably, 1 to 6 carbon atoms of medium size alkyl, such as methyl, ethyl, n-propyl, isopropyl, n-butyl, isobutyl, t-butyl, pentyl, hexyl, and still more preferably. lower alkyl groups containing 1 to 4 carbon atoms, such as methyl, ethyl, propyl, isopropyl, n-butyl, isobutyl, tert-butyl and the like.

The term "cycloalkyl group" refers to an all-carbon monocyclic, fused ring, or polycyclic fused ring group including 1 to 30 carbon atoms; preferably a 3- to 8-membered all-carbon monocyclic group, all-carbon 5-membered/6-membered or 6-membered/6-membered fused ring or polycyclic fused ring group, in which one or more rings may contain one or more double bonds; more preferably cyclopropyl, cyclobutyl, cyclopentyl, cyclohexyl, cyclohexadienyl, adamantyl, cycloheptatrienyl and the like.

The term "alkenyl group" refers to unsaturated aliphatic hydrocarbon groups with carbon-carbon double bonds, including straight-chain and branched-chain groups of 1 to 30 carbon atoms, more preferably a straight-chain and branched-chain group containing 2-10 (and further 2-6) carbon atoms.

The term "alkynyl groups" are unsaturated aliphatic hydrocarbon groups with carbon-carbon triple bonds, including straight-chain and branched-chain groups of 1 to 30 carbon atoms, more preferably a straight-chain and branched-chain group containing 2-10 (and further 2-6) carbon atoms.

The aryl group refers to a group having at least one aromatic ring structure, and is preferably a carbocyclic aromatic group or a heteroaromatic group.

The heteroaromatic group refers to an aromatic group having one heteroatom as a ring-forming atom, and the remaining ring-forming atoms are carbon. The ring structure satisfies the Huckel rule, and the heteroatoms include O, S, N, Si and P atoms. Preferably, it is a 5-membered, 6-membered or 7-membered ring. More preferably, the heteroaromatic groups include but are not limited to furyl, thienyl, benzofuryl, benzothienyl, pyridyl, pyrrolyl, N-alkylpyrrolyl.

The heterocyclic group refers to a group that contains at least one heteroatom in addition to carbon atoms, and heteroatoms include O, S, N, Si, and P atoms. Preferably, it is a 5-membered, 6-membered or 7-membered alicyclic or aromatic heterocyclic ring.

The halogen refers to fluorine, chlorine, bromine or iodine.

"〰〰" represents as a connection point.

"———" represents the connecting bond between the group and the other group in the structural formula, which connects the groups on both sides. In a structural formula, a "———" does not only mean that there is only one connecting bond, but also can be expressed as multiple connecting bonds connected to several atoms on one side of the group.

"Each" means every single one. For example, "each set of the substituents of $Y_1 \sim\sim Y_3$", which specifically refers to $Y_1$, $Y_2$ and $Y_3$. When there are multiple $Y_1$ in the same structure, every $Y_1$ does not affect each other, and is expressed independently as its own structure. The two and more $Y_1$ can be the same or different.

As an example of the present invention, the metal-free organocatalyst has the chemical structure shown in formula (I):

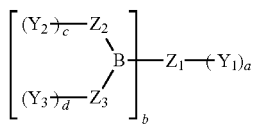  (I)

wherein each set of the substituents of $Y_1 \sim\sim Y_3$ are independently selected from one or more of the following structural formulas 1~5:

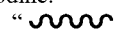 1

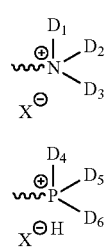 2

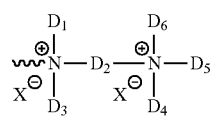 3

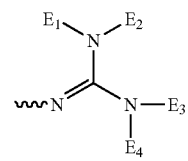 4

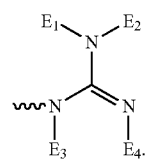 5

In structural formulas 1~3, each set of the substituents of $D_1 \sim D_6$ are represented independently as

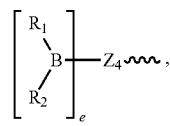

wherein B represents boron atom, N represents nitrogen atom, P represents phosphorus atom, and 〰〰 represents as a connecting point;

each "a" and "b" is independently selected from the integers of 0~20, but cannot be equal to 0 at the same time; each c, d, and e is independently selected from the integers of 0~20; b cannot be equal to 0, when a=0; e cannot be equal to 0, when b=0;

each set of the substituents of $Z_1 \sim Z_4$, $R_1 \sim R_2$, $E_1 \text{-} E_4$ are independently selected the group containing substituted and unsubstituted $C_1\text{-}C_{30}$ alkyl, $C_3\text{-}C_{30}$ cycloalkyl, $C_3\text{-}C_{30}$ alkenyl, $C_3\text{-}C_{30}$ alkynyl, $C_6\text{-}C_{30}$ aryl, $C_3\text{-}C_{30}$ heterocyclyl and $C_5\text{-}C_{30}$ heteroaryl, any of which may be heteroatom (O, S, N, Si, and P)-containing; wherein the substituents are selected from one or more of halogen atoms, branched or straight chain hydrocarbon groups with 1 to 20 carbon atoms, branched or straight chain alkoxy groups with 1 to 20 carbon atoms, 3 to 20 carbon atoms branched or straight chain cycloalkyl, 6 to 30 carbon atom aromatic group, 5 to 30 carbon atom heteroaromatic group; wherein two or more of $Z_1 \sim Z_3$, $R_1$, $R_2$, $Z_4$, $E_1 \sim E_4$ can form a bond or form a ring;

The proviso is that $Z_1$ cannot be the aromatic group of $C_6$ when a=1; $Z_2$ cannot be the aromatic group of $C_6$ when c=1; $Z_3$ cannot be the aromatic group of $C_6$ when d=1; $Z_1 \sim Z_3$ or $R_1$, $R_2$, $Z_4$ cannot be the substituted or non-substituted aromatic groups at the same time; each set of $D_1 \sim D_3$ and $D_4 \sim D_6$ cannot be substituted or non-substituted aromatic groups of $C_6\text{-}C_{10}$ at the same time;

Each $X^\ominus$ is represented as a negative ion; each $X^\ominus$ exists independently in the form of a separate negative ion, or each $X^\ominus$ can be connected to one or more of the $D_1 \sim D_6$ in the form of a covalent bond.

As an example of the present invention, each set of the substituents of $Z_1 \sim Z_4$ in the structural formula among themselves or with other $Z_1 \sim Z_4$ in the same structure formula can be bonded or ringed in the form of single ring, double ring, tricyclic, multi-ring or spiral ring structure; each set of the substituents of $R_1$~$R_2$ in the structural formula among themselves or with other $R_1$~$R_2$ in the same structure formula can be bonded or formed into a ring, in the form of single ring, double ring, tricyclic, multi-ring or spiral ring structure; each set of the substituents of $E_1$~$E_4$ in the structural formula $E_1$~$E_4$ can be bonded in the form of single-ring, double-ring, tricyclic, multi-ring or spiral ring structure. Here again, "each" refers to every single one, for example, "each set of the substituents of $R_1$~$R_2$" is expressed as $R_1$, $R_2$ and multiple $R_1$ and $R_2$ contained in the same structure, that is, $R_1$ can be bonded or looped with $R_2$, or it also can be bonded or looped with other $R_1$ or $R_2$ in the structural formula.

As an example of the present invention, each set of the substituents of $Z_1$~$Z_4$, $R_1$~$R_2$, $E_1$~$E_4$ are independently selected from the following groups that are not substituted or have substituted groups: $C_1$-$C_{18}$ alkyl, $C_3$-$C_{30}$ cycloalkyl, $C_3$-$C_{18}$ alkenyl, $C_3$-$C_{18}$ alkynyl, $C_6$-$C_{18}$ aryl group, $C_3$-$C_{30}$ heterocyclyl and $C_5$-$C_{18}$ heteroaryl group, or the mentioned hetero-containing groups, the hetero-atom including O, S, N, Si, P atoms; wherein the substituents are selected from one or more of halogen atoms, branched or straight chain hydrocarbon groups with 1 to 10 carbon atoms, branched or straight chain alkoxy groups with 1 to 10 carbon atoms, 3 to 10 carbon atoms branched or straight chain cycloalkyl groups, 6 to 18 carbon atoms aromatic groups, and 5 to 18 carbon atoms heteroaromatic groups.

As an example of the present invention, each $X^\ominus$ is independently selected from one or more of $F^\ominus$, $Cl^\ominus$, $Br^\ominus$, $I^\ominus$, $OH^\ominus$, $NO_3^\ominus$, $N_3^\ominus$, $BF_4^\ominus$, $(C_6F_5)_4B^\ominus$, sulfonate, perchlorate, chlorate, phosphate, carboxylate, alkoxylate and phenoxylate.

Specifically, each $X^\ominus$ is independently selected from one or more of $F^\ominus$, $Cl^\ominus$, $Br^\ominus$, $I^\ominus$, $OH^\ominus$, $NO_3^\ominus$, $N_3^\ominus$, $BF_4^\ominus$, $(C_6F_5)_4B^\ominus$, sulfonate, perchlorate, chlorate, phosphate, carboxylate, alkoxylate and phenoxylate; wherein phenoxylate, carboxylate, sulfonate, alkoxylate, include but not limited to one or more of o-nitrophenoxylate anion, p-nitrophenoxylate anion, m-nitrophenoxylate anion, 2,4-dinitrophenoxylate anion, 3,5-dinitrophenoxylate anion, 2,4,6-trinitrophenoxylate anion, 3,5-dichlorophenoxylate anion, 3,5-difluorophenoxylate anion, 3,5-di-trifluoromethyl phenoxylate anion, pentafluorophenoxylate anion, acetate anion, propionate anion, butyrate anion, trifluoroacetate anion, trichloroacetate anion, besylate anion, p-toluenesulfonate anion, p-trifluoromethylbenzene sulfonate anion, methoxy anion, ethyloxy anion, propoxy anion, isopropoxy anion, tert-butoxy anion.

As an example of the present invention, an organocatalyst with electrophilic and nucleophilic dual functions has one of the following structures:

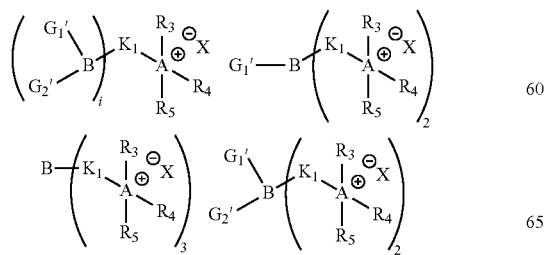

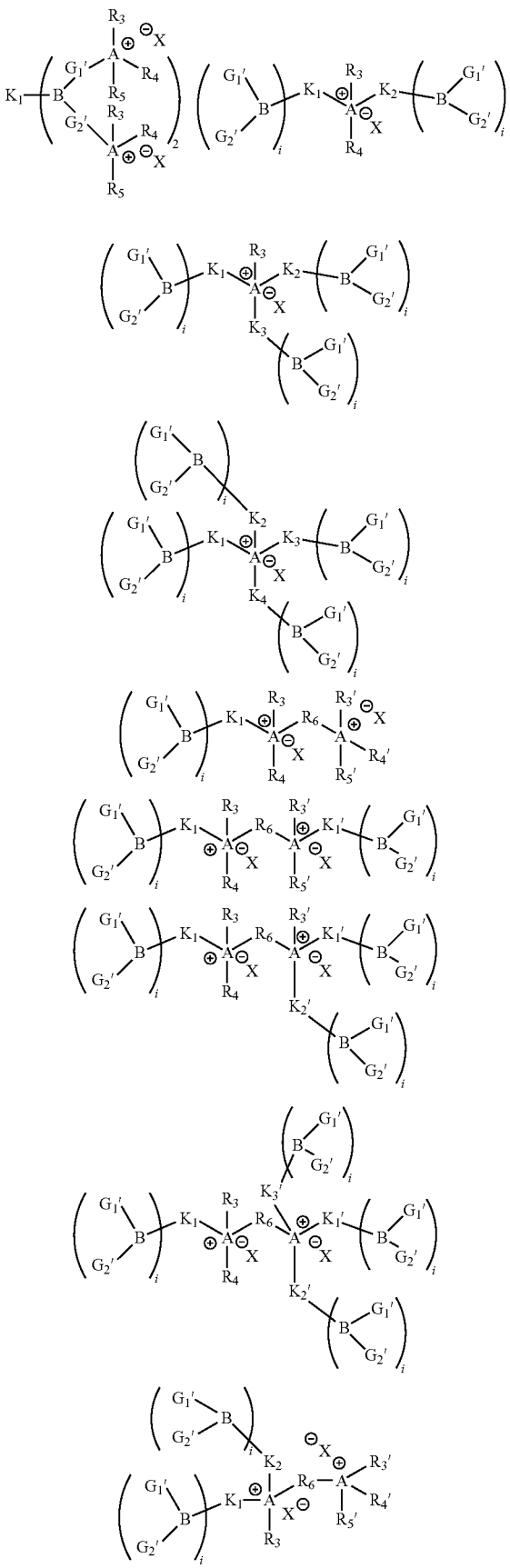

-continued

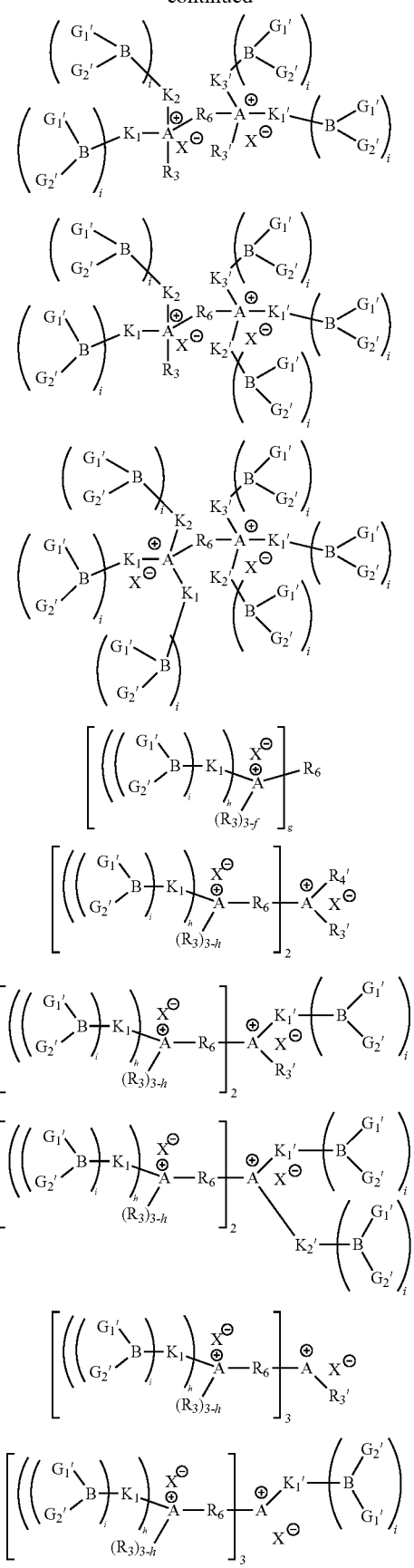

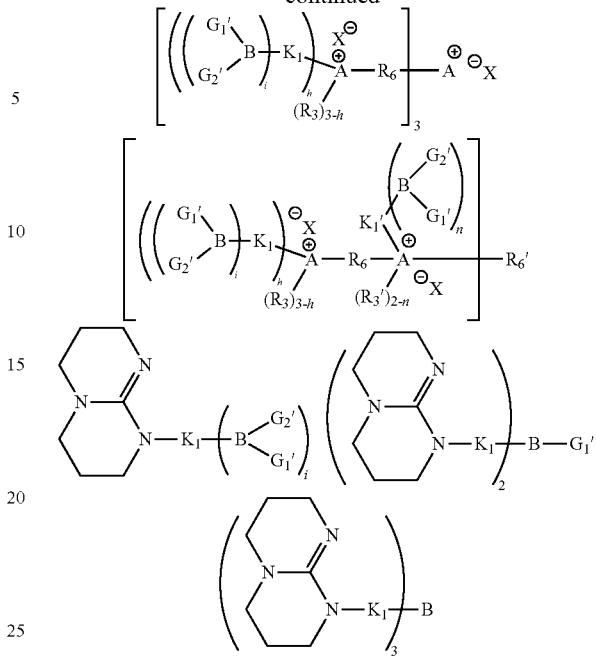

among them, each "i" is independently selected from 1 or 2;

each f is independently selected from an integer of 0 to 3, but in any structure f cannot be 0 at the same time;

g is selected from an integer of 3 to 20;

each h is independently selected from an integer of 0 to 3, but in any structure h cannot be 0 at the same time;

each n is independently selected from an integer of 0 to 2;

each $K_1$ is independently selected the group containing substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_7$-$C_{30}$ aryl, $C_3$-$C_{30}$ heterocyclyl and $C_5$-$C_{30}$ heteroaryl, any of which may be heteroatom (O, S, N, Si, and P)-containing; wherein the substituents are selected from one or more of halogen atoms, branched or straight chain hydrocarbon groups with 1 to 20 carbon atoms, branched or straight chain alkoxy groups with 1 to 20 carbon atoms, 3 to 20 carbon atoms branched or straight chain cycloalkyl groups, 6 to 30 carbon atoms aromatic groups, and 5 to 30 carbon atoms heteroaromatic groups;

each set of the substituents of $R_3$~$R_6$, $R_3'$~$R_6'$, $K_2$~$K_4$, and $K_1'$~$K_3'$ is independently selected the group containing substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

any two or more of the substituents of $K_1$-$K_4$, $K_1'$~$K_3'$, $R_3$~$R_6$, $R_3'$~$R_6'$ may form bond or ring;

The proviso is that $R_3$, $R_4$ and $R_5$ cannot be aromatic group or heteroaromatic group in a structure, and $R_3$-$R_5'$ cannot be aromatic group or heteroaromatic group in a structure;

A is selected from N or P atom;

each set of the substituents of $G_1'$ and $G_2'$ are independently selected the group containing substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms; any two or more of the substituents of $G_1'$ and $G_2'$ may form bond or ring, in the form of single ring, double ring, tricyclic, multi-ring or spiral ring structure; but the proviso is that $G_1'$, $G_2'$ and $K_1$ (or $G_1'$, $G_2'$ and $K_2$) cannot be substituted or non-substituted aromatic groups or heteroaromatic groups at the same time in a structure;

Each $X^\ominus$ represents a negative ion; each $X^\ominus$ exists independently in the form of a single negative ion, or each $X^\ominus$ is connected with one or more of $R_3$~$R_6$ or $R_3'$~$R_6'$ others in the form of covalent bond.

Specifically, each $X^\ominus$ is independently selected from one or more of $F^\ominus$, $Cl^\ominus$, $Br^\ominus$, $I^\ominus$, $OH^\ominus$, $NO_3^\ominus$, $N_3^\ominus$, $BF_4^\ominus$, $(C_6F_5)_4B^\ominus$, sulfonate, perchlorate, chlorate, phosphate, carboxylate, alkoxylate and phenoxylate; phenoxylate, carboxylate, sulfonate, alkoxylate, including but not limited to one or more of o-nitrophenoxylate anion, p-nitrophenoxylate anion, m-nitrophenoxylate anion, 2,4-dinitrophenoxylate anion, 3,5-dinitrophenoxylate anion, 2,4,6-trinitrophenoxylate anion, 3,5-dichlorophenoxylate anion, 3,5-difluorophenoxylate anion, 3,5-di-trifluoromethyl phenoxylate anion, pentafluorophenoxylate anion, acetate anion, propionate anion, butyrate anion, trifluoroacetate anion, trichloroacetate anion, besylate anion, p-toluenesulfonate anion, p-trifluoromethylbenzene sulfonate anion, methoxy anion, ethyloxy anion, propoxy anion, isopropoxy anion, tert-butoxy anion.

As a specific example of the present invention, the $G_1'$~ and $G_2'$~ are independently selected from one or more of the following structures:

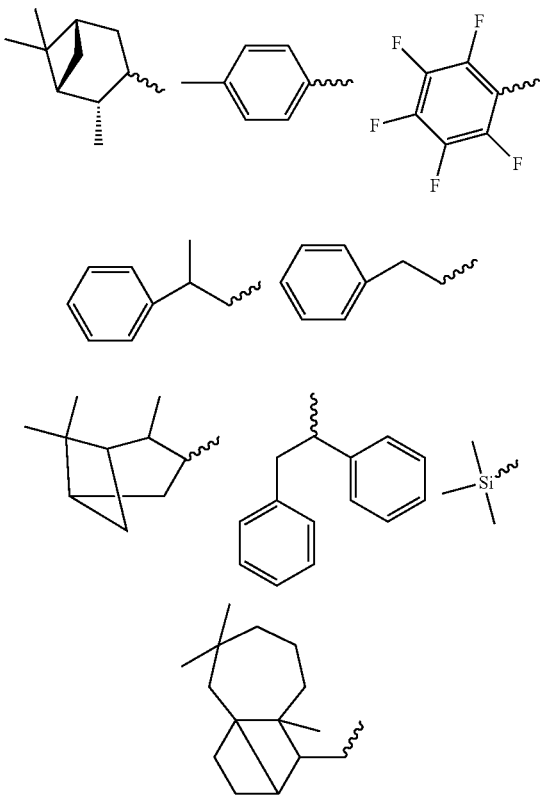

wherein the "~~~" represents the connected point, and m is an integer from 1 to 18.

As a specific example of the present invention, the

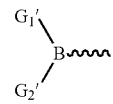

selected from the following structures:

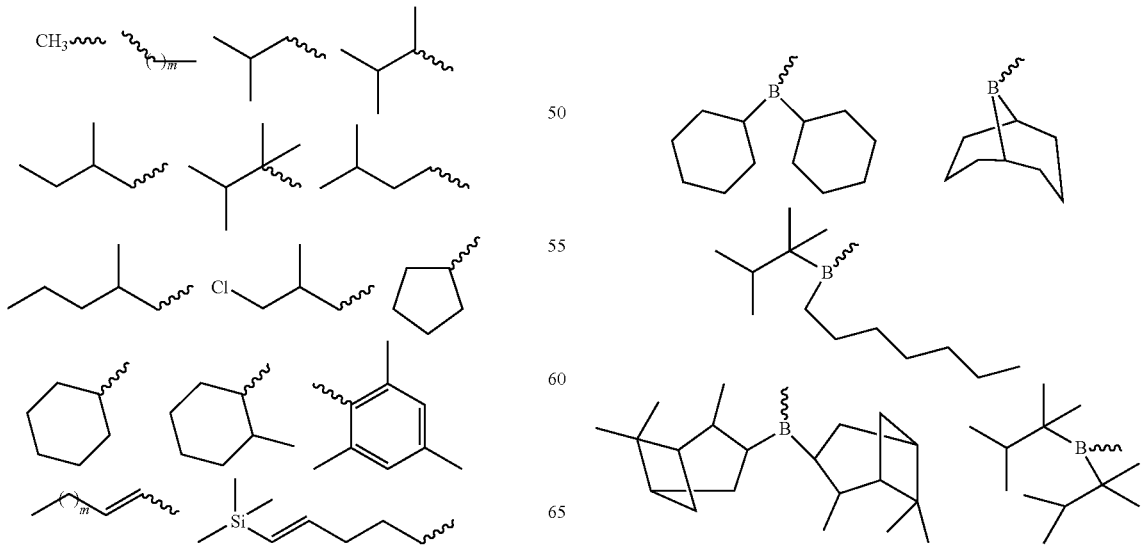

-continued

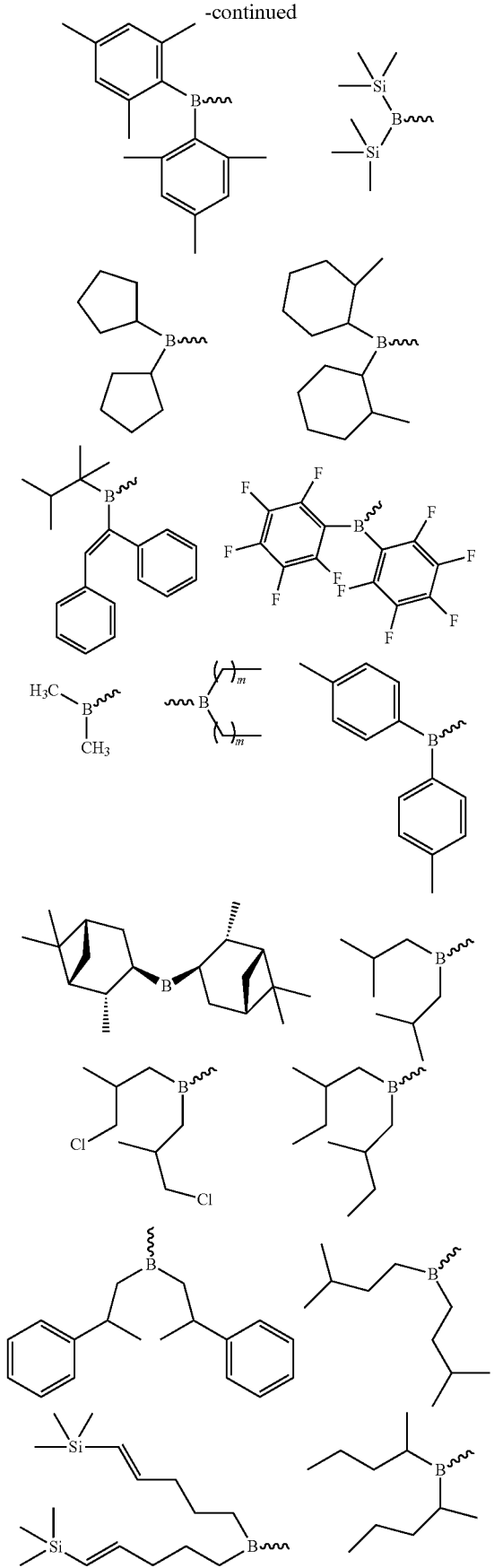

-continued

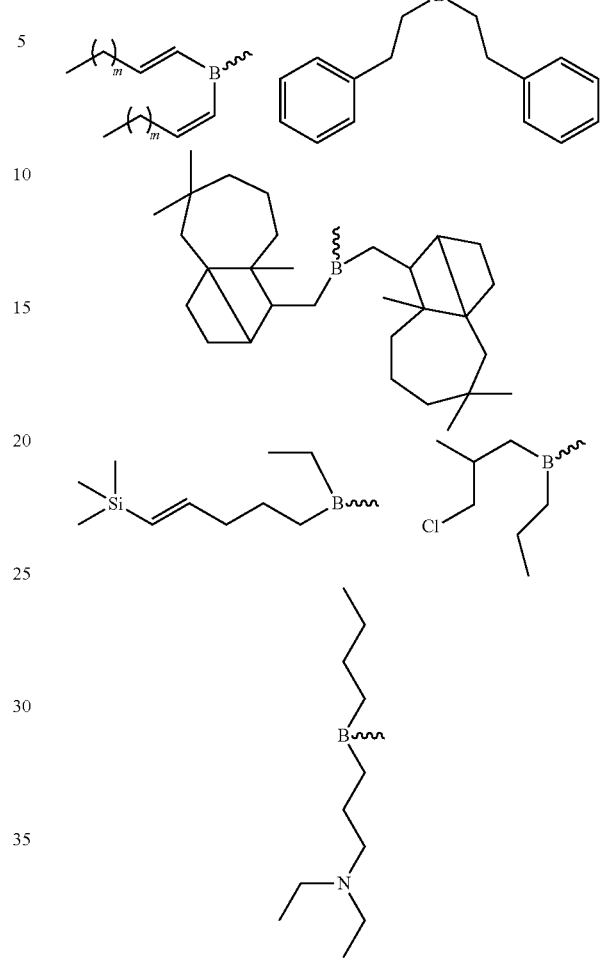

wherein the "∿∿∿" represents as a connecting point, and m independently selected from 1 to 18.

As a specific example of the present invention, each set of the substituents of $K_1$~$K_4$ and $K_1'$~$K_3'$ is independently selected from one or more of the following groups:

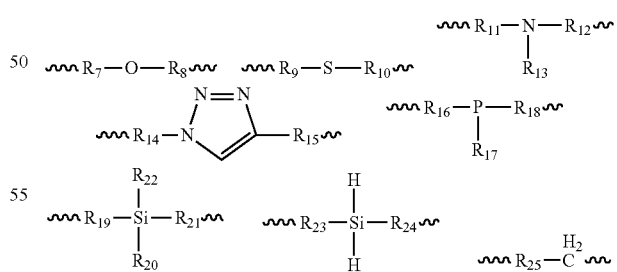

wherein each set of the substituents of $R_7$~$R_{25}$ is independently selected the group containing substituted and unsubstituted $C_1$-$C_{18}$ alkyl, $C_3$-$C_{18}$ cycloalkyl, $C_3$-$C_{18}$ alkenyl, $C_3$-$C_{18}$ alkynyl, $C_6$-$C_{18}$ aryl, $C_3$-$C_{18}$ heterocyclic and $C_5$-$C_{18}$ heteroaryl, or the group containing one or more of O, S, N, Si and P atoms; wherein the substituent is selected from halogen atoms, branched or straight chain hydrocarbyl with 1 to 10 carbon atoms, branched or straight chain alkoxy with 1 to 10 carbon atoms, branched or straight chain cycloalkyl with 3 to 10 carbon atoms, aromatic group with 6 to 12 carbon atoms, one or more of the heteroaromatic groups of 5 to 12 carbon atoms.
As a specific example of the present invention, the catalysts have the structures of the following:
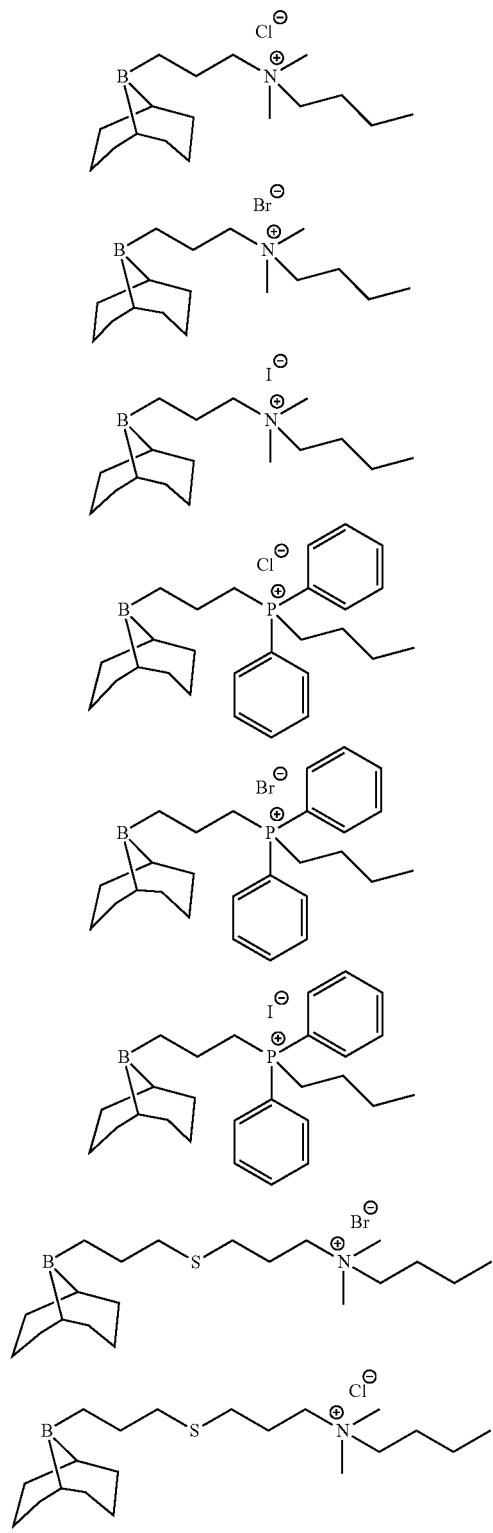
-continued
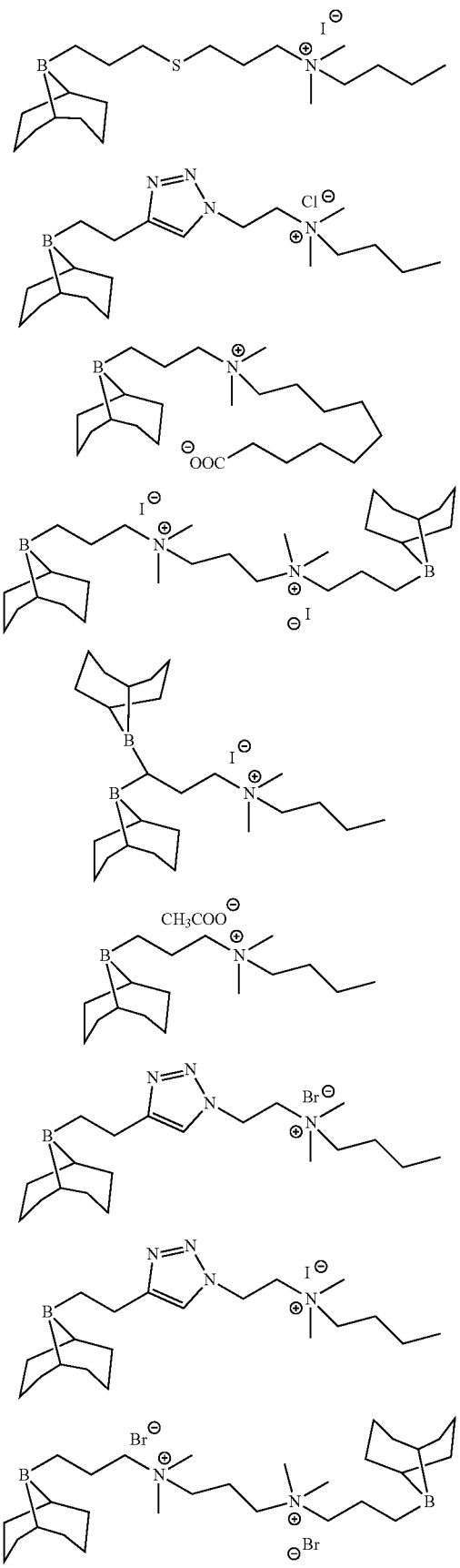

-continued

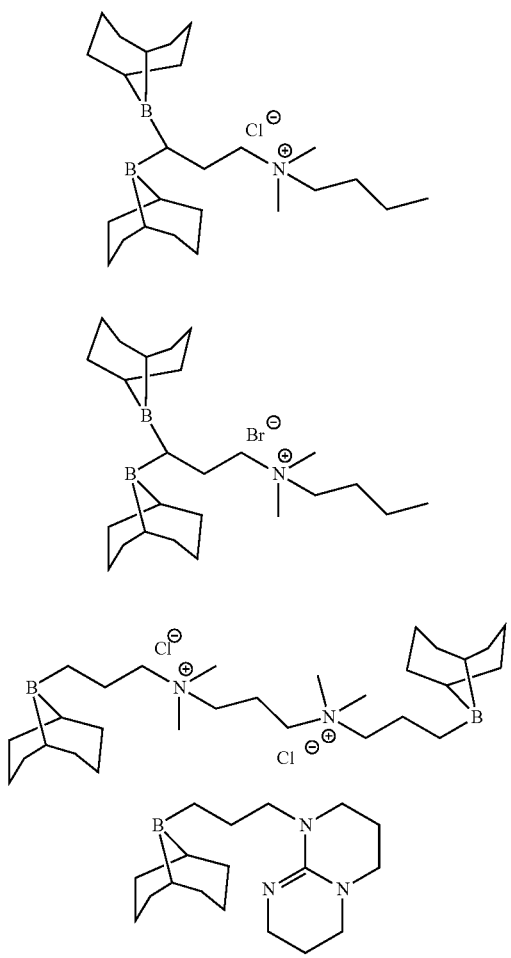

As a specific example of the present invention, the organocatalyst with both electrophilic and nucleophilic sites, which could be obtained by hydroboration of W1 and W2; the W1 contains at least one unsaturated bond, and W2 contains at least one boron-hydrogen bond.

The structural formula of the raw material W1 has the structure showed below

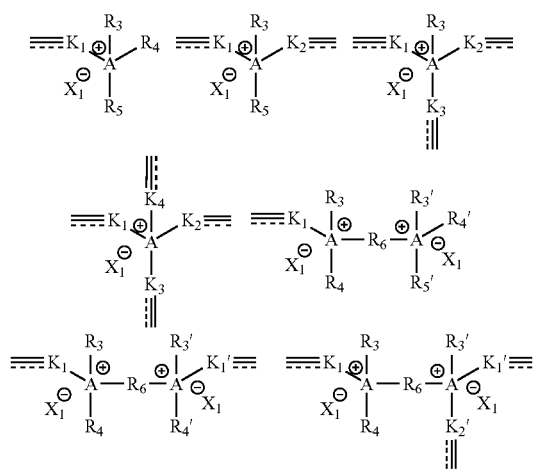

-continued

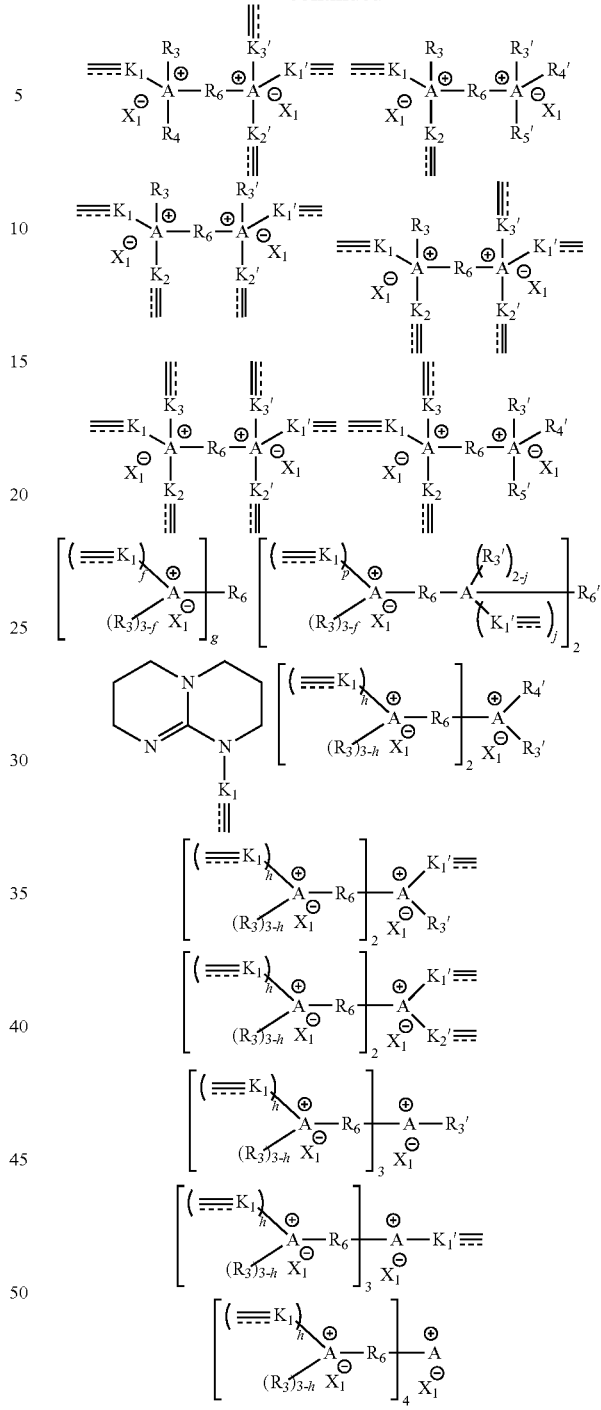

wherein
each f is an independently selected integer from 0 to 3, but cannot be equal to 0 at the same time in a structure;
each set of g is an integer selected from 3 to 20;
each p is an independently selected integer from 0 to 3, each j is an independently selected integer from 0 to 2, however the p and j cannot be equal to 0 in a structure at the same time;
each h is an independently selected integer from 0 to 3, but cannot equal to be 0 in a structure at the same time;
each set of $K_1$ is independently selected from the group containing substituted and unsubstituted: $C_1$-$C_{30}$ alkyl, $C_3$-$C_{30}$ cycloalkyl, $C_3$-$C_{30}$ alkenyl, $C_3$-$C_{30}$ alkynyl, $C_7$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

Each set of the substituents of $R_3$~$R_6$, $R_3'$~$R_6'$, $K_2$~$K_4$, and $K_1'$~$K_3'$ are independently selected from the group containing substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

wherein any two or more of the substituents of $K_1$~$K_4$, $K_1'$~$K_3'$, $R_3$~$R_6$, and $R_3'$~$R_6'$ may be bonded or cyclized (form bonds and rings);

the proviso is that $R_3$~$R_5$ cannot be equal to an aryl group or a heteroaryl group at the same time in a structure;

A is selected from N or P atom;

Each "≡≡≡" independently expressed as carbon-carbon double bond or carbon-carbon triple bond; wherein each "≡≡≡" not only refers to the "≡≡≡" in different formula, but also at the same time refers to the "≡≡≡" in the same formula, and each "≡≡≡" may be same or different.

Each $X_1^{\ominus}$ represents a negative ion, which exists independently in the form of a single negative ion, or each $X_1^{\ominus}$ is connected with one or more of $R_3$~$R_6$ or $R_3'$~$R_6'$ in the form of covalent bond.

Specifically, each $X^{\ominus}$ is independently selected from one or more of $F^{\ominus}$, $Cl^{\ominus}$, $Br^{\ominus}$, $I^{\ominus}$, $OH^{\ominus}$, $NO_3^{\ominus}$, $N_3^{\ominus}$, $BF_4^{\ominus}$, $(C_6F_5)_4B^{\ominus}$, sulfonate, perchlorate, chlorate, phosphate, carboxylate, alkoxylate and phenoxylate; phenoxylate, carboxylate, sulfonate, alkoxylate, including but not limited to one or more of o-nitrophenoxylate anion, p-nitrophenoxylate anion, m-nitrophenoxylate anion, 2,4-dinitrophenoxylate anion, 3,5-dinitrophenoxylate anion, 2,4,6-trinitrophenoxylate anion, 3,5-dichlorophenoxylate anion, 3,5-difluorophenoxylate anion, 3,5-di-trifluoromethyl phenoxylate anion, pentafluorophenoxylate anion, acetate anion, propionate anion, butyrate anion, trifluoroacetate anion, trichloroacetate anion, besylate anion, p-toluenesulfonate anion, p-trifluoromethylbenzene sulfonate anion, methoxy anion, ethyloxy anion, propoxy anion, isopropoxy anion, tert-butoxy anion.

The structural formula of the reaction raw material W2 is represented by one or more of the following:

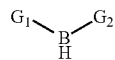

wherein $G_1$ and $G_2$ are independently selected from the group containing H, halogen, and substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms; wherein any $G_1$ and $G_2$ may form bonds or rings, in the form of single ring, double ring, tricyclic, multi-ring or spiral ring structure.

As an example of the present invention, the preparation method of a kind of metal-free bifunctional catalyst with electrophilic and nucleophilic sites, wherein the catalyst is obtained by hydroboration of W1 and W2, wherein raw material W1 contains at least one unsaturated bond, and the raw material W2 contains at least one boron-hydrogen bond. The preparation method is shown in (II)

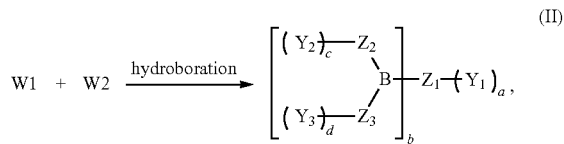

The structural formula of the raw material W1 has the structure showed below

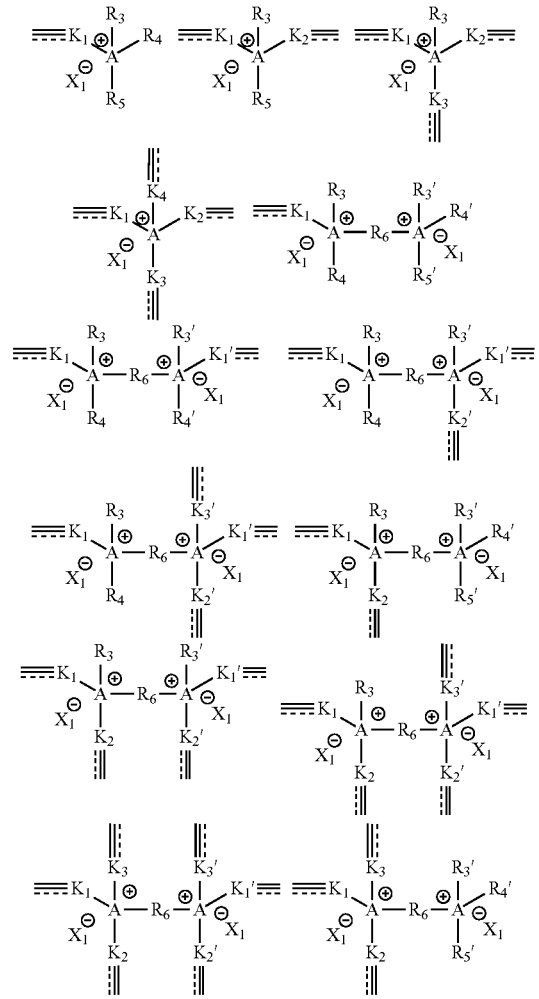

-continued

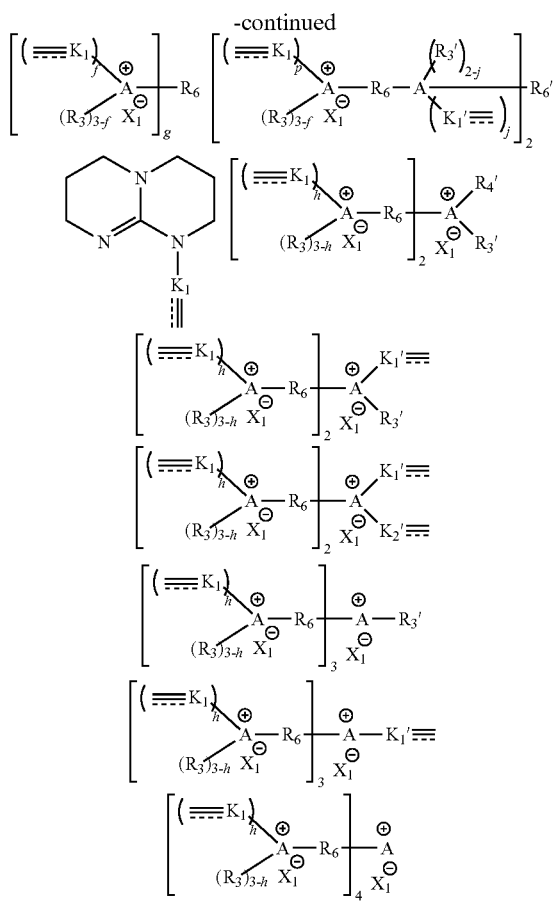

wherein each f is an independently selected integer from 0 to 3, but cannot be equal to 0 at the same time in a structure;

each set of g is an integer selected from 3 to 20;

each p is an independently selected integer from 0 to 3, each j is an independently selected integer from 0 to 2, however the p and j cannot be equal to 0 in a structure at the same time;

each h is an independently selected integer from 0 to 3, but cannot equal to be 0 in a structure at the same time;

each set of $K_1$ is independently selected from the group containing substituted and unsubstituted: $C_1$-$C_{30}$ alkyl, $C_3$-$C_{30}$ cycloalkyl, $C_3$-$C_{30}$ alkenyl, $C_3$-$C_{30}$ alkynyl, $C_7$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

Each set of the substituents of $R_3$~$R_6$, $R_3'$~$R_6'$, $K_2$~$K_4$, and $K_1'$~$K_3'$ are independently selected from the group containing substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms;

wherein any two or more of the substituents of $K_1$~$K_4$, $K_1'$~$K_3'$, $R_3$~$R_6$, and $R_3'$~$R_6'$ may may form bonds or rings, in the form of single ring, double ring, tricyclic, multi-ring or spiral ring structure;

the proviso is that $R_3$~$R_5$ cannot be equal to an aryl group or a heteroaryl group at the same time in a structure;

A is selected from N or P atom;

Each "≡≡≡" independently expressed as carbon-carbon double bond or carbon-carbon triple bond; wherein each "≡≡≡" not only refers to the "≡≡≡" in different formula, but also at the same time refers to the "≡≡≡" in the same formula, and each "≡≡≡" may be same or different.

Each $X_1^{\ominus}$ represents a negative ion, which exists independently in the form of a single negative ion, or each $X_1^{\ominus}$ is connected with one or more of $R_3$~$R_6$ or $R_3'$~$R_6'$ in the form of covalent bond.

Specifically, each $X^{\ominus}$ is independently selected from one or more of $F^{\ominus}$, $Cl^{\ominus}$, $Br^{\ominus}$, $I^{\ominus}$, $OH^{\ominus}$, $NO_3^{\ominus}$, $N_3^{\ominus}$, $BF_4^{\ominus}$, $(C_6F_5)_4B^{\ominus}$, sulfonate, perchlorate, chlorate, phosphate, carboxylate, alkoxylate and phenoxylate; phenoxylate, carboxylate, sulfonate, alkoxylate, including but not limited to one or more of o-nitrophenoxylate anion, p-nitrophenoxylate anion, m-nitrophenoxylate anion, 2,4-dinitrophenoxylate anion, 3,5-dinitrophenoxylate anion, 2,4,6-trinitrophenoxylate anion, 3,5-dichlorophenoxylate anion, 3,5-difluorophenoxylate anion, 3,5-di-trifluoromethyl phenoxylate anion, pentafluorophenoxylate anion, acetate anion, propionate anion, butyrate anion, trifluoroacetate anion, trichloroacetate anion, besylate anion, p-toluenesulfonate anion, p-trifluoromethylbenzene sulfonate anion, methoxy anion, ethyloxy anion, propoxy anion, isopropoxy anion, tert-butoxy anion.

The structural formula of the reaction raw material W2 is represented by one or more of the following:

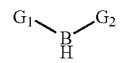

wherein $G_1$ and $G_2$ are independently selected from the group containing H, halogen, and substituted and unsubstituted $C_1$-$C_{30}$ alkyl, $C_3$-$C_{30}$ cycloalkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms; wherein the substituent is selected from halogen atoms, branched or straight chain hydrocarbyl with 1 to 20 carbon atoms, branched or straight chain alkoxy with 1 to 20 carbon atoms, branched or straight chain cycloalkyl with 3 to 20 carbon atoms, aromatic group with 6 to 30 carbon atoms, one or more of the heteroaromatic groups of 5 to 30 carbon atoms; wherein any $G_1$ and $G_2$ may form bonds or rings, in the form of single ring, double ring, tricyclic, multi-ring or spiral ring structure.

It should be noted that the preparation method provided in the reaction (II) is only one of the preparation methods of the catalysts. The raw materials of reaction (II) include but not limit to W1 and W2. More preparation methods can be found in specific embodiments.

As a preferred example of the present invention, the preparation method of said the metal-free organocatalysts is shown in the following steps: the borohydride reaction occurs after mixing the raw materials W1 and W2 under the protection of nitrogen or other inert atmosphere in the presence of organic solvents at a temperature (ranges from −20 to 150° C.), and the mixture is kept and bring stirred for a period of time (1 to 500 hours). After removing the impurities and organic solvents, the target metal-free organic catalyst with electrophilic and nucleophilic dual functions is obtained.

As a preferred example of the present invention, the organic solvent is selected from one or more of tetrahydrofuran, benzene, toluene, chloroform, hexane, diethyl ether, dichloromethane, ethyl acetate, dimethyl sulfoxide, carbon tetrachloride, 1,4-dioxane, and pyridine.

As an example of the present invention, the application of said organic metal-free catalyst in the preparation of polymer materials includes that one or more cyclic monomers are homopolymerized or copolymerized under the contact of the organic metal-free catalyst with electrophilic nucleophilic dual functions. Among them, by adjusting the structure and amount of the catalyst, adding different cyclic monomers and amounts, it is sufficient to selectively modify the obtained polymer material.

As an example of the present invention, the application of the organic metal-free catalyst in the preparation of polymer materials includes the copolymerization of one or more cyclic monomers with carbon dioxide, or/and carbon disulfide, or/and carbon sulfide under the contact of the organocatalysts. The polymeric materials with the desired structure can be selectively obtained by using different catalysts, or/and varying the dosage of the performed catalyst, or/and adding different cyclic monomers with different dosage, or/and the amount of carbon dioxide, carbon disulfide, or carbon sulfide.

As a preferred example of the present invention, the cyclic monomer is selected from the below

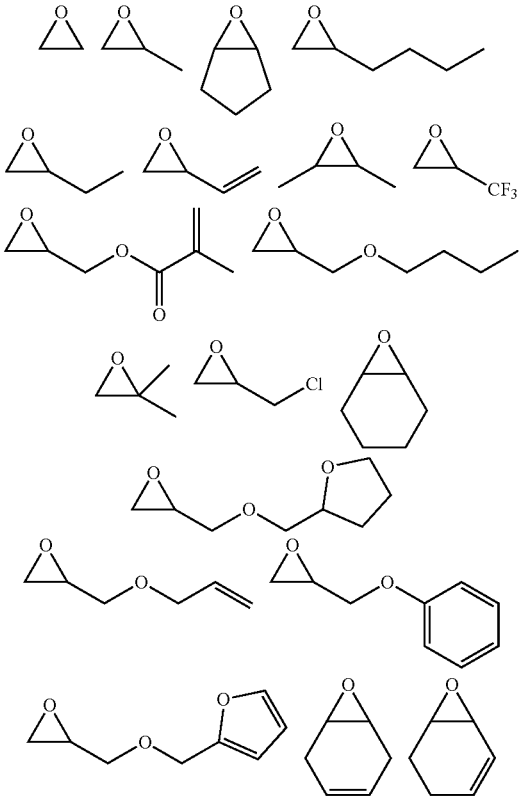

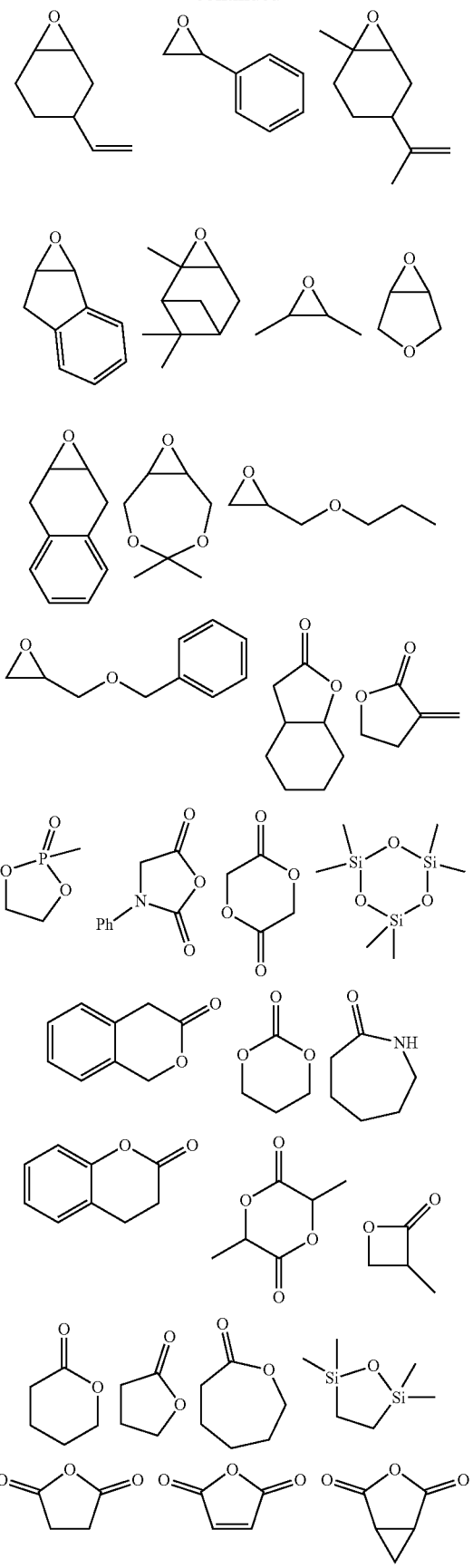

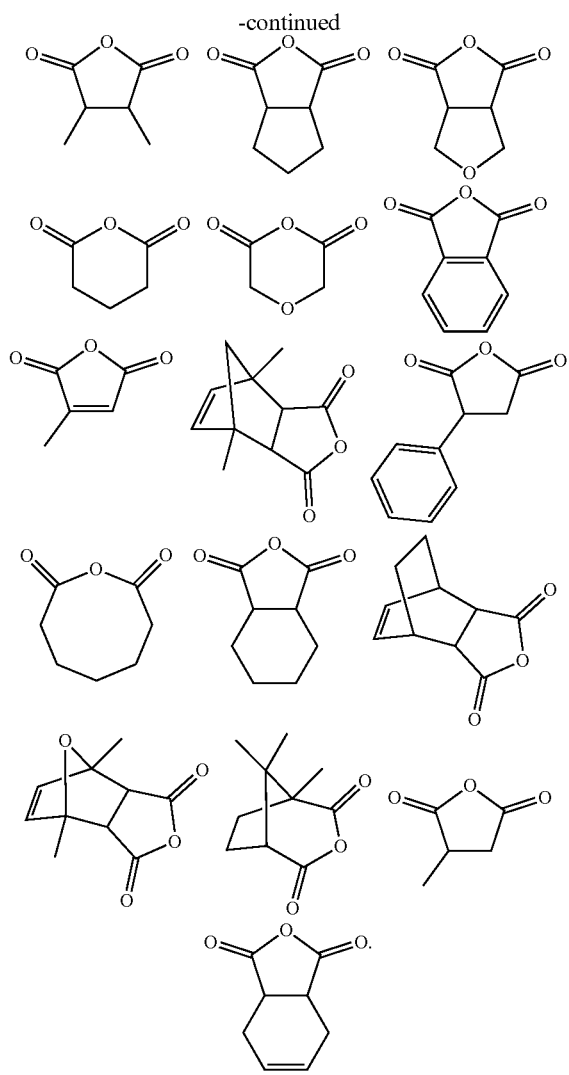

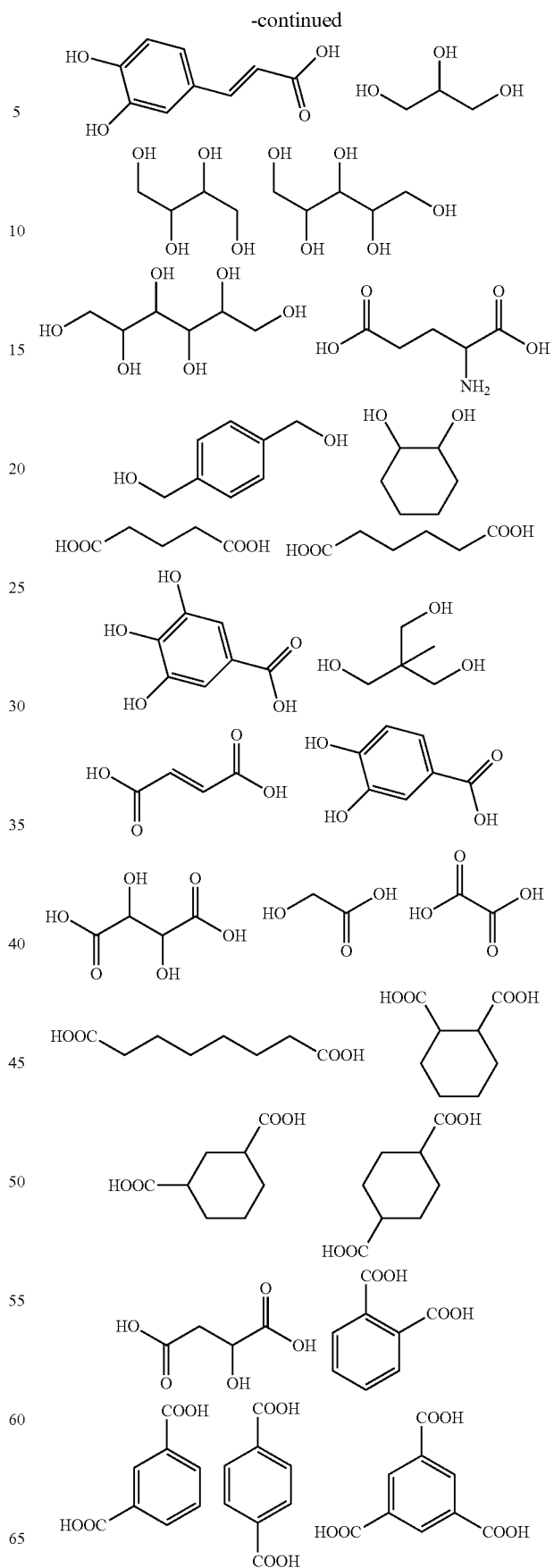

As a preferred example of the present invention, one or more alcohol compounds including acid compounds, amine compounds, polyols, polycarboxylic acids, polyalkyd acids, and water can be added as chain transfer agents to prepare corresponding polymer polyols in the presence of the catalysts.

As a specific example of the present invention, the chain transfer agents are selected from structures in the below.

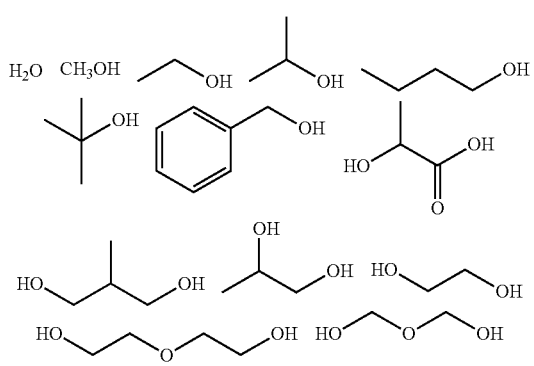

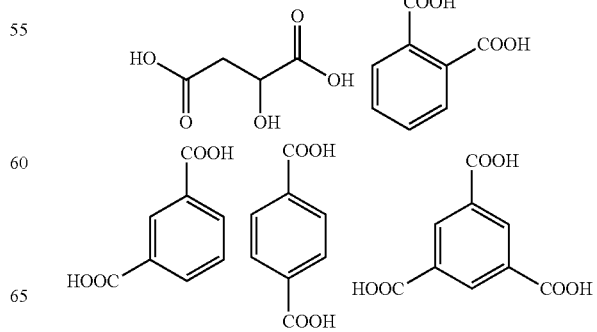

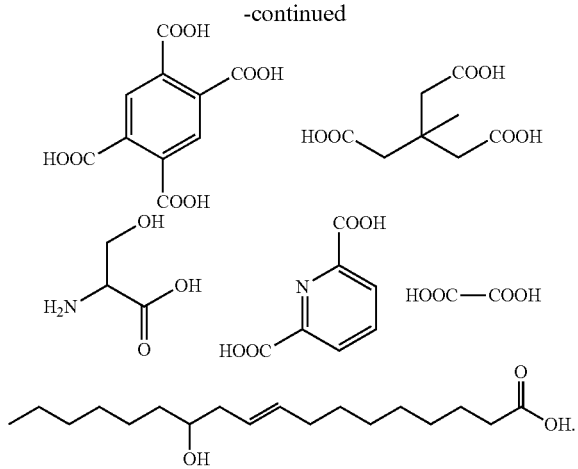

As a preferred example of the present invention, one or more polymers with alcohol hydroxyl, phenolic hydroxyl, amino and carboxyl groups were added to the polymerization reaction system as macromolecular chain transfer agents to prepare corresponding block copolymers or graft copolymers.

As a preferred example of the present invention, the chain transfer agent is selected from the following structures:

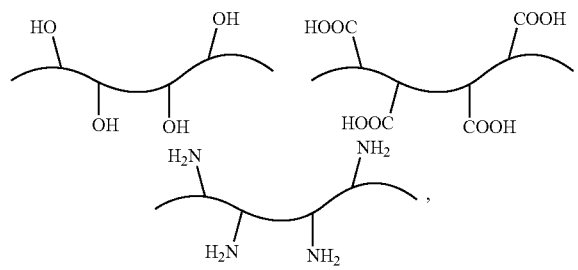

wherein ⌢⌣ represents the main chain of the macromolecular chain transfer agent, and wherein the alcoholic hydroxyl group, phenolic hydroxyl group, amino group, carboxyl group, etc. shown in the formula do not represent the specific number of functional groups, and can be any value from 1 to 50000 in theory.

The polymerization with chain transfer agent is generally carried out in bulk or in an inert solvent, such as chloroform, dichloromethane, toluene, tetrahydrofuran, and alkylene oxide; preferably toluene or alkylene oxide as the solvent. The polymerization generally performed at a given temperature, between −50° C. and 200° C., preferred during the range of 50° C.~150° C. The pressure of carbon dioxide is between 0.1 and 200 MPa, preferably at 1~5 MPa. The catalyst concentration can be performed between $10^{-6} \sim 10^{-2}$ mol/L, preferably $10^{-5} \sim 10^{-3}$ mol/L. The ratio of the chain transfer agents to the reaction monomer is in the range of $10^{-5} \sim 10^{5}$, more preferably within $10^{-3} \sim 10^{3}$.

As a preferred example of the present invention, in the application of the organocatalysts in the preparation of polymer materials, the organic metal-free catalyst is loaded on an inorganic carrier or an organic carrier.

As a preferred example of the present invention, the application of the organocatalysts in the preparation of polymer materials includes the copolymerization of carbon dioxide and epoxides to prepare aliphatic polycarbonates, the ring-opening polymerization of epoxides to prepare polyether, the copolymerization of epoxides and cyclic anhydride to prepare polyesters, and the copolymerization of carbon sulfide and epoxides to prepare polythiocarbonates. The chain transfer agents and catalysts are added to the polymerization of carbon dioxide and epoxides to prepare aliphatic polycarbonates, ring-opening polymerization of epoxides to prepare polyether, the copolymerization of epoxides and cyclic anhydrides to prepare polyesters, carbon sulfide and epoxides to prepare polythiocarbonates and other polymer materials, adjust to the required temperature, react for a certain period of time, cool, precipitate, and weigh to efficiently prepare the corresponding polymer polyols and block copolymers.

Preparation of aliphatic polycarbonate for catalytic copolymerization of carbon dioxide and epoxides: polymerization is generally carried out in bulk polymerization or in inert solvents such as chloroform, dichloromethane, toluene, tetrahydrofuran or alkylene oxide bulk, more preferably toluene or alkylene oxide as solvent or bulk. The catalyst and one or more alkylene oxides are dissolved in the inert solvent, adjusted to the required temperature, and filled with the required carbon dioxide. Then the polycarbonate can be prepared efficiently after a certain period of time. After a certain period of reaction, the polycarbonate polymer material can be prepared by cooling, precipitation and weighing. The polymerization temperature is generally maintained at −50~200° C., more preferably at 50~150° C.; the carbon dioxide pressure is between 0.1~200 MPa, more preferably at 1~5 MPa; the catalyst concentration can be used in $10^{-6} \sim 10^{-2}$ mol/L, more preferably $10^{-5} \sim 10^{-3}$ mol/L; epoxide monomers utilized are shown above.

By adjusting the structure of the catalyst and polymerization conditions, the molecular weight of the prepared polymer can be arbitrarily controlled between the values of 500-1500000 Da, and the polydispersity can be arbitrarily controlled between 1.01 and 10.00, the selectivity ratio of polycarbonate and cyclic carbonate can be arbitrarily controlled between 1% and 100%, and the content of polyether in polycarbonate can be arbitrarily controlled between 0% and 99%.

Preparation of polyethers via ring-opening polymerization of epoxides: polymerization is generally carried out in bulk inert or in solvents, such as chloroform, dichloromethane, toluene, tetrahydrofuran or alkylene oxide in bulk polymerization, more preferably toluene or alkylene oxide as solvent; the catalyst is dissolved in the above-mentioned solvent at the required temperature. After a certain period of reaction, the polycarbonate polymer material can be prepared by cooling, precipitation and weighing. The polymerization temperature is generally maintained between −50~200° C., more preferably at 50~150° C.; the catalyst concentration can be used at $10^{-8} \sim 10^{-2}$ mol/L, more preferably $10^{-5} \sim 10^{-3}$ mol/L; and the alkylene oxide used are described above.

Preparation of polythiocarbonate by catalytic copolymerization of carbon sulfide and epoxides: polymerization is generally carried out in bulk or in inert solvents such as chloroform, dichloromethane, toluene, tetrahydrofuran, and toluene or alkylene oxide in bulk polymerization, more preferably toluene or alkylene oxide as solvent. The catalyst is dissolved in the above-mentioned solvent at the required temperature. After a certain period of reaction, the polycarbonate polymer material can be prepared by cooling, precipitation and weighing. The polymerization temperature is generally maintained between −50~200° C., more preferably at 50~150° C.; the catalyst concentration can be used at $10^{-6}\sim10^{-2}$ mol/L, more preferably $10^{-5}\sim10^{-3}$ mol/L; and the alkylene oxide monomer used are described above. The cyclic anhydride monomer used is as described above.

For the preparation of polythiocarbonate by catalyzing the copolymerization of carbon oxysulfide and alkylene oxide: polymerization is generally carried out in an inert solvent such as chloroform, dichloromethane, toluene, tetrahydrofuran or alkylene oxide bulk polymerization, preferably toluene or alkylene oxide bulk as a solvent. The catalyst is dissolved in the above-mentioned solvent at the required temperature. After a certain period of reaction, the polycarbonate polymer material can be prepared by cooling, precipitation and weighing. The polymerization temperature is generally maintained between −50~200° C., more preferably at 50~150° C.; the catalyst concentration can be used at $10^{-6}\sim10^{-2}$ mol/L, more preferably $10^{-5}\sim10^{-3}$ mol/L; and the alkylene oxide monomer used is as described above.

It should be noted that the addition of an extra certain amount of Lewis base, Lewis acid, or other catalysts and co-catalysts during polymerization also fall within the scope of this patent.

The specific introduction of the present invention is given via the following specific embodiments:

Example 1: Synthesis of Catalyst B1

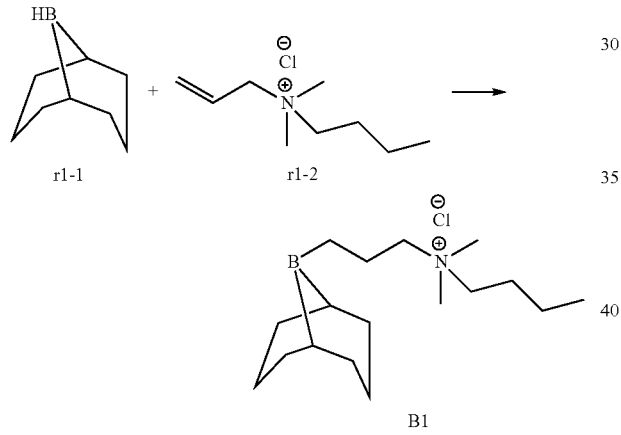

In a glove box, r1-1 (0.1 mol, 12.2 g) and r1-2 (0.1 mol, 8.5 g) in the presence of 100 ml tetrahydrofuran reacted at room temperature for 6 h. The target product B1 was obtained with a yield of 95% after removing the solvents and washing by hexanes. B1 was characterized by NMR, and the $^1$HNMR diagram of catalyst B1 is shown in FIG. 1.

Example 2: Synthesis of Catalyst B2

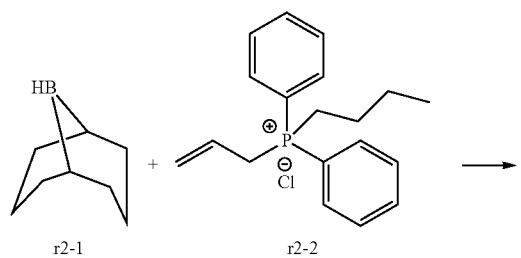

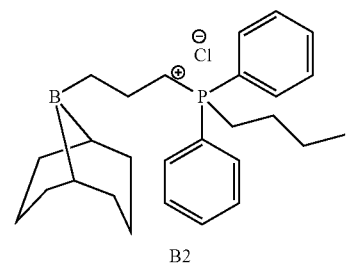

In a glove box, the raw materials r2-1 (0.1 mol, 12.2 g) and r2-2 (0.1 mol, 31.8 g) were stirred at room temperature for 36 h in 100 ml tetrahydrofuran. The target product B2 was obtained with a yield of 91% after removing the solvents and washing by hexanes.

Example 3: Synthesis of Catalyst B3

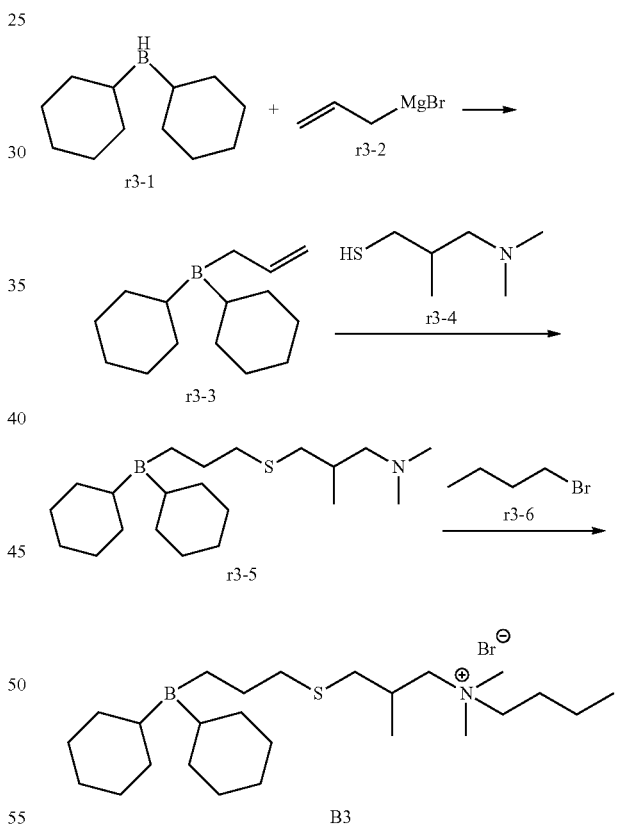

The main process is as follows:

(1) In a glove box, the raw materials r3-1 (0.1 mol, 17.8 g) and r3-2 (0.1 mol, 14.5 g) were stirred at room temperature in a 100 ml ether for 6 hours to obtain r3-3.

(2) Adding r3-4 (0.1 mol, 13.3 g) into the reaction solution to produce r3-5 after reacting at 50° C. for 8 h.

(3) Adding r3-6 (0.1 mol, 13.7 g) to the above reaction solution to produce the target product B3, after reacting at 80° C. for 24 h with a yield of 90%.

Example 4: Synthesis of Catalyst B4

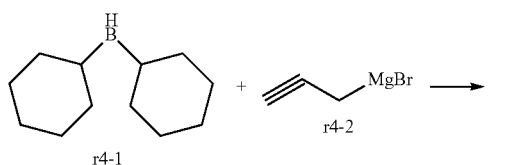

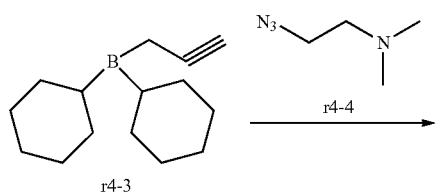

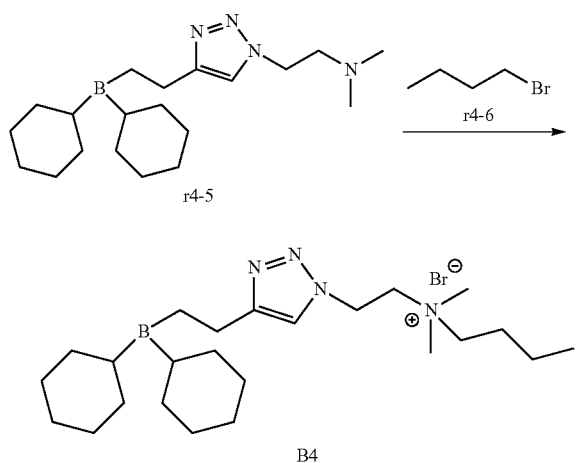

The main process is as follows:

(1) In a glove box, the raw materials r4-1 (17.8 g) and r4-2 (14.3 g) were added to a 100 ml ether and react at room temperature for 6 hours to obtain R4-3.

(2) Adding of 0.1 mol R4-4 (11.4 g) to the reaction solution to produce R4-5 after stirring 8 hours at room temperature.

(3) Adding of 0.1 mol r4-6 (13.7 g) to the above reaction solution, the target product B4 was obtained with a yield of 90%, after reacting at 80° C. for 24 h, draining the solvents and washing with hexanes.

Example 5: Synthesis of Catalyst B5

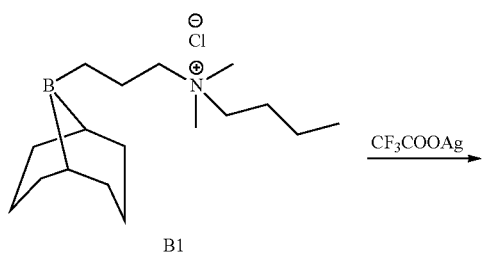

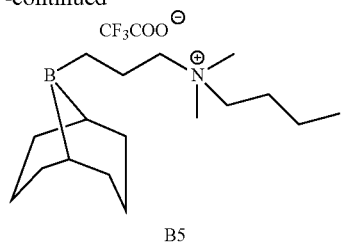

(1) Get catalyst B1 synthesized as example 1;

(2) In a glove box, B1 (2.99 g) was dissolved in 50 ml dichloromethane, and the CF$_3$COOAg (2.20 g) of 0.1 mol was added and stirred at room temperature for 12 h. The precipitation was removed by filtration, the solvent was drained, and the product was washed with hexanes. The yield of target product B5 was 85%.

Example 6: Synthesis of Catalyst B6

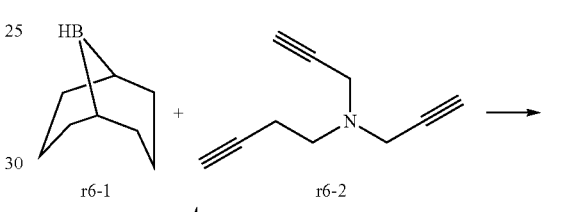

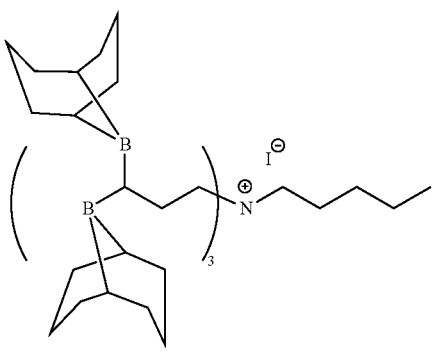

(1) In a glove box, the raw material r6-1 (0.1 mol, 12.2 g) and r6-2 (16.7 mmol, 2.4 g) were added to a 100 ml tetrahydrofuran and stirred at room temperature for 48 h.

(2) r6-4 (16.7 mmol, 3.3 g) was added to the reaction solution of (1), keeping at room temperature for 24 hours. The target product B6 was obtained with a yield of 75%.

Example 7: Synthesis of Catalyst B7

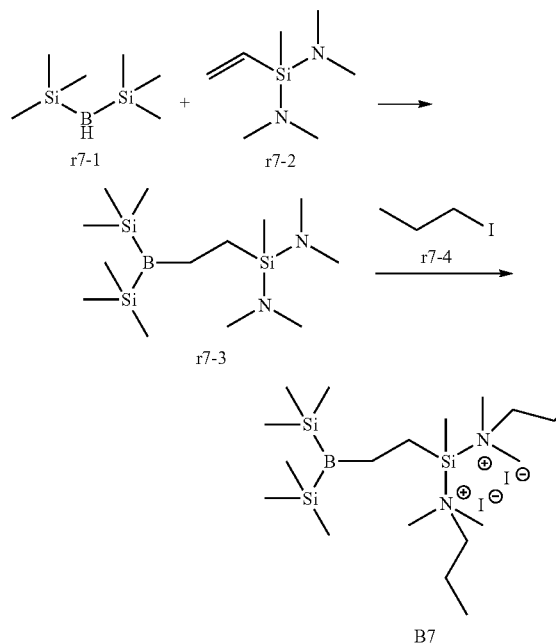

(1) In a glove box, the raw material r7-1 (15.8 g) and r7-2 (15.8 g) were added to a 100 ml tetrahydrofuran and stirred at 60° C. for 24 h.

(2) Adding r7-4 (17.0 g) to the reaction solution of (1) and keeping at room temperature for 24 hours. The target product B7 was obtained with a yield of 81% after washing using hexanes.

Example 8: Synthesis of Catalyst B8

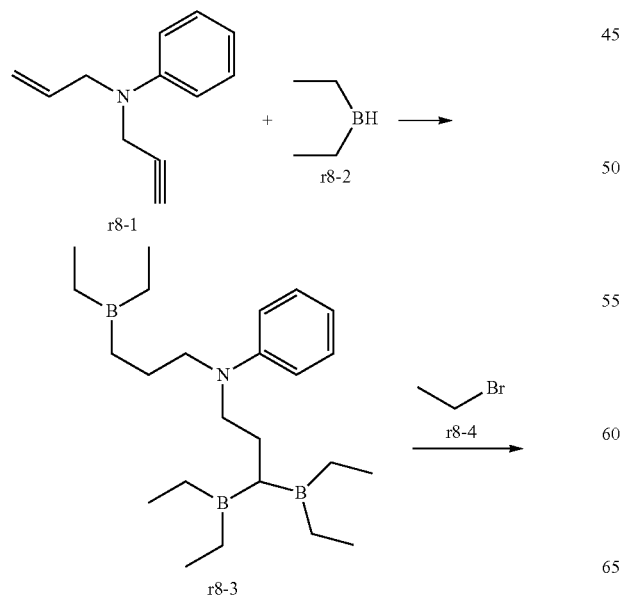

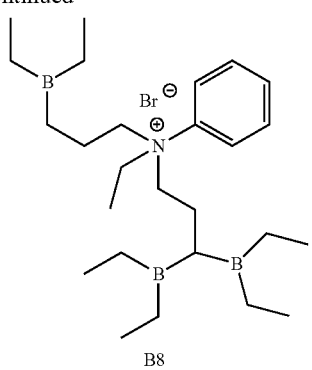

(1) In a glove box, the raw materials r8-1 (17.1 g) and r8-2 (21.0 g) were added to a 100 ml toluene and reacted at 100° C. for 8 h to produce r8-3.

(2) Adding r8-4 (21.8 g) to the reaction solution of (1) and draining the solvent after 12 h. The target product B8 was obtained with a yield of 68% after washing with hexanes.

Example 9: Synthesis of Catalyst B9

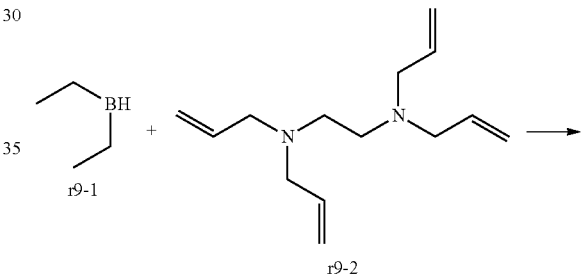

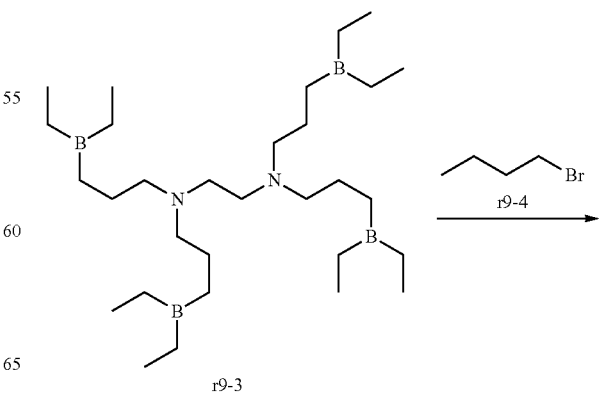

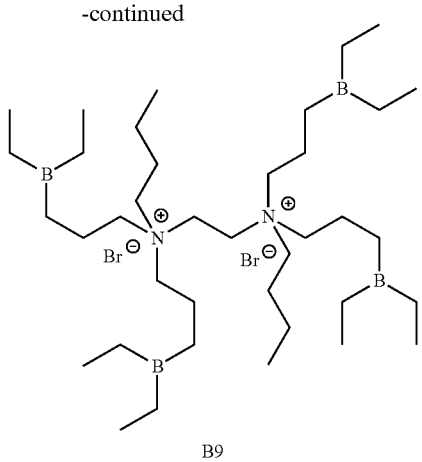

B9

(1) In a glove box, the raw material r9-1 (28.0 g) and R9-2 (22.0 g) were added to a 100 ml toluene and reacted at 100° C. for 24 h to obtain R9-3.

(2) Adding R9-4 (27.4 g) to the reaction solution of (1), reacting at 100° C. for 12 h, draining the solvent and washing with hexane, the target product B9 was obtained with a yield of 72%.

Example 10: Synthesis of Catalyst B10

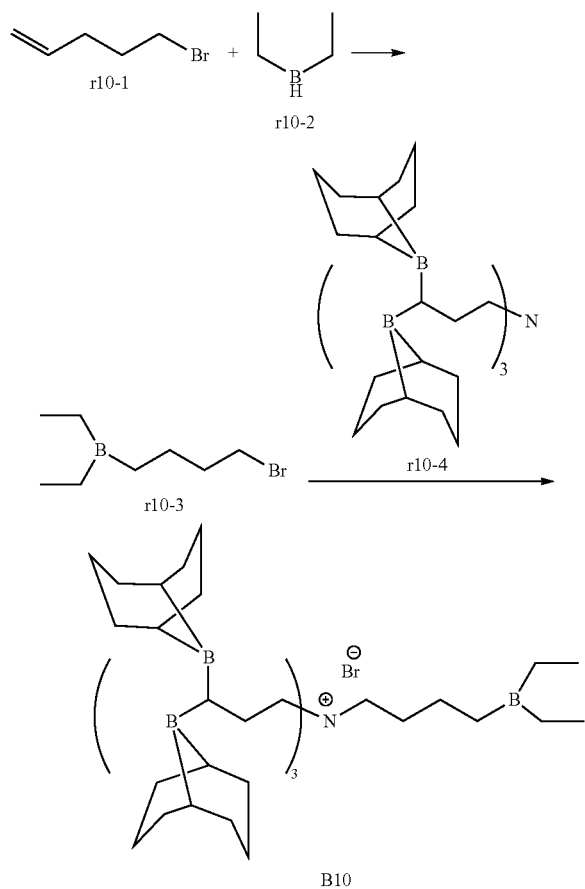

B10

(1) In a glove box, the raw materials r10-1 (14.9 g) and r10-2 (7.0 g) were added to a 100 ml tetrahydrofuran and reacted at room temperature for 12 h to obtain r10-3;

(2) 0.1 mol intermediate product r10-4 (86.3 g) shown in example 4 was added to the reaction solution of (1), and B10 was obtained after reacting at 60° C. for 8 h.

Example 11: Synthesis of Catalyst B11

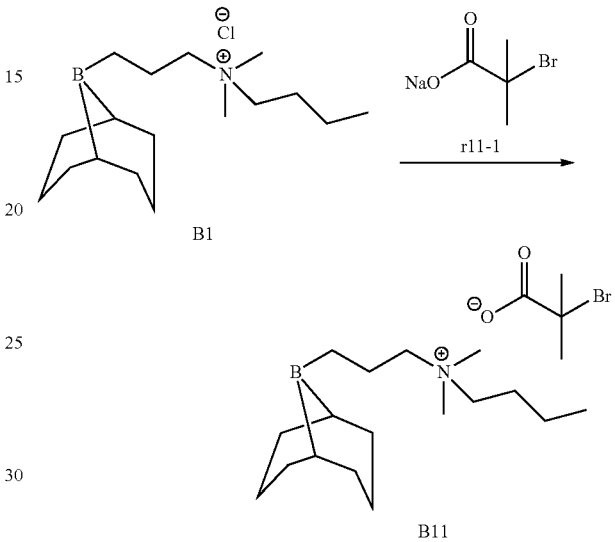

B11

(1) Obtained catalyst B1, as shown in example 1;

(2) In a glove box, 0.1 mol B1 (29.9 g) was dissolved in a 50 ml of dichloromethane, and 0.1 mol r11-1 (18.9 g) was then added. After stirring at 50° C. for 6 hours, draining the solvent and washing with hexane, product B11 with a yield of 86% was obtained.

Example 12: Synthesis of Catalyst B12

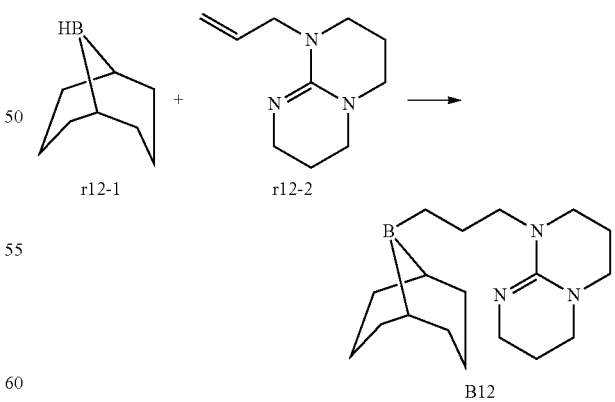

B12

In a glove box, the raw materials r12-1 (12.2 g) and r12-2 (17.9 g) were added to a 100 ml tetrahydrofuran, reacted at 50° C. for 12 h. After draining the solvent, and washing with hexane, the target product B12 was obtained with a yield of 95%.

Application Example 1: Copolymerization of Propylene Oxide with Carbon Dioxide Catalyzed by Catalyst B7

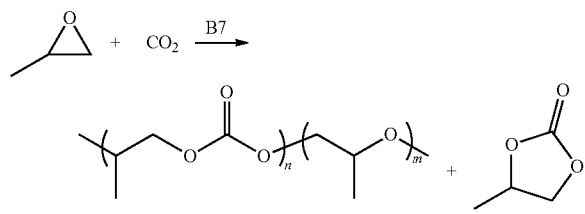

In a glove box, the catalyst B7 (0.01 mmol) prepared in example 7 was added to an autoclave, then propylene oxide (0.01 mol) was added, then 1.5 MPa of $CO_2$ was added to autoclave. The reaction mixture reacted at 80° C. for 2 h. After releasing the unreacted carbon dioxide, the reaction solution was measured by nuclear magnetic resonance to characterize the conversion of monomer and the selectivity of the product. The polymers were precipitated from ethanol and characterized by gel permeation chromatography (GPC). The results of NMR and GPC are shown in Table 1.

Application Example 2: Copolymerization of Cyclohexene Oxide (CHO) with Carbon Dioxide Catalyzed by Catalyst B1

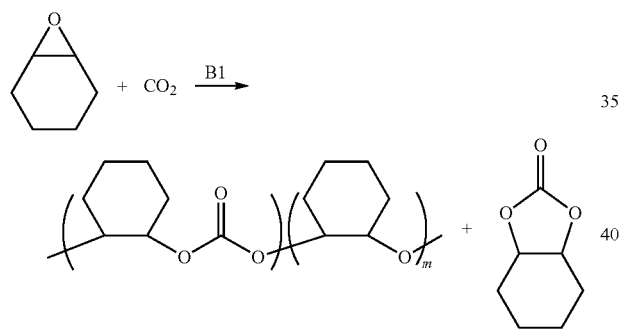

Figure 3:
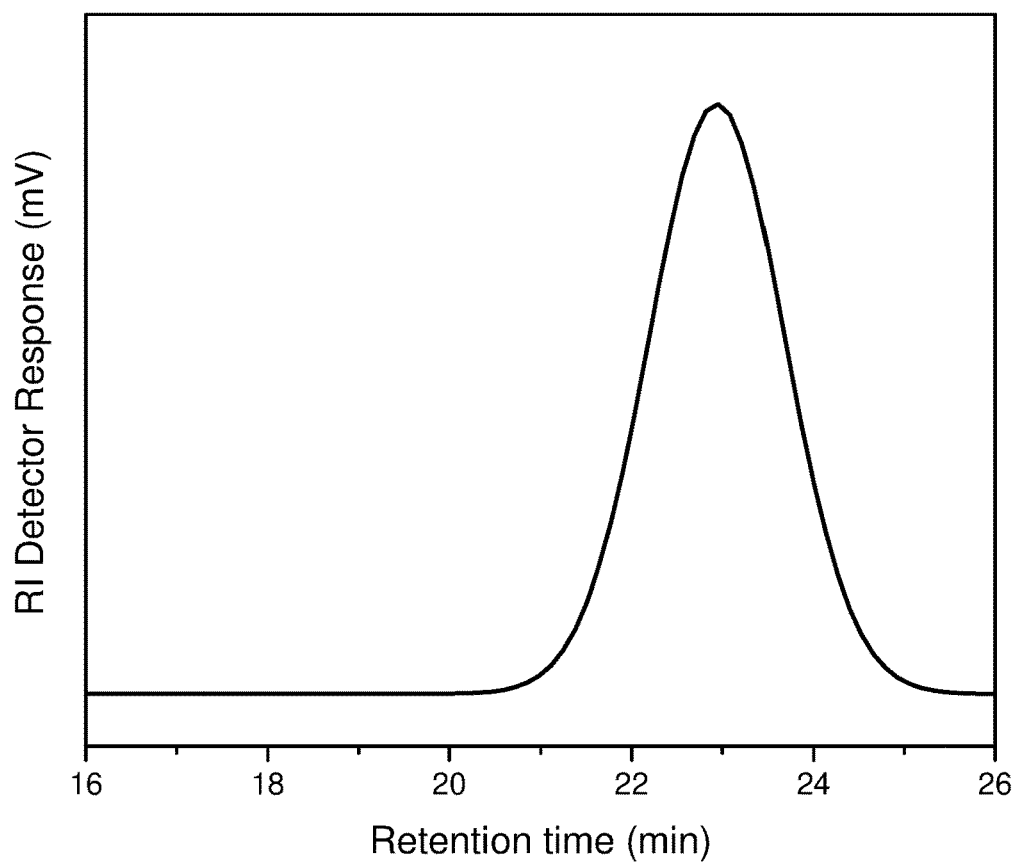
FIG. 3 is the GPC spectrum of polycyclohexene carbonate prepared in application example 2.
Figure 4:
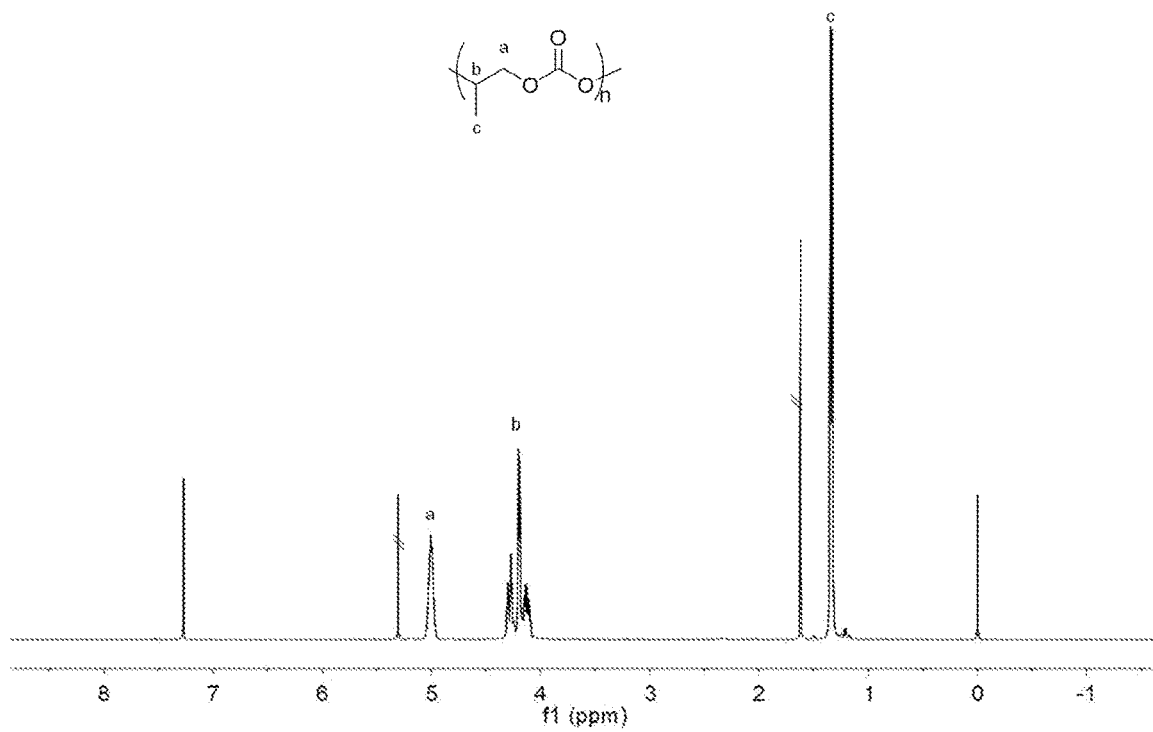
FIG. 4 is the $^1$H NMR spectrum of polypropylene carbonate PPC prepared in application example 21.

In a glove box, the catalyst B1 (0.01 mmol) prepared in example 1 was added to an autoclave, and propylene oxide (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1. The GPC curve of the obtained polymer is shown in FIG. 3.

Application Example 3: Copolymerization of Ethylene Oxide (EO) with Carbon Dioxide Catalyzed by Catalyst B7

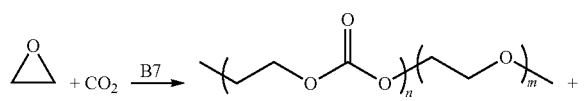

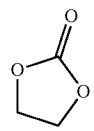

The catalyst B7 (0.01 mmol) prepared in example 7 was added to an autoclave, and EO (0.01 mol) was added. Then, 1.5 MPa of $CO_2$ was added to the autoclave. The reaction mixture reacted at 80° C. for 2 h. The polymers were precipitated from ethanol and characterized by GPC. The characterization results of NMR and GPC are shown in Table 1.

Application Example 4: Copolymerization of Limonene Oxide (LO) with Carbon Dioxide Catalyzed by Catalyst B7

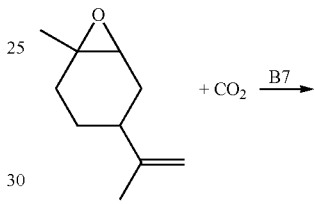

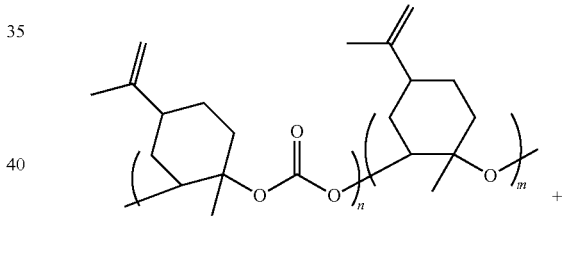

The catalyst B7 (0.01 mmol) prepared in example 7 was added to an autoclave, and LO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 5: Copolymerization of 4-Vinyl Cyclohexene Oxide (VCHO) with Carbon Dioxide Catalyzed by Catalyst B1

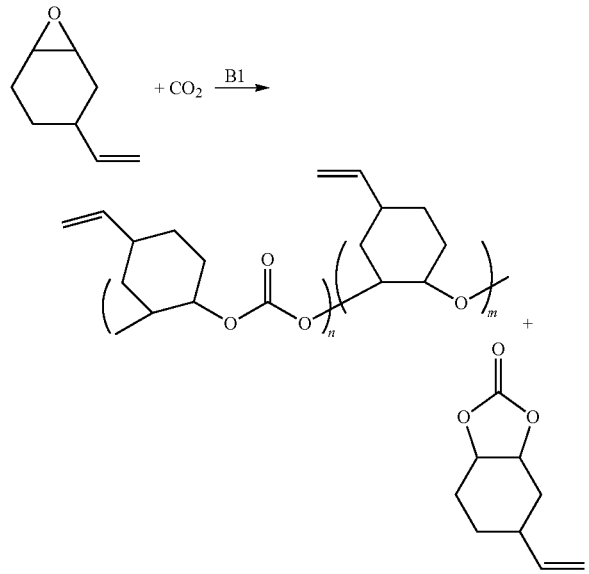

The catalyst B1 (0.01 mmol) prepared in example 1 was added to an autoclave, and VCHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography (GPC). The characterization results of NMR and GPC are shown in Table 1.

Application Example 6: Copolymerization of Cyclohexene Oxide (CHO) with Carbon Dioxide Catalyzed by Catalyst B2

The catalyst B2 (0.01 mmol) prepared in example 2 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 7: Copolymerization of Cyclohexene Oxide (CHO) with Carbon Dioxide Catalyzed by Catalyst B3

The catalyst B3 (0.01 mmol) prepared in example 3 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 8: Copolymerization of Cyclohexene Oxide (CHO) with Carbon Dioxide Catalyzed by Catalyst B4

In a glove box, the catalyst B4 (0.01 mmol) prepared in example 4 was added to an autoclave and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 9: Copolymerization of Cyclohexene Oxide (CHO) with Carbon Dioxide Catalyzed by Catalyst B5

The catalyst B5 (0.01 mmol) prepared in example 5 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 10: Copolymerization of Cyclohexene Oxide (CHO) with Carbon Dioxide Catalyzed by Catalyst B6

The catalyst B6 (0.01 mmol) prepared in example 6 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 11: Copolymerization of Cyclohexene Oxide (CHO) with Carbon Dioxide Catalyzed by Catalyst B7

The catalyst B7 (0.01 mmol) prepared in example 7 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 12: Copolymerization of Cyclohexene Oxide (CHO) with Carbon Dioxide Catalyzed by Catalyst B8

The catalyst B8 (0.01 mmol) prepared in example 8 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 13: Copolymerization of Cyclohexene Oxide (CHO) with Carbon Dioxide Catalyzed by Catalyst B9

The catalyst B9 (0.01 mmol) prepared in example 9 was added to an autoclave, and CHO (0.01 mol) was added. Then 1.5 MPa of $CO_2$ was added to autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 14: Copolymerization of Cyclohexene Oxide (CHO) with Carbon Dioxide Catalyzed by Catalyst B10

The catalyst B10 (0.01 mmol) prepared in example 10 was added to an autoclave, and CHO (0.01 mol) was added. Then 1.5 MPa of $CO_2$ was added to autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 15: Copolymerization of Cyclohexene Oxide (CHO) with Carbon Dioxide Catalyzed by Catalyst B11

The catalyst B11 (0.01 mmol) prepared in example 11 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 16: Copolymerization of Cyclohexene Oxide (CHO) with Carbon Dioxide Catalyzed by Catalyst B12

The catalyst B12 (0.01 mmol) prepared in example 12 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 17: Copolymerization of Cyclohexene Oxide (CHO) with Carbon Dioxide Catalyzed by Catalyst B2

The catalyst B2 (0.1 mmol) prepared in example 2 was added to an autoclave, and CHO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 18: Copolymerization of Cyclohexene Oxide (CHO) with Carbon Dioxide Catalyzed by Catalyst B2

The catalyst B2 (0.01 mmol) prepared in example 2 was added to an autoclave, and CHO (0.05 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 19: Copolymerization of Cyclohexene Oxide (CHO) with Carbon Dioxide Catalyzed by Catalyst B2

The catalyst B2 (0.01 mmol) prepared in example 2 was added to an autoclave, and CHO (0.1 mol) was added. Then 1.5 MPa of $CO_2$ was added to autoclave. The reaction mixture reacted at 80° C. for 8 h. After releasing carbon dioxide, the reaction solution was measured by nuclear magnetic resonance to characterize the conversion of monomer and the selectivity of the product. The polymers were precipitated from ethanol and characterized by gel permeation chromatography (GPC). The characterization results of NMR and GPC are shown in Table 1.

Application Example 20: Copolymerization of Cyclohexene Oxide (CHO) with Carbon Dioxide Catalyzed by Catalyst B2

The catalyst B2 (0.01 mmol) prepared in example 2 was added to an autoclave, and CHO (0.1 mol) was added. Then 1.5 MPa of $CO_2$ was added to autoclave. The reaction mixture reacted at 80° C. for 16 h. After releasing carbon dioxide, the reaction solution was measured by nuclear magnetic resonance to characterize the conversion of monomer and the selectivity of the product. The polymers were precipitated from ethanol and characterized by gel permeation chromatography. The characterization results of NMR and GPC are shown in Table 1.

Application Example 21: Copolymerization of PO with Carbon Dioxide Catalyzed by Catalyst B3

The catalyst B3 (0.01 mmol) prepared in example 3 was added to an autoclave and PO (0.01 mol) was added. Then

Application Example 22: Copolymerization of PO with Carbon Dioxide Catalyzed by Catalyst B3

The catalyst B3 (0.01 mmol) prepared in example 3 was added to an autoclave and PO (0.01 mol) was added. Then 1.5 MPa of $CO_2$ was added to the autoclave. The reaction mixture reacted at 25° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 23: Copolymerization of PO with Carbon Dioxide Catalyzed by Catalyst B3

In a glove box, the catalyst B3 (0.01 mmol) prepared in example 3 was added to an autoclave and PO (0.01 mol) was added. Then 1.5 MPa of $CO_2$ was added to the autoclave. The reaction mixture reacted at 60° C. for 2 h. After releasing carbon dioxide, the reaction solution was measured by nuclear magnetic resonance to characterize the conversion of monomer and the selectivity of the product. The polymer was precipitated from ethanol and characterized by GPC. The characterization results of NMR and GPC are shown in Table 1.

Application Example 24: Copolymerization of PO with Carbon Dioxide Catalyzed by Catalyst B3

The catalyst B3 (0.01 mmol) prepared in example 3 was added to an autoclave and PO (0.01 mol) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 25: Copolymerization of PO with Carbon Dioxide Catalyzed by Catalyst B3

In a glove box, the catalyst B3 (0.01 mmol) prepared in example 3 was added to an autoclave, and PO (0.01 mol) was added. Then 1.5 MPa of $CO_2$ was added to the autoclave. The reaction mixture reacted at 120° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 26: Copolymerization of CHO with Carbon Dioxide Catalyzed by Catalyst B4

The catalyst B4 (0.01 mmol) prepared in example 4 was added to an autoclave, and CHO (0.01 mol) was added. Then 1.5 MPa of $CO_2$ was added to the autoclave. The reaction mixture reacted at 80° C. for 0.5 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 27: Copolymerization of CHO with Carbon Dioxide Catalyzed by Catalyst B4

The catalyst B4 (0.01 mmol) prepared in example 4 was added to an autoclave, and CHO (0.01 mol) was added. Then 1.5 MPa of $CO_2$ was added to the autoclave. The reaction mixture reacted at 80° C. for 1 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 28: Copolymerization of CHO with Carbon Dioxide Catalyzed by Catalyst B4

The catalyst B4 (0.01 mmol) prepared in example 4 was added to an autoclave, and CHO (0.01 mol) was added. Then 1.5 MPa of $CO_2$ was added to the autoclave. The reaction mixture reacted at 80° C. for 4 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 29: Copolymerization of CHO with Carbon Dioxide Catalyzed by Catalyst B5

The catalyst B5 (0.01 mmol) prepared in example 5 was added to the autoclave, and CHO (0.01 mol) as well as 1 mL THF was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 30: Copolymerization of CHO with Carbon Dioxide Catalyzed by Catalyst B5

The catalyst B5 (0.01 mmol) prepared in example 5 was added to an autoclave, and CHO (0.01 mol) as well as toluene (1 mL) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 31: Copolymerization of CHO with Carbon Dioxide Catalyzed by Catalyst B5

The catalyst B5 (0.01 mmol) prepared in example 5 was added to an autoclave and CHO (0.01 mol) as well as $CHCl_3$ (1 mL) was added. Then 1.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 32: Ring-Opening Polymerization of PO Catalyzed by Catalyst B6

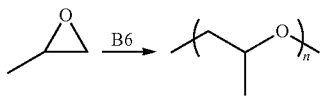

Figure 5:
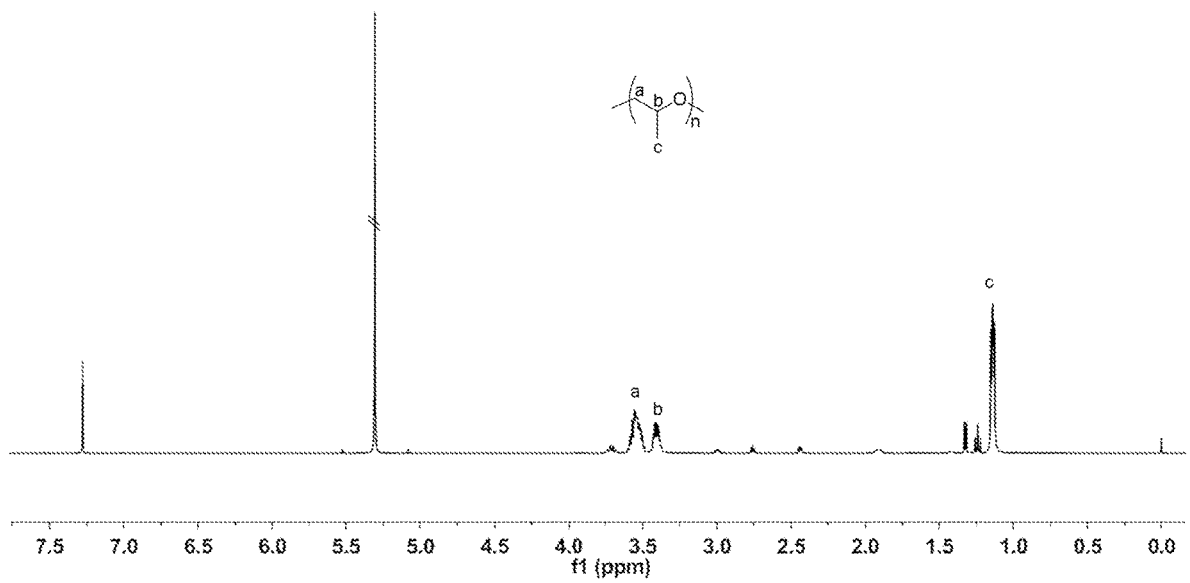
FIG. 5 is the $^1$H NMR spectrum of polyether prepared in application example 32.

The catalyst B6 (0.01 mmol) prepared in example 6 was added to an autoclave, and CHO (0.01 mol) was added. The reaction mixture reacted at 80° C. for 2 h. The reaction solution was measured by nuclear magnetic resonance to characterize the conversion of monomer and the selectivity of the product. After drying, the polymers were characterized by GPC. The characterization results of NMR and GPC are shown in Table 1. The $^1HNMR$ spectrum of the obtained polyether is shown in FIG. 5.

Application Example 33: Copolymerization of PO with Carbon Dioxide Catalyzed by Catalyst B6

The catalyst B6 (0.01 mmol) prepared in example 5 was added to an autoclave, and PO (0.01 mol) was added. Then 0.5 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 34: Copolymerization of PO with Carbon Dioxide Catalyzed by Catalyst B6

The catalyst B6 (0.01 mmol) prepared in example 5 was added to an autoclave, and PO (0.01 mol) was added. Then 1.5 MPa of $CO_2$ was added to autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

Application Example 35: Copolymerization of PO with Carbon Dioxide Catalyzed by Catalyst B6

The catalyst B6 (0.01 mmol) prepared in example 5 was added to an autoclave and PO (0.01 mol) was added. Then 3.0 MPa of $CO_2$ was added to the autoclave. The reaction mixture reacted at 80° C. for 2 h. After releasing carbon dioxide, the reaction solution was measured by nuclear magnetic resonance to characterize the conversion of monomer and the selectivity of the product. The polymers were precipitated from ethanol and characterized by GPC. The characterization results of NMR and GPC are shown in Table 1.

TABLE 1 the test results of the polymerization products of application examples 1-35.

| Application example | Epoxide | Catalyst | Ratio (cat./epo.) | $pco_2$ (MPa) | T (° C.) | Solvent | Time (h) | Conversion of epoxide (%) | Selectivity of polyethers (%) | Selectivity of polycarbonates (%) | Selectivity of cyclic carbonates (%) | $M_n^1$ (kg/mol) | $PDI^2$ |
|---|---|---|---|---|---|---|---|---|---|---|---|---|---|
| 1 | PO | B7 | 1:1000 | 1.5 | 80 | — | 2 | 48 | 5 | 20 | 75 | 21.1 | 1.09 |
| 2 | CHO | B1 | 1:1000 | 1.5 | 80 | — | 2 | 80 | 2 | 98 | 0 | 72.6 | 1.09 |
| 3 | EO | B7 | 1:1000 | 1.5 | 80 | — | 2 | 82 | 1 | 53 | 46 | 22.5 | 1.07 |
| 4 | LO | B7 | 1:1000 | 1.5 | 80 | — | 2 | 75 | 5 | 87 | 8 | 35.9 | 1.06 |
| 5 | VCHO | B1 | 1:1000 | 1.5 | 80 | — | 2 | 81 | 3 | 95 | 2 | 81.2 | 1.10 |
| 6 | CHO | B2 | 1:1000 | 1.5 | 80 | — | 2 | 78 | 1 | 99 | 0 | 76.9 | 1.18 |
| 7 | CHO | B3 | 1:1000 | 1.5 | 80 | — | 2 | 85 | 20 | 65 | 15 | 68.5 | 1.17 |
| 8 | CHO | B4 | 1:1000 | 1.5 | 80 | — | 2 | 72 | 3 | 95 | 2 | 69.8 | 1.06 |
| 9 | CHO | B5 | 1:1000 | 1.5 | 80 | — | 2 | 88 | 5 | 91 | 4 | 61.5 | 1.13 |
| 10 | CHO | B6 | 1:1000 | 1.5 | 80 | — | 2 | 62 | 30 | 70 | 0 | 69.2 | 1.08 |
| 11 | CHO | B7 | 1:1000 | 1.5 | 80 | — | 2 | 85 | 10 | 89 | 1 | 59.7 | 1.06 |
| 12 | CHO | B8 | 1:1000 | 1.5 | 80 | — | 2 | 55 | 54 | 36 | 10 | 56.2 | 1.08 |
| 13 | CHO | B9 | 1:1000 | 1.5 | 80 | — | 2 | 84 | 22 | 78 | 0 | 61.2 | 1.11 |
| 14 | CHO | B10 | 1:1000 | 1.5 | 80 | — | 2 | 76 | 1 | 99 | 0 | 62.4 | 1.12 |
| 15 | CHO | B11 | 1:1000 | 1.5 | 80 | — | 2 | 79 | 11 | 88 | 1 | 71.3 | 1.14 |
| 16 | CHO | B12 | 1:1000 | 1.5 | 80 | — | 2 | 87 | 1 | 99 | 0 | 70.6 | 1.09 |
| 17 | CHO | B2 | 1:100 | 1.5 | 80 | — | 2 | 96 | 9 | 91 | 0 | 15.2 | 1.10 |
| 18 | CHO | B2 | 1:5000 | 1.5 | 80 | — | 2 | 72 | 1 | 99 | 0 | 65.3 | 1.09 |
| 19 | CHO | B2 | 1:10000 | 1.5 | 80 | — | 8 | 58 | 1 | 99 | 0 | 64.1 | 1.15 |
| 20 | CHO | B2 | 1:50000 | 1.5 | 80 | — | 16 | 33 | 1 | 99 | 0 | 58.9 | 1.18 |

TABLE 1-continued the test results of the polymerization products of application examples 1-35.

| Application example | Epoxide | Catalyst | Ratio (cat./epo.) | pco$_2$ (MPa) | T (° C.) | Solvent | Time (h) | Conversion of epoxide (%) | Selectivity of polyethers (%) | Selectivity of polycarbonates (%) | Selectivity of cyclic carbonates (%) | M$_n$[1] (kg/mol) | PDI[2] |
|---|---|---|---|---|---|---|---|---|---|---|---|---|---|
| 21 | PO | B3 | 1:1000 | 1.5 | 0 | — | 2 | 30 | 1 | 93 | 6 | 25.6 | 1.17 |
| 22 | PO | B3 | 1:1000 | 1.5 | 25 | — | 2 | 65 | 8 | 81 | 11 | 42.8 | 1.11 |
| 23 | PO | B3 | 1:1000 | 1.5 | 60 | — | 2 | 85 | 30 | 40 | 30 | 40.9 | 1.16 |
| 24 | PO | B3 | 1:1000 | 1.5 | 80 | — | 2 | 98 | 25 | 30 | 45 | 36.8 | 1.15 |
| 25 | PO | B3 | 1:1000 | 1.5 | 120 | — | 2 | 99 | 2 | 3 | 95 | 1.59 | 1.09 |
| 26 | CHO | B4 | 1:1000 | 1.5 | 80 | — | 0.5 | 35 | 10 | 89 | 1 | 45.6 | 1.08 |
| 27 | CHO | B4 | 1:1000 | 1.5 | 80 | — | 1 | 55 | 5 | 93 | 2 | 51.6 | 1.08 |
| 28 | CHO | B4 | 1:1000 | 1.5 | 80 | — | 4 | 76 | 2 | 97 | 1 | 71.4 | 1.05 |
| 29 | CHO | B5 | 1:1000 | 1.5 | 80 | THF | 2 | 86 | 6 | 90 | 4 | 76.9 | 1.12 |
| 30 | CHO | B5 | 1:1000 | 1.5 | 80 | Toluene | 2 | 75 | 4 | 92 | 4 | 73.5 | 1.09 |
| 31 | CHO | B5 | 1:1000 | 1.5 | 80 | CHCl$_3$ | 2 | 82 | 5 | 92 | 3 | 74.8 | 1.09 |
| 32 | PO | B6 | 1:1000 | 0 | 80 | — | 2 | 85 | 100 | 0 | 0 | 41.6 | 1.14 |
| 33 | PO | B6 | 1:1000 | 0.5 | 80 | — | 2 | 98 | 60 | 40 | 0 | 51.9 | 1.16 |
| 34 | PO | B6 | 1:1000 | 1.5 | 80 | — | 2 | 99 | 52 | 48 | 0 | 53.7 | 1.18 |
| 35 | PO | B6 | 1:1000 | 3.0 | 80 | — | 2 | 97 | 25 | 75 | 0 | 56.6 | 1.14 |

[1]M$_n$: Number-average molecular weight, measured by gel permeation chromatography;
[2]PDI: molecular weight distribution, measured by GPC.

Application Example 36: Preparation of Poly(Cyclohexene Carbonate) (PCHC) Using Catalyst B7 and Chain Transfer Agents

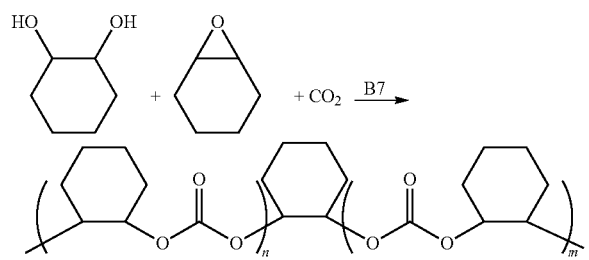

Figure 6:
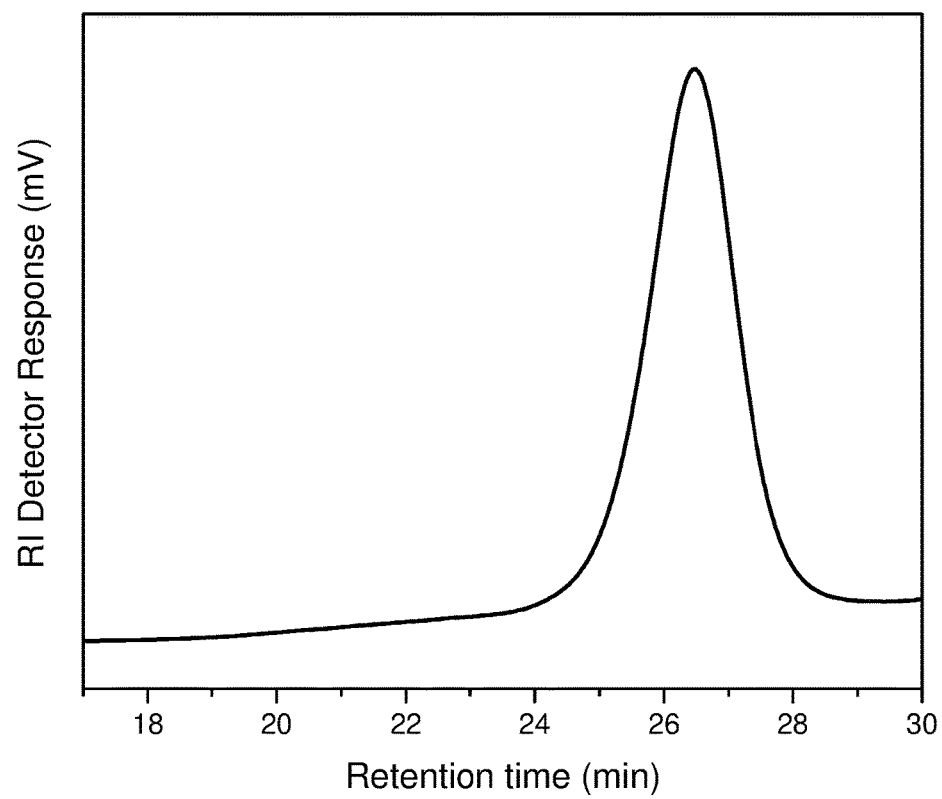
FIG. 6 is the GPC diagram of polycyclohexene carbonate prepared in application example 36.

The catalyst B7 (0.02 mmol) prepared in example 7 was added to an autoclave, cyclohexanediol (0.20 mmol) was added as a chain transfer agent. Then epoxy cyclohexene (0.02 mol) was added, filled with CO$_2$ of 1.5 MPa and reacted at 80° C. for 24 h. Then carbon dioxide was released and the polymers were precipitated in ethanol. After drying, the polymers were characterized by NMR and GPC. The GPC spectrum of polycarbonates is shown in FIG. 6, the number-average molecular weight was 11.5 kg/mol with a PDI of 1.02.

Application Example 37: Preparation of Poly(Cyclohexene Carbonate)-Block-Poly(Propylene Glycol) Block Copolymers Using B7 as Catalyst and Poly(Propylene Oxide) as Macromolecular Chain Transfer Agents

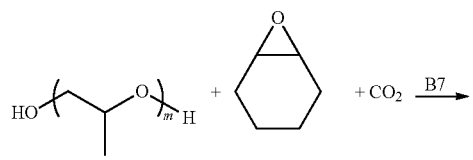

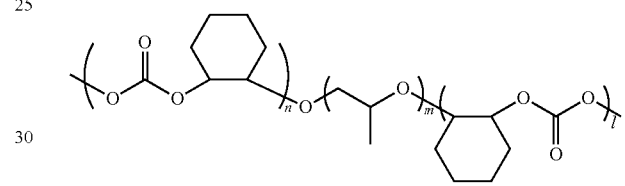

The catalyst B7 (0.02 mmol) prepared in example 7 was added to an autoclave. Then polypropylene glycol (0.20 mmol) was added as a chain transfer agent and CHO (0.02 mol) was added to the autoclave. After addition of 1.5 MPa CO$_2$, and the reaction was conducted at 80° C. for 24 h. Carbon dioxide was released before precipitating the polymer in ethanol, and the polymers were characterized by nuclear magnetic and GPC after drying

Application Example 38: Preparation of Poly(Cyclohexene Succinate) with Catalyst B10

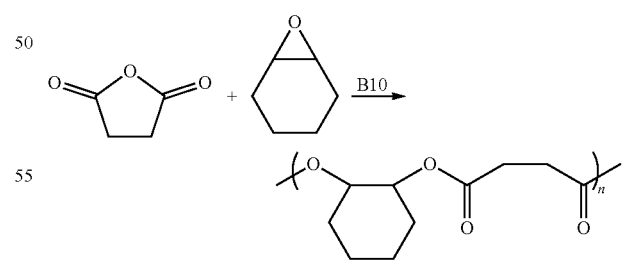

Figure 7:
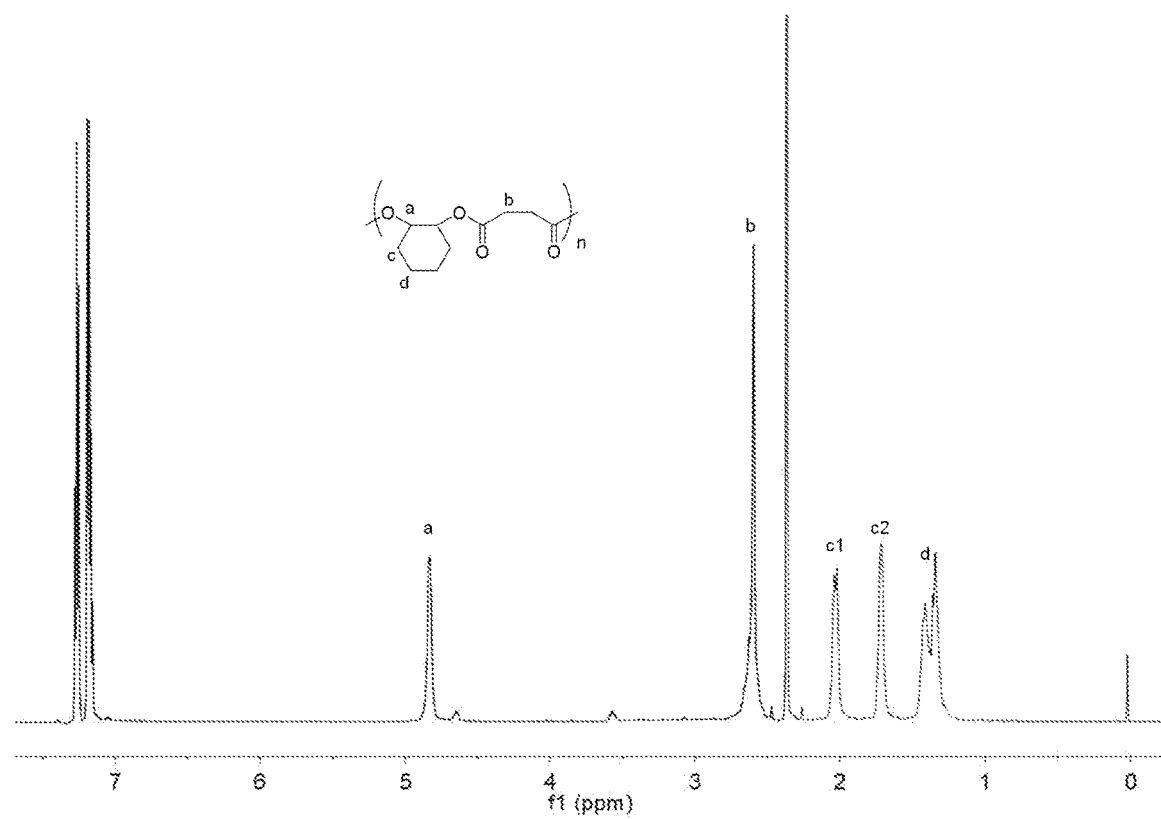
FIG. 7 is the $^1$H NMR spectrum of polycyclohexene succinate prepared in application example 38.

The catalyst B10 (0.01 mmol) prepared in example 10 was added into a pressure bottle, followed by addition of CHO (0.01 mol) and succinic anhydride (0.01 mol). The reaction was then conducted at 60° C. for 24 hours. The polymer was precipitated in petroleum ether and dried to obtain poly(cyclohexene succinate)s. The nuclear magnetism of the resulting polymer is shown in FIG. 7.

Application Example 39: Preparation of Poly(Propylene Maleate) with Catalyst B10

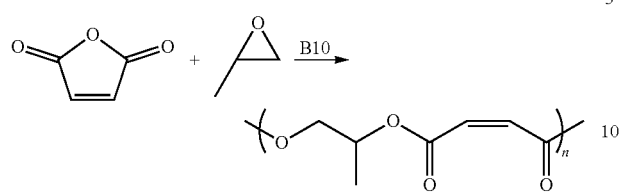

The catalyst B10 (10.01 mmol) prepared in example 10 was added to a pressure bottle, followed by addition of PO (0.01 mol) and maleic anhydride (0.01 mol), and the reaction was conducted at 60° C. for 24 hours. After the polymer was precipitated in petroleum ether and dried, poly(propylene maleate)s were obtained.

Application Example 40: Preparation of Poly(Cyclohexene Carbonate)-Block-Poly(Cyclohexene Succinate) Block Copolymers Using Catalyst B10

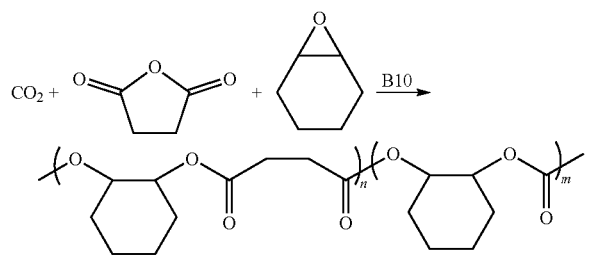

Figure 8:
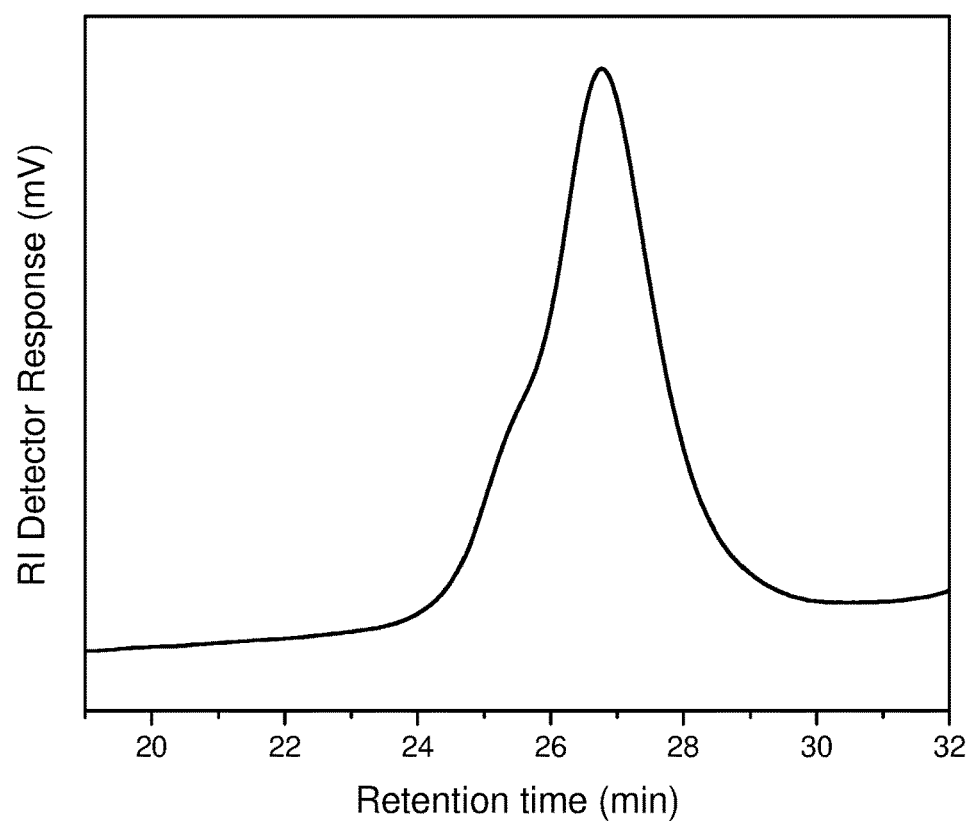
FIG. 8 is the GPC spectrum of polycyclohexene carbonate-polycyclohexene succinate block copolymer prepared in application example 40.

The catalyst B10 (0.02 mmol) prepared in example 10 was added to an autoclave, followed by addition of CHO (0.01 mol) and succinic acid (2 mmol). The reaction was conducted at 100° C. for 12 h, after addition of 0.8 Mpa of $CO_2$. Then carbon dioxide was released and the polymers were precipitated in ethanol. After drying, the polymers were characterized by NMR and GPC. The GPC spectrum of the block copolymer is shown in FIG. 8, wherein the $M_n$ of the polymer was 15.6 kg/mol and PDI was 1.19.

Application Example 41: Preparation of Poly(Monothiocarbonate) with Catalyst B10

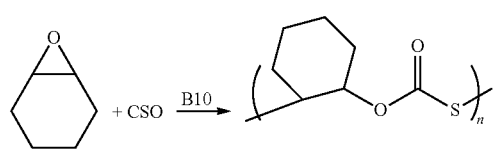

The catalyst B10 (0.02 mmol) prepared in example 10 was added to an autoclave. After addition of CHO (0.01 mol) and COS (1 MPa), the reaction was conducted at 70° C. for 2 h. Then the COS was released, the polymer was precipitated in ethanol, and the poly(monothiocarbonate)s could be obtained after drying.

Application Example 42: Preparation of Polylactide with Catalyst B12

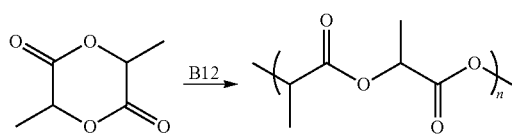

Figure 9:
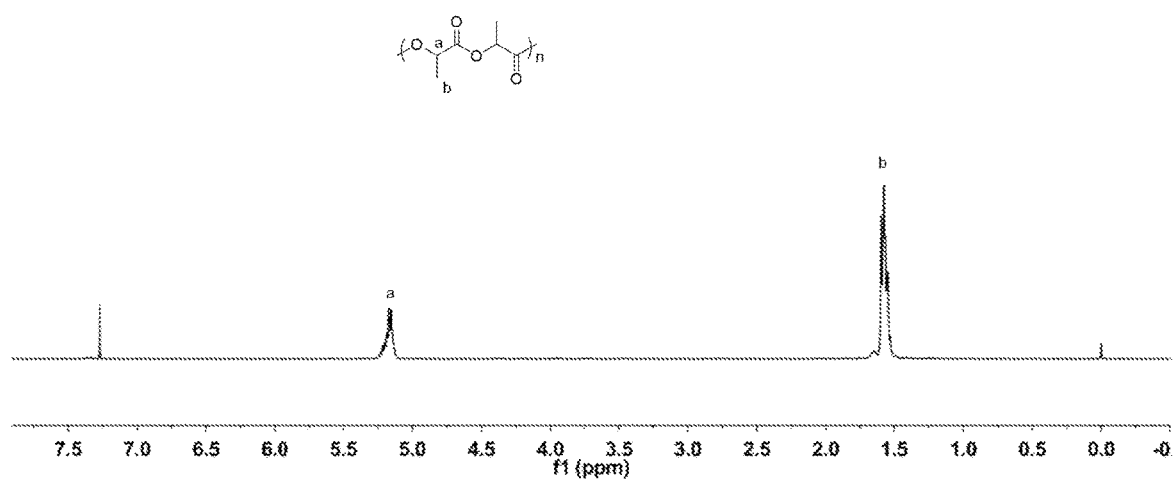
FIG. 9 is the $^1$H NMR spectrum of polylactide prepared in application example 42.

The catalyst B12 (0.02 mmol) prepared in example 12 was added to an autoclaved. After addition of lactide (0.01 mol) and 5 ml chloroform, the reaction was conducted at 50° C. for 2 h. Polylactide could be obtained by precipitation of reaction mixture in ethanol. The nuclear magnetism of the polylactide obtained is shown in FIG. 9.

Application Example 43: Preparation of Polyphosphate with Catalyst B12

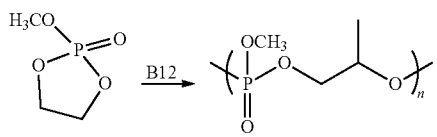

Figure 10:
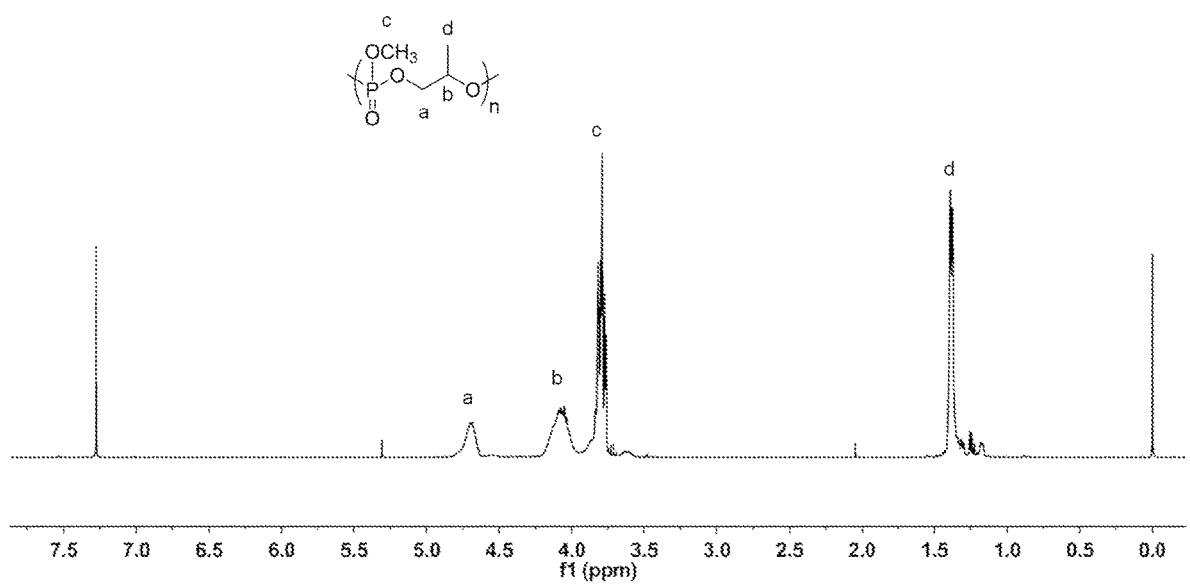
FIG. 10 is the $^1$H NMR spectrum of polyphosphate prepared in application example 43.

The catalyst B12 (0.02 mmol) prepared in example 12 was added to a pressure bottle. After addition of phosphate ester (0.01 mol) and 5 ml chloroform, the reaction was conducted at 50° C. for 3 h. After the polymers were precipitated in ethanol and dried, poly(phosphate ester)s could be obtained. The nuclear magnetism of the resulting polyphosphate ester is shown in FIG. 10.

Application Example 44: Preparation of Polyphosphate-Block-Poly(Propylene Carbonate) Block Copolymer Using Catalyst B12

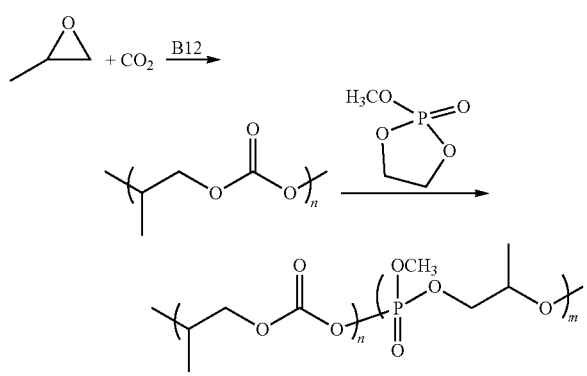

Figure 11:
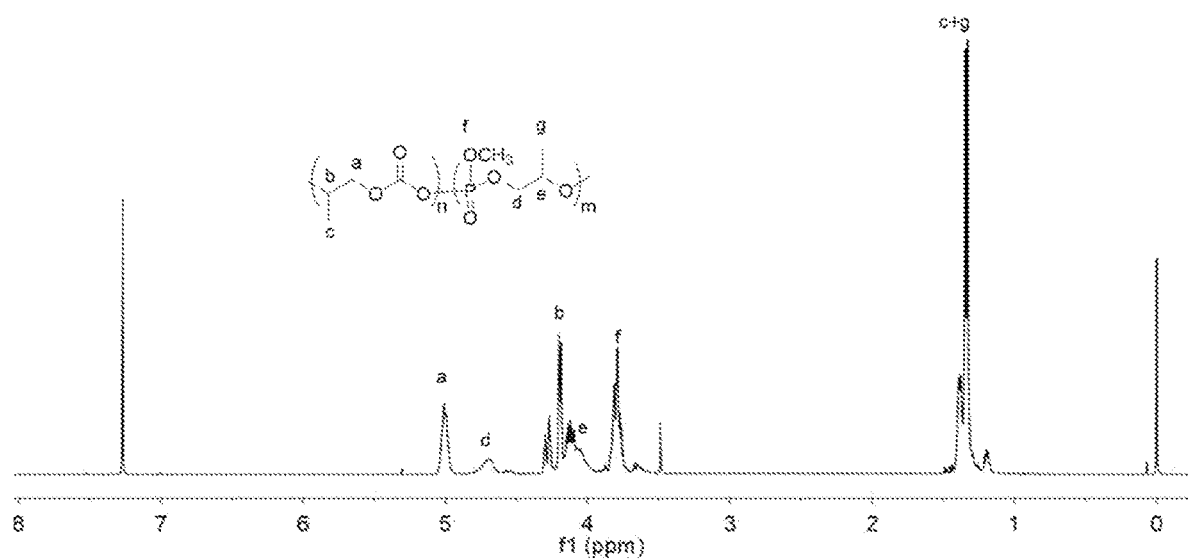
FIG. 11 is the $^1$H NMR spectrum of polyphosphate-polycarbonate block copolymer prepared in application example 44.

The catalyst B12 (0.01 mmol) prepared in example 12 was added to an autoclave. After adding PO (0.01 mol) and filling with 1.5 MPa of $CO_2$, the reaction was conducted at 80° C. for 2 h. Then carbon dioxide was released, phosphate ester (0.01 mol) was added in sequence in a glove box, and the reaction was conducted at 50° C. for 3 h. The reaction liquid was used to measure the nuclear magnetism to characterize the monomer conversion. The polymers were then precipitated from petroleum ether. After drying, the polymers were characterized by GPC. The nuclear magnetism of the resulting poly (phosphate)-block-poly (propylene carbonate) block copolymers is shown in FIG. 11.

The invention claimed is:

1. An organic metal-free catalyst with electrophilic and nucleophilic dual-functions, which has the chemical structures shown in the formula (I)

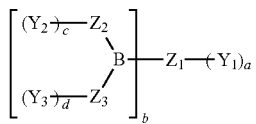
(I)

wherein each set of the substituents of $Y_1 \sim Y_3$ were independently selected from the following structural formulas 1~5:

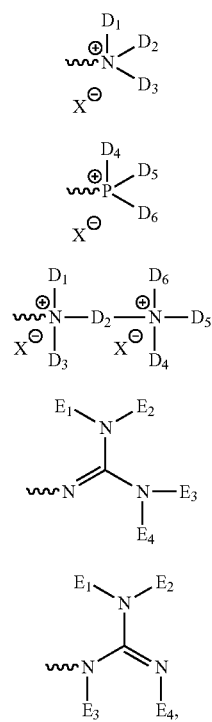

wherein each $D_1 \sim D_6$ is represented independently as

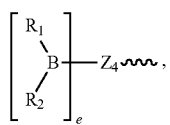

wherein B represents boron atom, N represents nitrogen atom, P represents phosphorus atom, and ⌇⌇⌇ represents connecting point;

each a and b is independently selected from the integers of 0~20, but cannot be equal to 0 at the same time; each c, d, and e is independently selected from the integers of 0~20; b cannot be equal to 0, when a=0; e cannot be equal to 0, when b=0;

each set of the substituents of $Z_1 \sim Z_4$, $R_1 \sim R_2$, $E_1 \sim E_4$ are independently selected from the group containing substituted and unsubstituted $C_1$-$C_{30}$ alkyl, $C_3$-$C_{30}$ alkenyl, $C_3$-$C_{30}$ alkynyl, $C_6$-$C_{30}$ aryl, and $C_5$-$C_{30}$ heteroaryl, any of which may be heteroatom (O, S, N, Si, and P)-containing; any two or more of the substituents of $Z_1 \sim Z_4$, $R_1 \sim R_2$, $E_1 \sim E_4$ may from bonds or rings; but the proviso is that $Z_1$ cannot be the aromatic group of $C_6$ when a=1; $Z_2$ cannot be the aromatic group of $C_6$ when c=1; $Z_3$ cannot be the aromatic group of $C_6$ when d=1; $Z_1$, $Z_2$, $Z_3$, $Z_4$, $R_1$, and $R_2$ cannot be the substituted or non-substituted aromatic groups at the same time; each set of $D_1 \sim D_3$ and $D_4 \sim D_6$ cannot be substituted or non-substituted aromatic groups of $C_6$-$C_{10}$ at the same time;

each $X^\ominus$ represents a negative ion; each $X^\ominus$ exists independently in the form of a single negative ion, or each $X^\ominus$ is connected with one or more of $D_1 \sim D_6$ in the form of covalent bond.

2. The catalyst of claim 1, wherein each $X^\ominus$ is independently selected from one or more of ions of $F^\ominus$, $Cl^\ominus$, $Br^\ominus$, $I^\ominus$, $OH^\ominus$, $NO_3^\ominus$, $N_3^\ominus$, $BF_4^\ominus$, $(C_6F_5)_4B^\ominus$, sulfonate, perchlorate, chlorate, phosphate, carboxylate, alkoxylate, and phenoxylate.

3. The catalyst of claim 1, wherein the organic metal-free catalyst with electrophilic and nucleophilic dual-functions has one of the following structures:

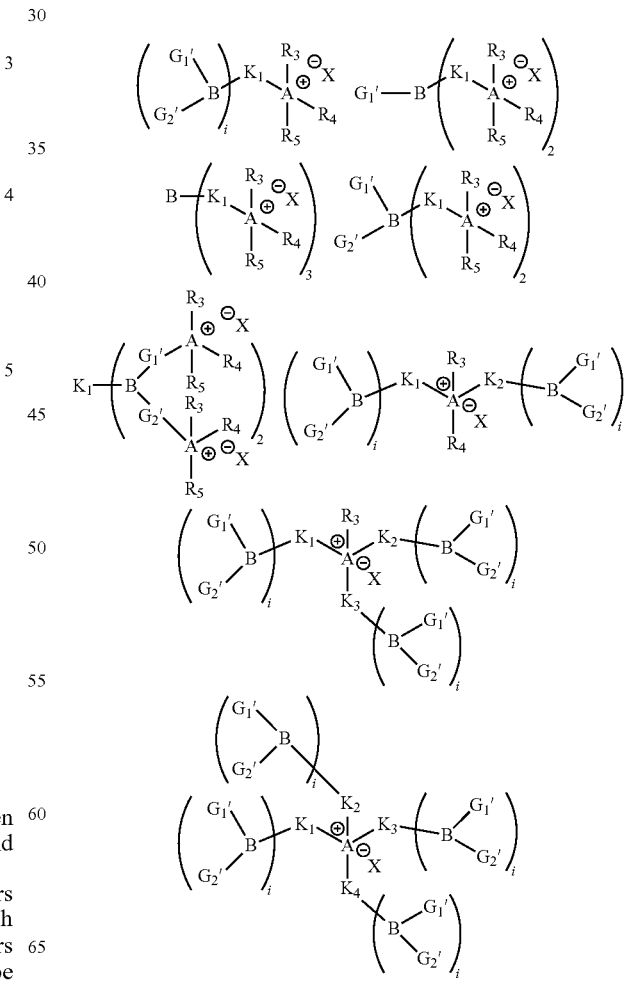

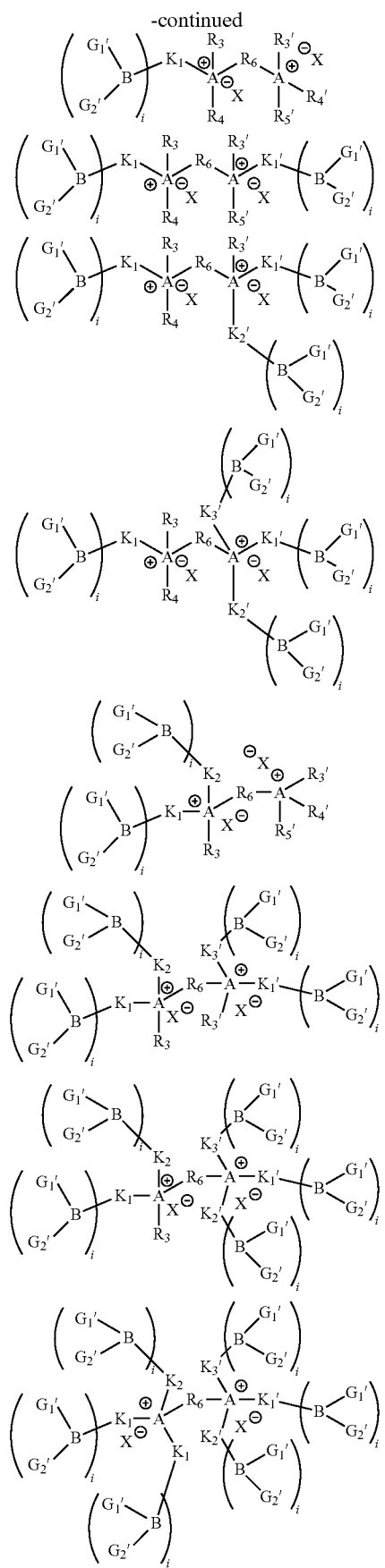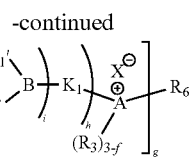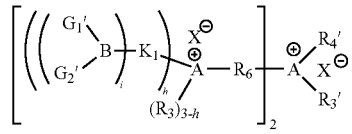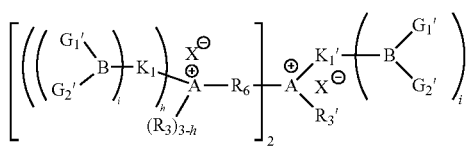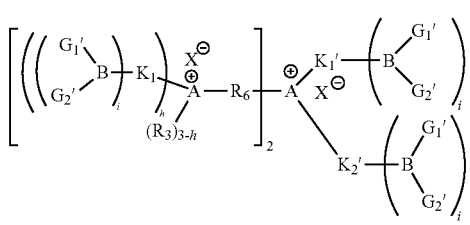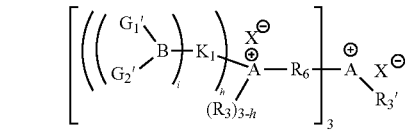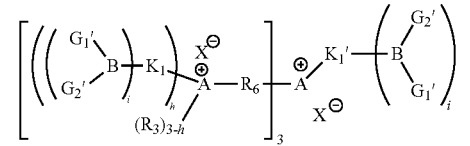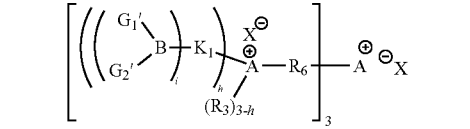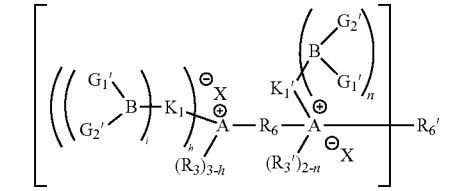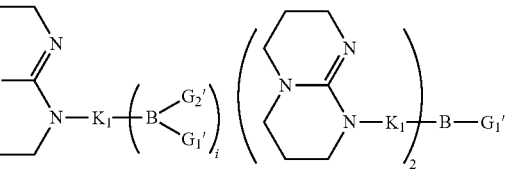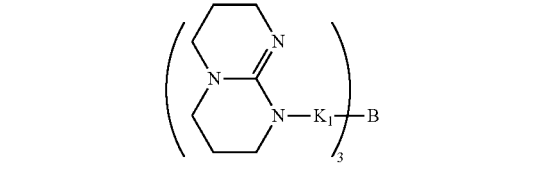

wherein,
   i is independently selected from 1 or 2;
   each f is an integer independently selected from 0 to 3, but in any structure f cannot be 0 at the same time;
   g is an integer independently selected from 3 to 20;
   each h is an integer independently selected from 0 to 3, but in any structure h cannot be 0 at the same time;
   each n is an integer independently selected from 0 to 2;
   each $K_1$ is independently selected from the group containing substituted and unsubstituted $C_1$-$C_{30}$ alkyl, $C_3$-$C_{30}$ alkenyl, $C_3$-$C_{30}$ alkynyl, $C_7$-$C_{30}$ aryl, and $C_5$-$C_{30}$ heteroaryl, or the group containing one or more of O, S, N, Si and P atoms, provided that any two or more $K_1$ may form bond or ring;
   each set of the substituents of $R_3$~$R_6$, $K_2$~$K_4$, and $K_1'$~$K_3'$ are independently selected the group containing substituted and unsubstituted $C_1$-$C_{30}$ alkyl, $C_3$-$C_{30}$ alkenyl, $C_3$-$C_{30}$ alkynyl, $C_6$-$C_{30}$ aryl, and $C_5$-$C_{30}$ heteroaryl, or the group containing one or more of O, S, N, Si and P atoms;
   any two or more of the substituents of $K_1$~$K_4$, $K_1'$~$K_3'$, $R_3$~$R_6$, $R_3'$~$R_6'$ may form bond or ring; but the proviso is that $R_3$~$R_5$ cannot be equal to aromatic group in a structure at the same time; and $R_3$~$R_{5'}$ cannot be equal to aromatic group or heteroaromatic group in a structure;
   A is selected from N or P atom;
   each set of the substituents of $G_1'$ and $G_2'$ are independently selected from the group containing substituted and unsubstituted $C_1$-$C_{30}$ alkyl, $C_3$-$C_{30}$ alkenyl, $C_3$-$C_{30}$ alkynyl, $C_6$-$C_{30}$ aryl, $C_3$-$C_{30}$ heterocyclic, and $C_5$-$C_{30}$ heteroaryl, or the group containing one or more of O, S, N, Si and P atoms;
   any two or more of the substituents of $G_1'$ and $G_2'$ may form bond or ring; but the proviso is that $G_1'$, $G_2'$ and $K_1$ (or $G_1'$, $G_2'$ and $K_2$) cannot be equal to substituted or non-substituted aromatic groups or heteroaromatic groups in a structure at the same time;
   each $X^\ominus$ represents a negative ion; each $X^\ominus$ exists independently in the form of a single negative ion, or each $X^\ominus$ is connected with one or more of $R_3$~$R_6$ and $R_3'$~$R_6'$ in the form of covalent bond.

4. The catalyst of claim 3, wherein $G_1'$~ and $G_2'$~ are independently selected from the following structures:

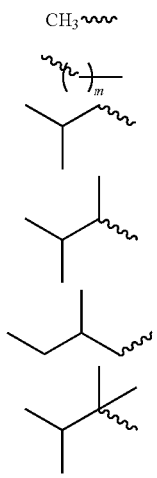

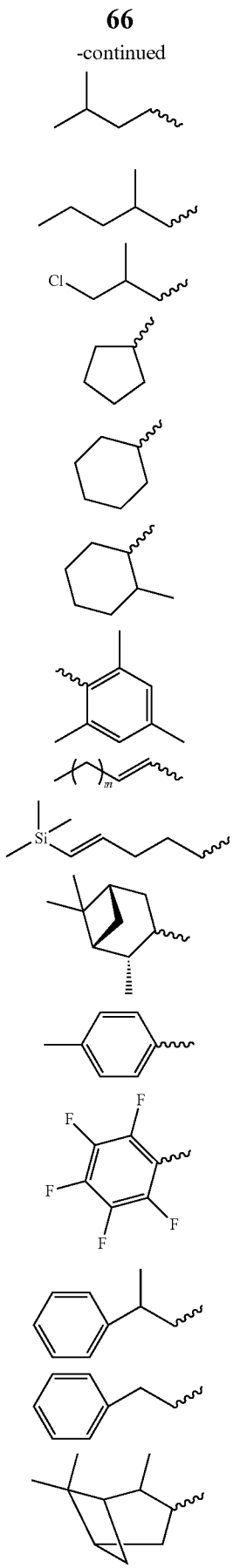

-continued
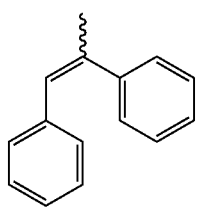
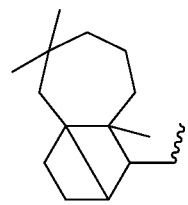
wherein the ∿∿∿ represents the connected point, and each m is an integer independently selected from 1 to 18.
5. The catalyst of claim 3, wherein each
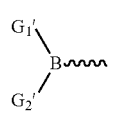
is independently selected from the following structures:
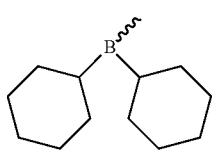
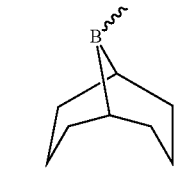
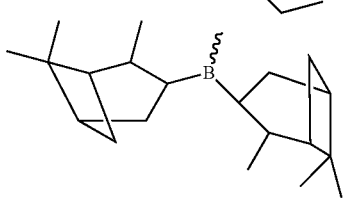
-continued
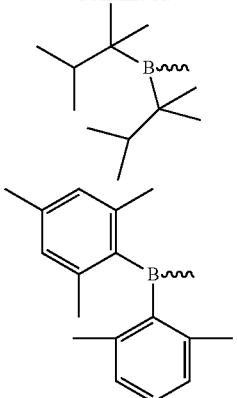
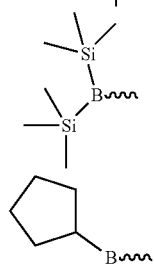
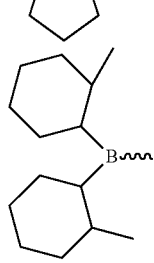
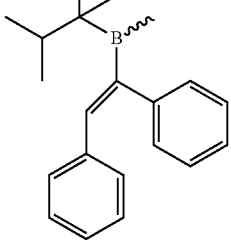
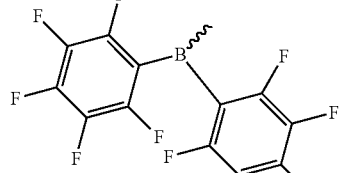
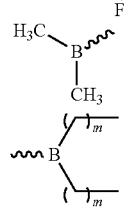

-continued

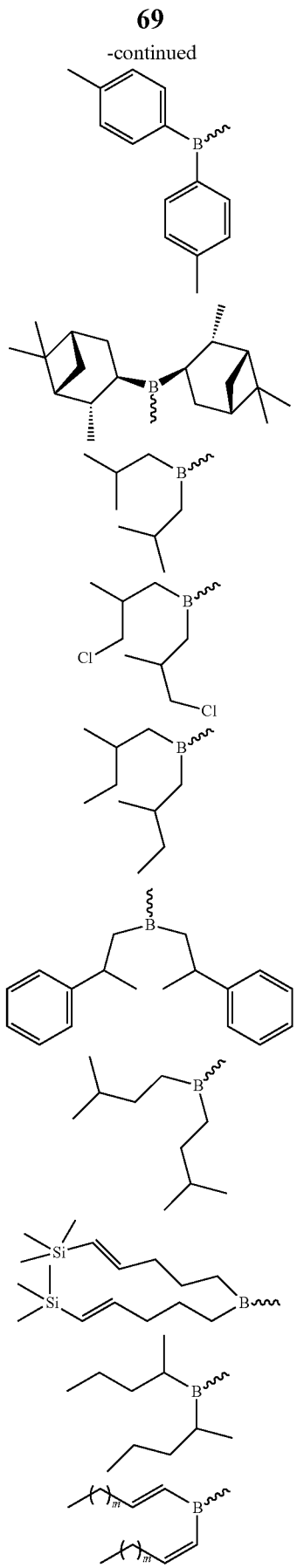

-continued

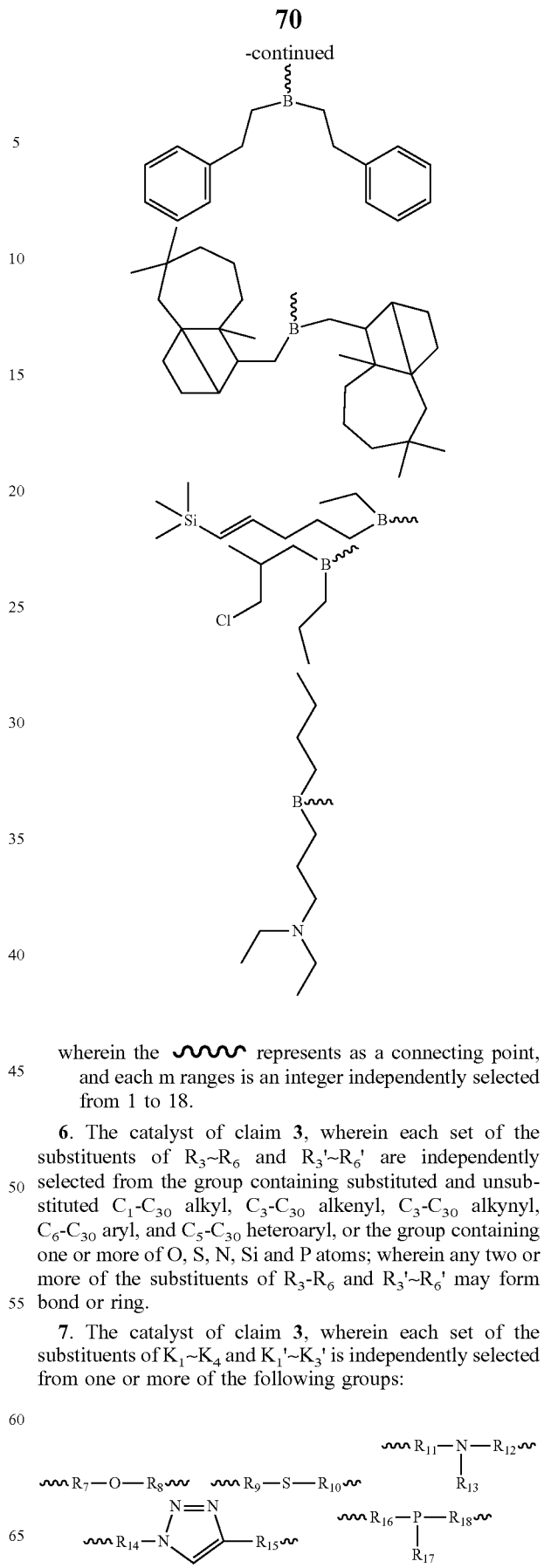

wherein the ⁓⁓⁓ represents as a connecting point, and each m ranges is an integer independently selected from 1 to 18.

6. The catalyst of claim 3, wherein each set of the substituents of $R_3$~$R_6$ and $R_3'$~$R_6'$ are independently selected from the group containing substituted and unsubstituted $C_1$-$C_{30}$ alkyl, $C_3$-$C_{30}$ alkenyl, $C_3$-$C_{30}$ alkynyl, $C_6$-$C_{30}$ aryl, and $C_5$-$C_{30}$ heteroaryl, or the group containing one or more of O, S, N, Si and P atoms; wherein any two or more of the substituents of $R_3$-$R_6$ and $R_3'$~$R_6'$ may form bond or ring.

7. The catalyst of claim 3, wherein each set of the substituents of $K_1$~$K_4$ and $K_1'$~$K_3'$ is independently selected from one or more of the following groups:

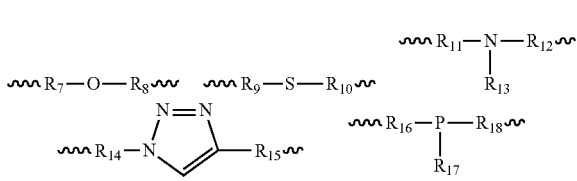

-continued

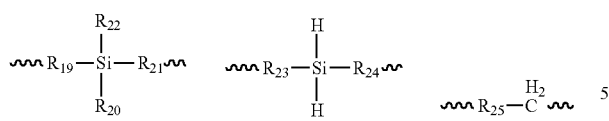

wherein each set of the substituents of $R_7$~$R_{25}$ are independently selected the group containing substituted and unsubstituted $C_1$-$C_{18}$ alkyl, $C_3$-$C_{18}$ alkenyl, $C_3$-$C_{18}$ alkynyl, $C_6$-$C_{18}$ aryl, and $C_5$-$C_{18}$ heteroaryl, or the group containing one or more of O, S, N, Si and P atoms; wherein any two or more of the substituents of $R_7$-$R_{25}$ may form bond or ring.

8. The catalyst of claim 3, wherein the catalyst has the structure

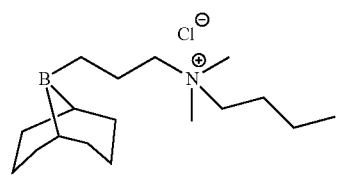

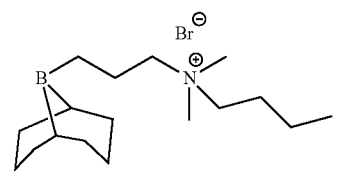

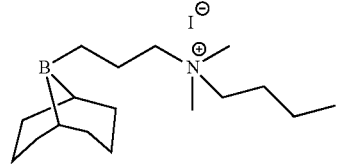

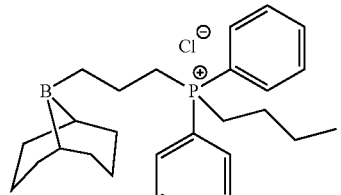

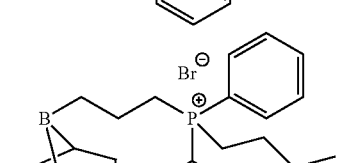

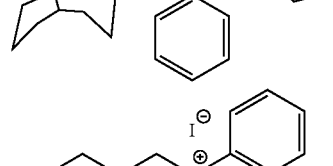

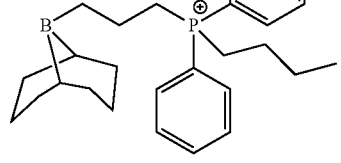

-continued

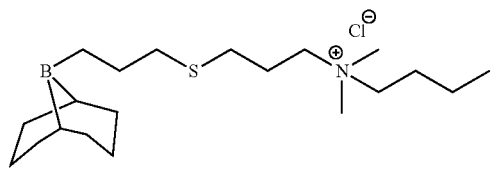

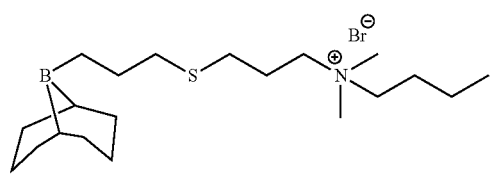

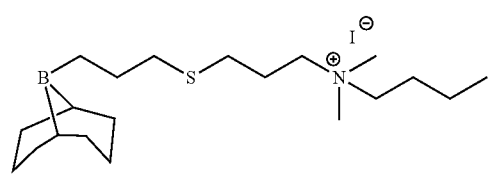

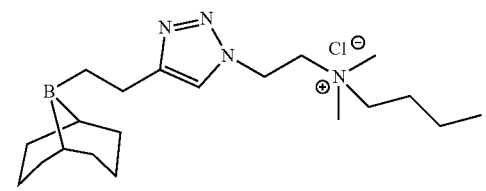

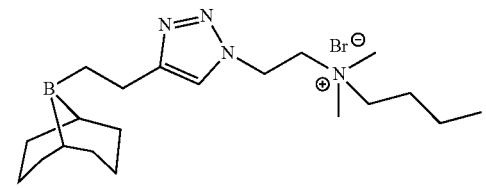

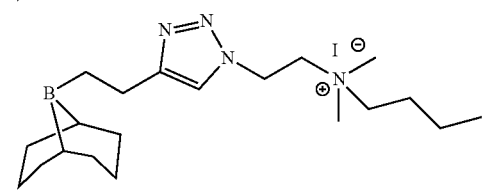

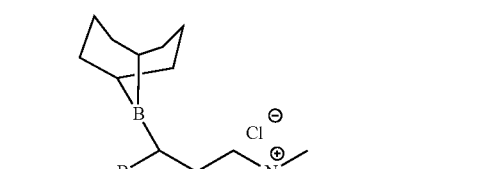

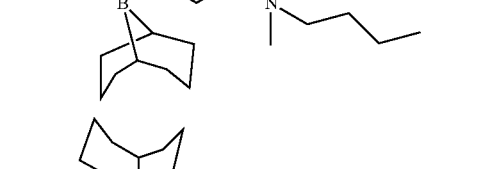

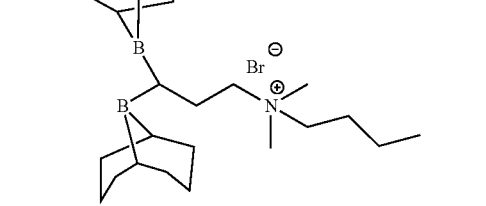

73
-continued

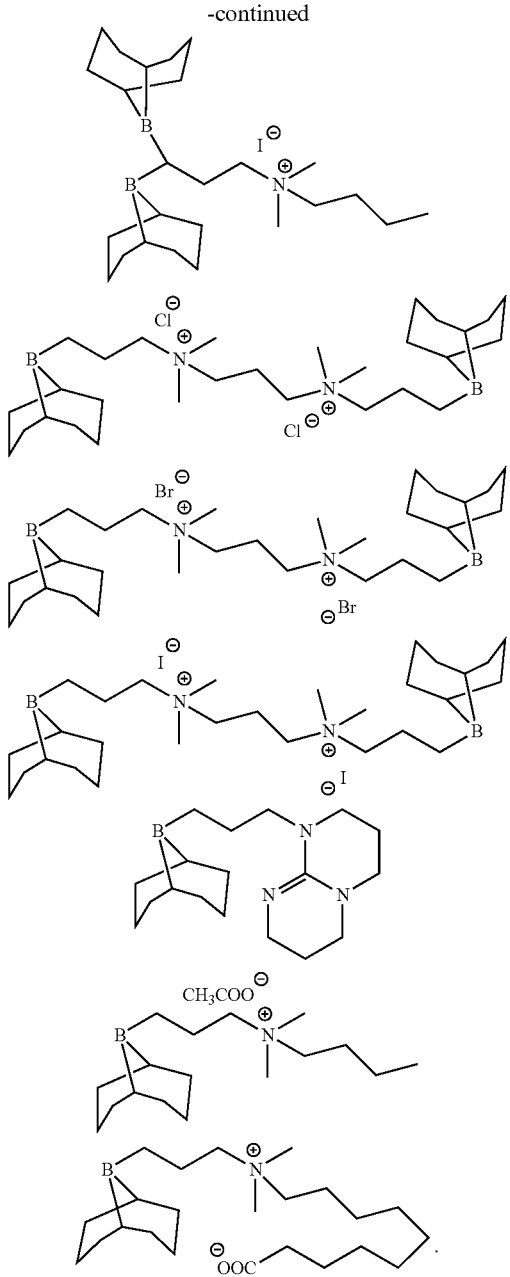

9. A preparation method for an organic metal-free catalyst with electrophilic and nucleophilic dual-functions, characterized in that the catalyst is obtained by the hydroboration of a raw material W1 containing at least one unsaturated bond and a second raw material W2 containing contains at least one boron-hydrogen bond, wherein the structural formula of is represented by one or more of the following:

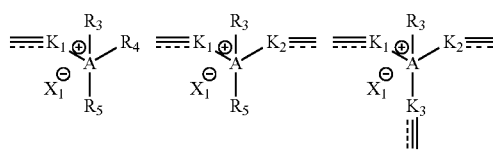

74
-continued

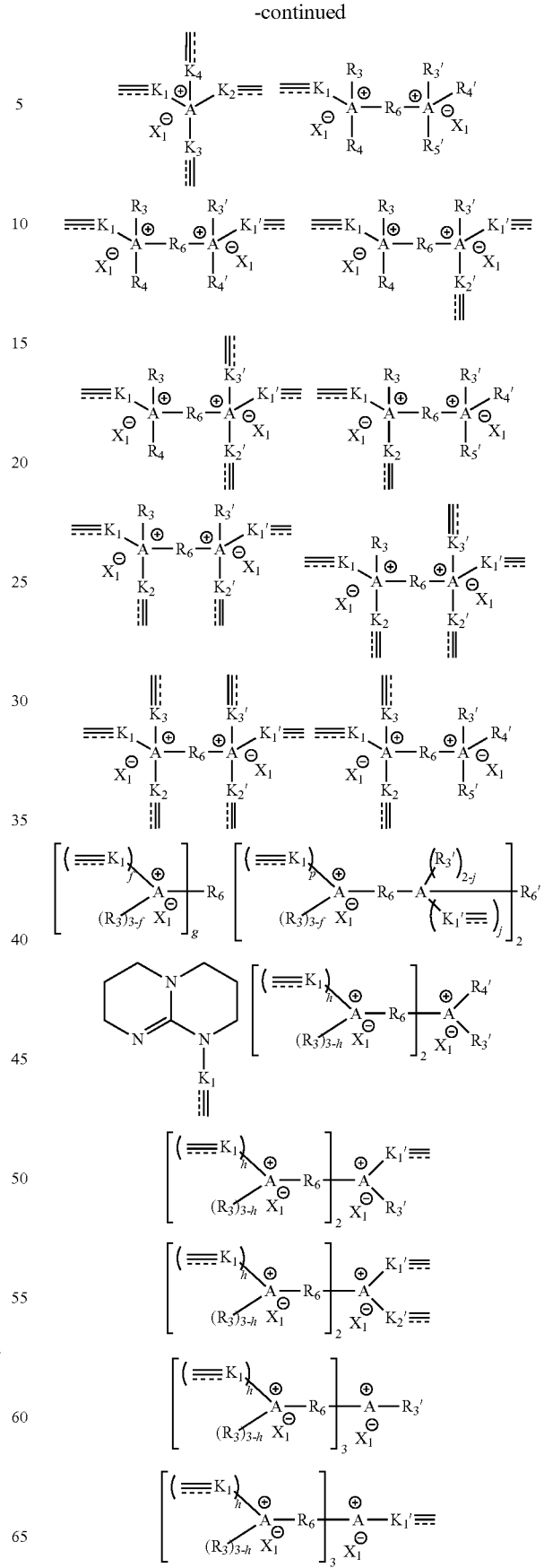

-continued

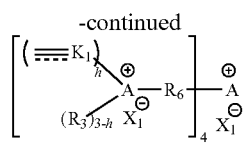

wherein
each f is an independently selected integer from 0 to 3, but cannot be equal to 0 in a structure;
g is an independently selected integer from 3 to 20;
each p is an independently selected integer from 0 to 3, each j is an independently selected integer from 0 to 2, however the p and j cannot be equal to 0 in a structure;
each h is an independently selected integer from 0 to 3, but cannot equal to be 0 in a structure;
each set of $K_1$ is independently selected from the group containing substituted and unsubstituted $C_1$-$C_{30}$ alkyl, $C_3$-$C_{30}$ alkenyl, $C_3$-$C_{30}$ alkynyl, $C_7$-$C_{30}$ aryl, and $C_5$-$C_{30}$ heteroaryl, or the group containing one or more of O, S, N, Si and P atoms; wherein any two or more of the substituents of K1 may form bond or ring;
each set of the substituents of $R_3$~$R_6$, $R_3'$~$R_6'$, $K_2$~$K_4$, and $K_1'$~$K_3'$ are independently selected from the group containing substituted and unsubstituted $C_1$-$C_{30}$ alkyl, $C_3$-$C_{30}$ alkenyl, $C_3$-$C_{30}$ alkynyl, $C_6$-$C_{30}$ aryl, and $C_5$-$C_{30}$ heteroaryl, or the group containing one or more of O, S, N, Si and P atoms; wherein
any two or more of the substituents of $K_1$~$K_4$, $K_1'$~$K_3'$, $R_3$~$R_6$, $R_3'$~$R_6'$ may form bond or ring; but the proviso is that $R_3$~$R_5$ cannot be equal to an aryl group or a heteroaryl group in a structure;
A is selected from N or P atoms;
each ═══ independently represents carbon-carbon double bond or carbon-carbon triple bond;
each $X^\ominus$ represents a negative ion, which exists independently in the form of a single negative ion;
W2 has the structure of

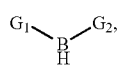

wherein $G_1$ and $G_2$ are independently selected from the group containing H, halogen, and substituted and unsubstituted $C_1$-$C_{30}$ alkyl, $C_3$-$C_{30}$ alkenyl, $C_3$-$C_{30}$ alkynyl, $C_6$-$C_{30}$ aryl, and $C_5$-$C_{30}$ heteroaryl, or the group containing one or more of O, S, N, Si and P atoms; wherein any two or more of the substituents of $G_1$ and $G_2$ may form bond or ring.

10. The method of claim 9, wherein the hydroboration reaction occurs by mixing raw materials W1 and W2 under the protection of nitrogen in the presence of organic solvents at a given temperature (ranges from −20 to 150° C.), and the mixture is kept and stirring for a allowed time (from 1 to 500 hours); after removing the impurities and organic solvents, the organic metal-free catalyst with electrophilic and nucleophilic dual functions is obtained.

11. The method of claim 10, wherein the organic solvent is selected from one or more of tetrahydrofuran, benzene, toluene, chloroform, hexane, diethyl ether, dichloromethane.

12. A method of using the catalyst in claim 1 in making polymer materials comprising the step of homopolymerization or/and copolymerization of one or more cyclic monomers in the presence of the organic metal-free catalysts with electrophilic and nucleophilic dual functions to produce polymeric materials.

13. A method of using the organic metal-free catalysts with electrophilic and nucleophilic functions in claim 1 in the preparation of polymeric materials include the copolymerization of one or more cyclic monomers with carbon dioxide, carbon disulfide and carbon sulfide in the presence of the organic metal-free catalysts with electrophilic and nucleophilic functions to obtain polymers.

14. The method of using the organic metal-free catalysts in the preparation of polymer materials according to claim 12, wherein the cyclic monomer is selected from the following compounds:

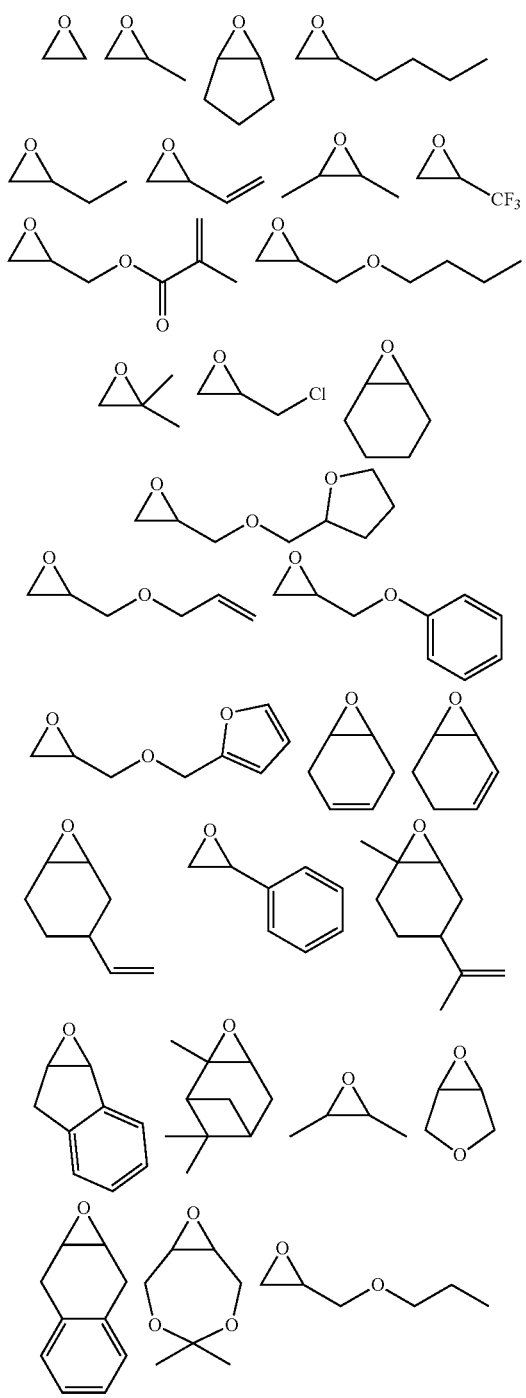

77

-continued

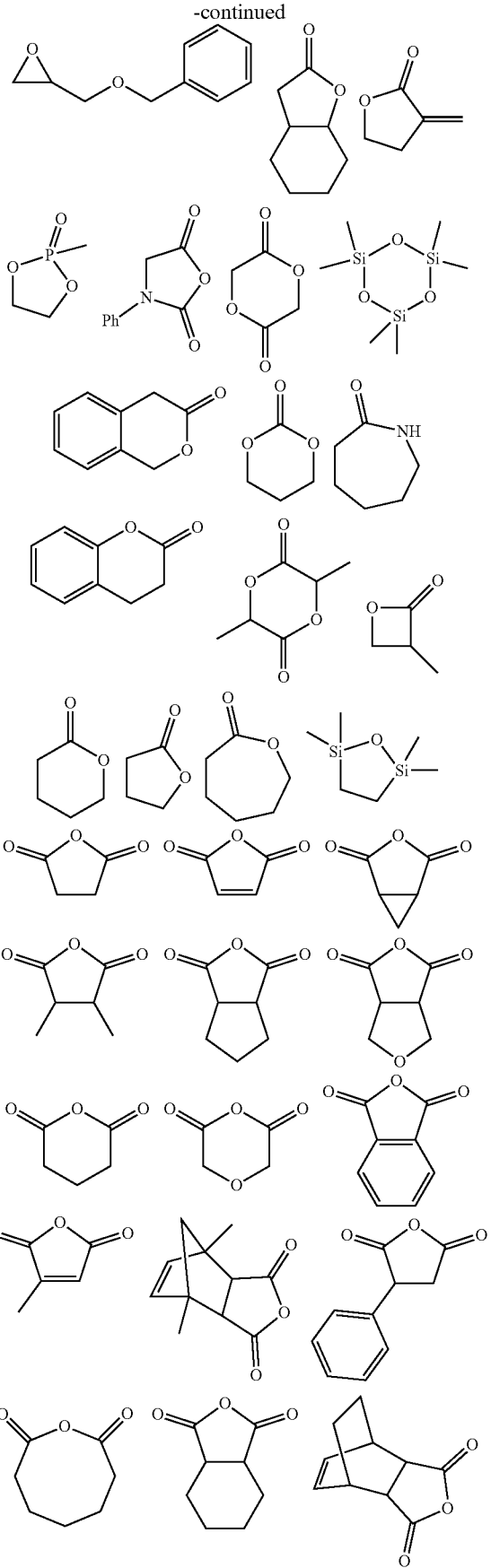

78

-continued

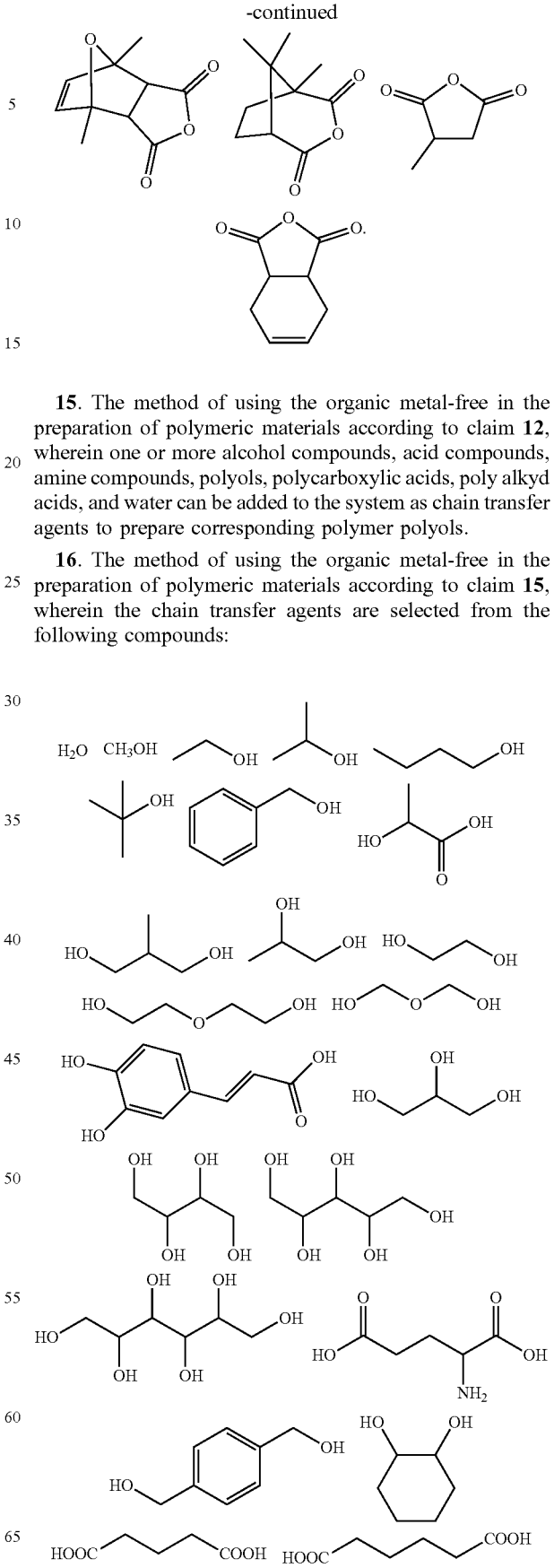

15. The method of using the organic metal-free in the preparation of polymeric materials according to claim 12, wherein one or more alcohol compounds, acid compounds, amine compounds, polyols, polycarboxylic acids, poly alkyd acids, and water can be added to the system as chain transfer agents to prepare corresponding polymer polyols.

16. The method of using the organic metal-free in the preparation of polymeric materials according to claim 15, wherein the chain transfer agents are selected from the following compounds:

79

-continued

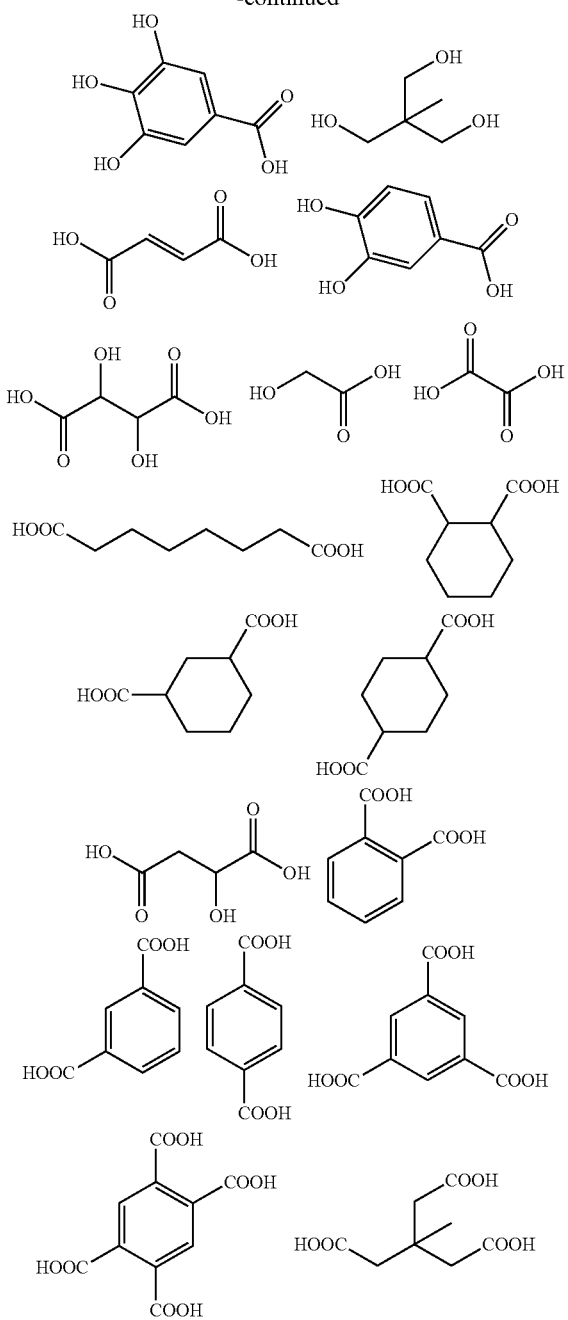

80

-continued

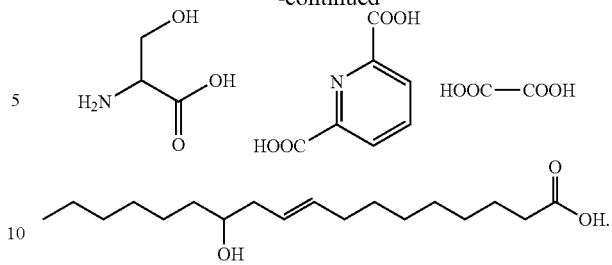

17. The method of using the organic metal-free in the preparation of polymeric materials according to claim 12, wherein one or more polymers with alcohol hydroxyl, phenolic hydroxyl, amino, and carboxyl groups are added to the polymerization reaction system as macromolecular chain transfer agents to prepare corresponding block copolymers or graft copolymers.

18. The method of using the organic metal-free in the preparation of polymeric materials according to claim 17, wherein the chain transfer agents are selected from the following structures:

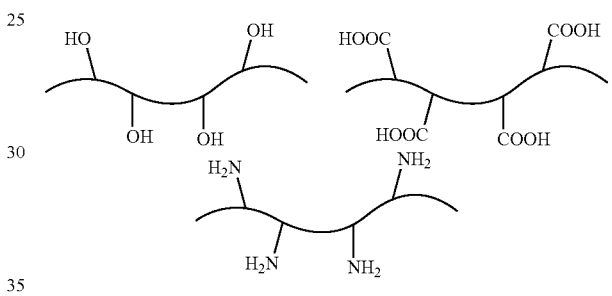

wherein ⁀⁀ represents the main chain of macromolecular chain transfer agent.

19. The method of using the organic metal-free in the preparation of polymeric materials according to claim 12, wherein the catalysts can be supported by inorganic carriers or organic carriers.

20. The method of using the organic metal-free in the preparation of polymeric materials according to claim 1, wherein the applications include the copolymerization of carbon dioxide and epoxides to prepare aliphatic polycarbonates, the ring-opening polymerization of epoxides to prepare polyether, the copolymerization of epoxides and cyclic anhydrides to prepare polyesters, and the copolymerization of carbon sulfide and epoxides to prepare polythiocarbonates.

* * * * *